(12) United States Patent  
Dhuse et al.

(10) Patent No.: US 10,089,344 B2  
(45) Date of Patent: *Oct. 2, 2018

(54) LISTING DATA OBJECTS USING A HIERARCHICAL DISPERSED STORAGE INDEX

(71) Applicant: Cleversafe, Inc., Chicago, IL (US)

(72) Inventors: Greg Dhuse, Chicago, IL (US); Wesley Leggette, Chicago, IL (US); Adam Michael Gray, Chicago, IL (US); Ilya Volvovski, Chicago, IL (US); Andrew Baptist, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

This patent is subject to a terminal disclaimer.

(21) Appl. No.: 13/775,491

(22) Filed: Feb. 25, 2013

(65) Prior Publication Data

US 2013/0232152 A1 Sep. 5, 2013

Related U.S. Application Data

(60) Provisional application No. 61/605,856, filed on Mar. 2, 2012.

(51) Int. Cl.
*G06F 17/30* (2006.01)
*G06F 3/06* (2006.01)
*G06F 11/10* (2006.01)

(52) U.S. Cl.
CPC ........ *G06F 17/30336* (2013.01); *G06F 3/067* (2013.01); *G06F 11/10* (2013.01);
(Continued)

(58) Field of Classification Search
CPC ............ G06F 2201/82; G06F 11/1469; G06F 17/30327; G06F 11/1448; G06F 17/30607;
(Continued)

(56) References Cited

U.S. PATENT DOCUMENTS 4,092,732 A 5/1978 Ouchi
5,454,101 A 9/1995 Mackay et al.
(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
(Continued)

*Primary Examiner* — Srirama Channavajjala
(74) *Attorney, Agent, or Firm* — Garlick & Markison; Timothy W. Markison; Kelly H. Hale

(57) ABSTRACT

A method begins by a dispersed storage (DS) processing module receiving a request for a data index list that identifies data objects having one or more common attributes, searching a hierarchical ordered index structure to identify a data object level index node corresponding to a first data object boundary match, and determining whether the data object level index node corresponds to a second data object boundary match. When the data object level index node does not correspond to the second data object boundary match, the method continues with the DS processing module searching an adjacent data object level index node to determine whether the adjacent data object level index node corresponds to the second data object boundary match. When the adjacent data object level index node corresponds to the second data object boundary match, the method continues with the DS processing module generating the data index list.

14 Claims, 76 Drawing Sheets

(52) U.S. Cl.
CPC .... *G06F 17/3002* (2013.01); *G06F 17/30321*
(2013.01); *G06F 17/30327* (2013.01); *G06F
17/30864* (2013.01); *G06F 17/30961*
(2013.01); *G06F 11/1076* (2013.01)

(58) Field of Classification Search
CPC ......... G06F 17/30961; G06F 17/30321; G06F
17/30336; G06F 17/30864; G06F
17/3002; Y10S 707/99945; Y10S
707/99948; Y10S 707/99952; H04L
29/06; H04L 67/34; H04L 67/36; H04L
67/02; H04L 69/329; H04L 67/142
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,697,794 | B1 * | 2/2004 | Milby .................. 707/702 |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,165,095 | B2 | 1/2007 | Sim |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,502,995 | B2 * | 3/2009 | Takagi ............ G06F 17/30905 707/999.003 |
| 7,636,724 | B2 | 12/2009 | de la Torre et al. |
| 7,647,329 | B1 * | 1/2010 | Fischman ......... G06F 17/30094 707/999.1 |
| 7,769,722 | B1 * | 8/2010 | Bergant ............ G06F 17/30212 707/681 |
| 7,818,535 | B1 | 10/2010 | Bono et al. |
| 7,979,441 | B2 | 7/2011 | Sim-Tang |
| 8,055,645 | B1 * | 11/2011 | Sinha ............... G06F 17/30091 707/626 |
| 8,930,375 | B2 * | 1/2015 | Dhuse ............... G06F 17/30321 707/741 |
| 8,935,256 | B2 * | 1/2015 | Dhuse ............... G06F 17/30321 707/741 |
| 2002/0062422 | A1 | 5/2002 | Butterworth et al. |
| 2002/0147727 | A1 * | 10/2002 | Schreiber .................. 707/102 |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0063134 | A1 * | 4/2003 | Lord et al. .................. 345/853 |
| 2003/0065617 | A1 | 4/2003 | Watkins et al. |
| 2003/0084020 | A1 | 5/2003 | Shu |
| 2003/0229627 | A1 * | 12/2003 | Carlson et al. .................. 707/3 |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0004817 | A1 * | 1/2006 | Andrews ........... G06F 17/30961 |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2006/0288020 | A1 * | 12/2006 | Awad ................ G06F 17/30961 |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2009/0319834 | A1 | 12/2009 | Ogihara et al. |
| 2010/0023480 | A1 * | 1/2010 | Ito et al. .......................... 707/2 |
| 2010/0023524 | A1 | 1/2010 | Gladwin et al. |
| 2010/0023621 | A1 * | 1/2010 | Ezolt ................ H04L 29/12066 709/226 |
| 2010/0281013 | A1 * | 11/2010 | Graefe .............. G06F 17/30327 707/715 |
| 2013/0232153 | A1 * | 9/2013 | Dhuse ............... G06F 17/30321 707/741 |
| 2013/0275480 | A1 * | 10/2013 | Dhuse ............... G06F 17/30321 707/829 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

(56) References Cited

OTHER PUBLICATIONS

Zeilenga; Lightweight Directory Access Protocol (LDAP): Directory Information Models; IETF Network Working Group; RFC 4512; Jun. 2006; pp. 1-49.
Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
International Search Report and Written Opinion; International Application No. PCT/US13/28049; dated May 9, 2013; 6 pages.

* cited by examiner

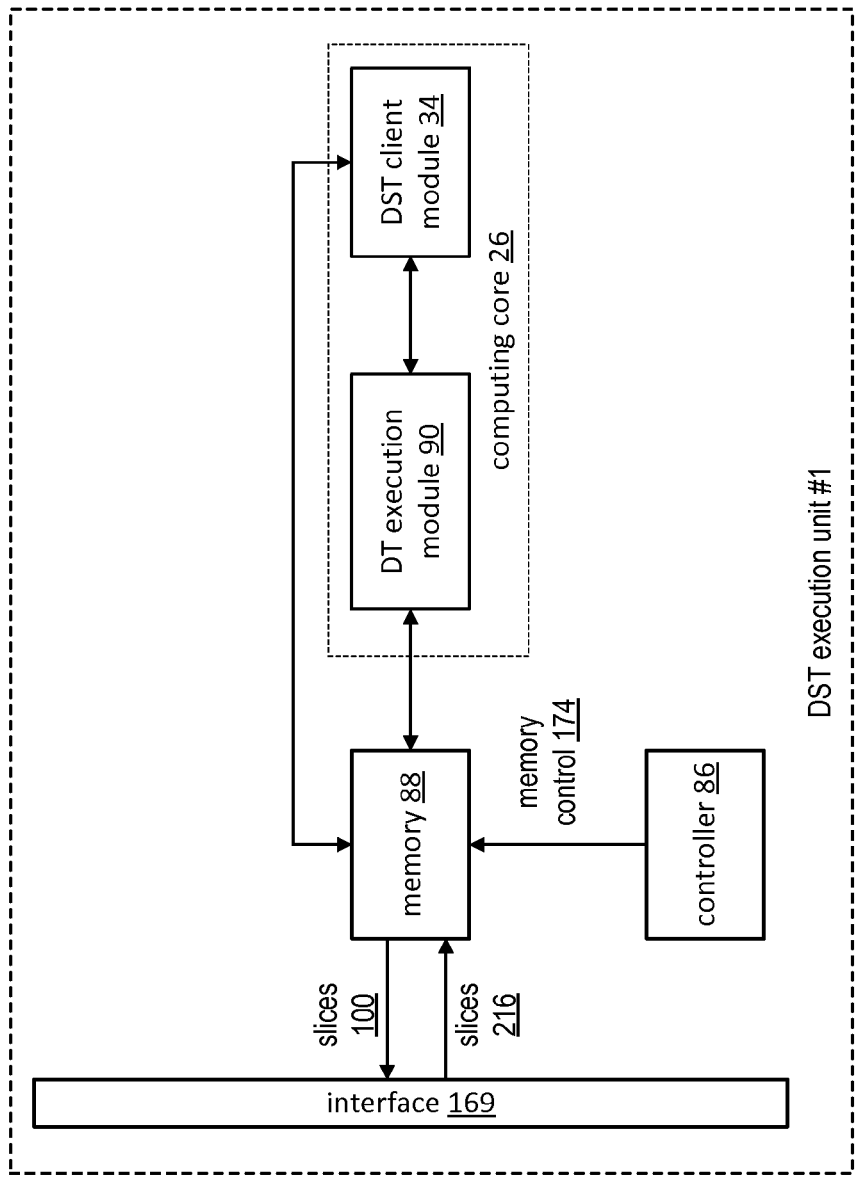
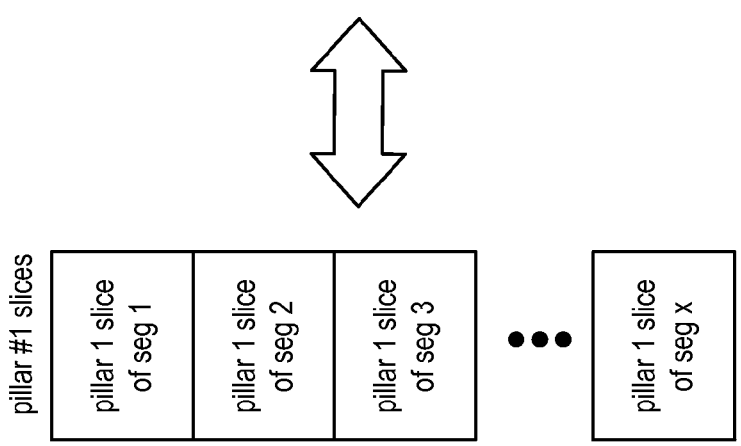
FIG. 24

| DST allocation info 242 | data partition info 320: Data ID; No. of partitions; Addr. info for each partition; format conversion indication | | | | | | |
|---|---|---|---|---|---|---|---|
| | task execution info 322 | | | | intermediate result info 324 | | |
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 &<br>1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 &<br>1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

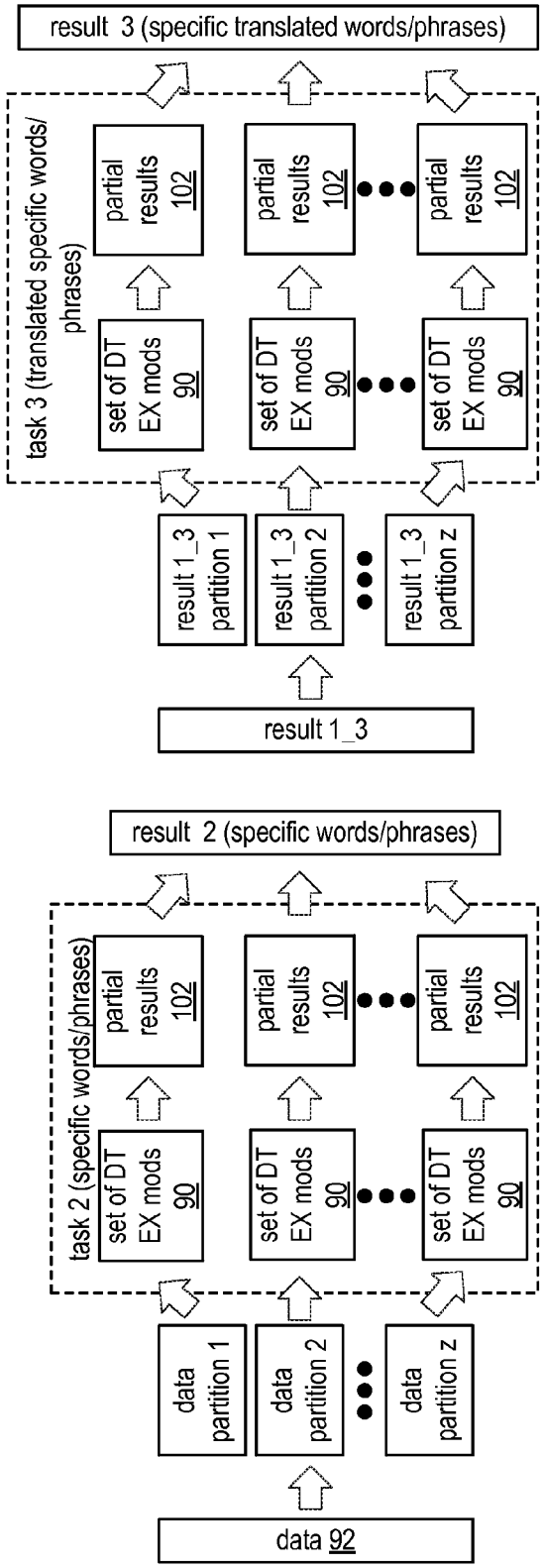
FIG. 38
FIG. 37
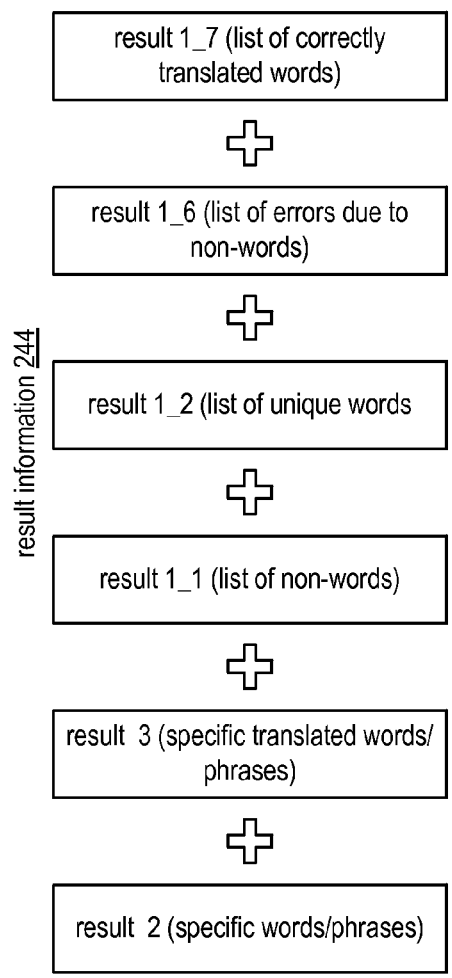
FIG. 39

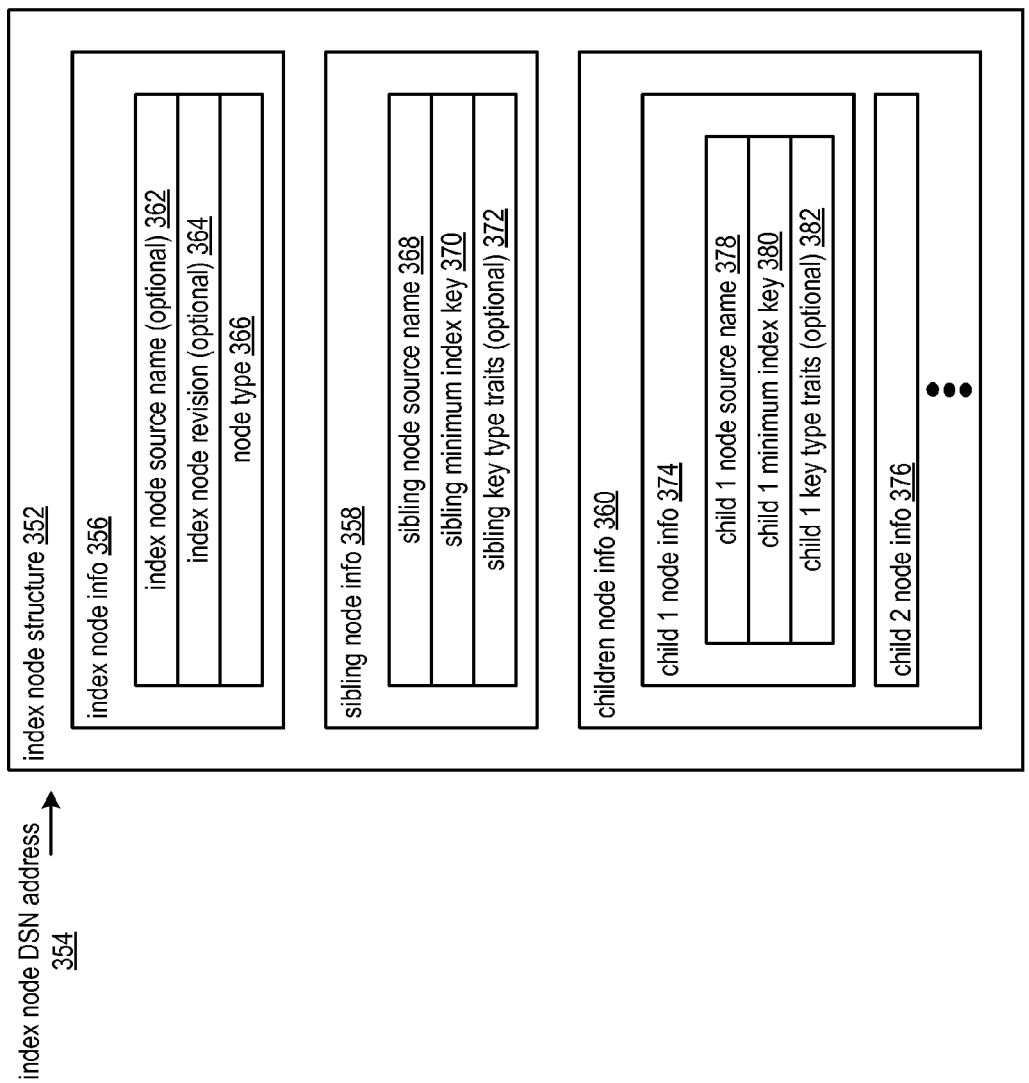

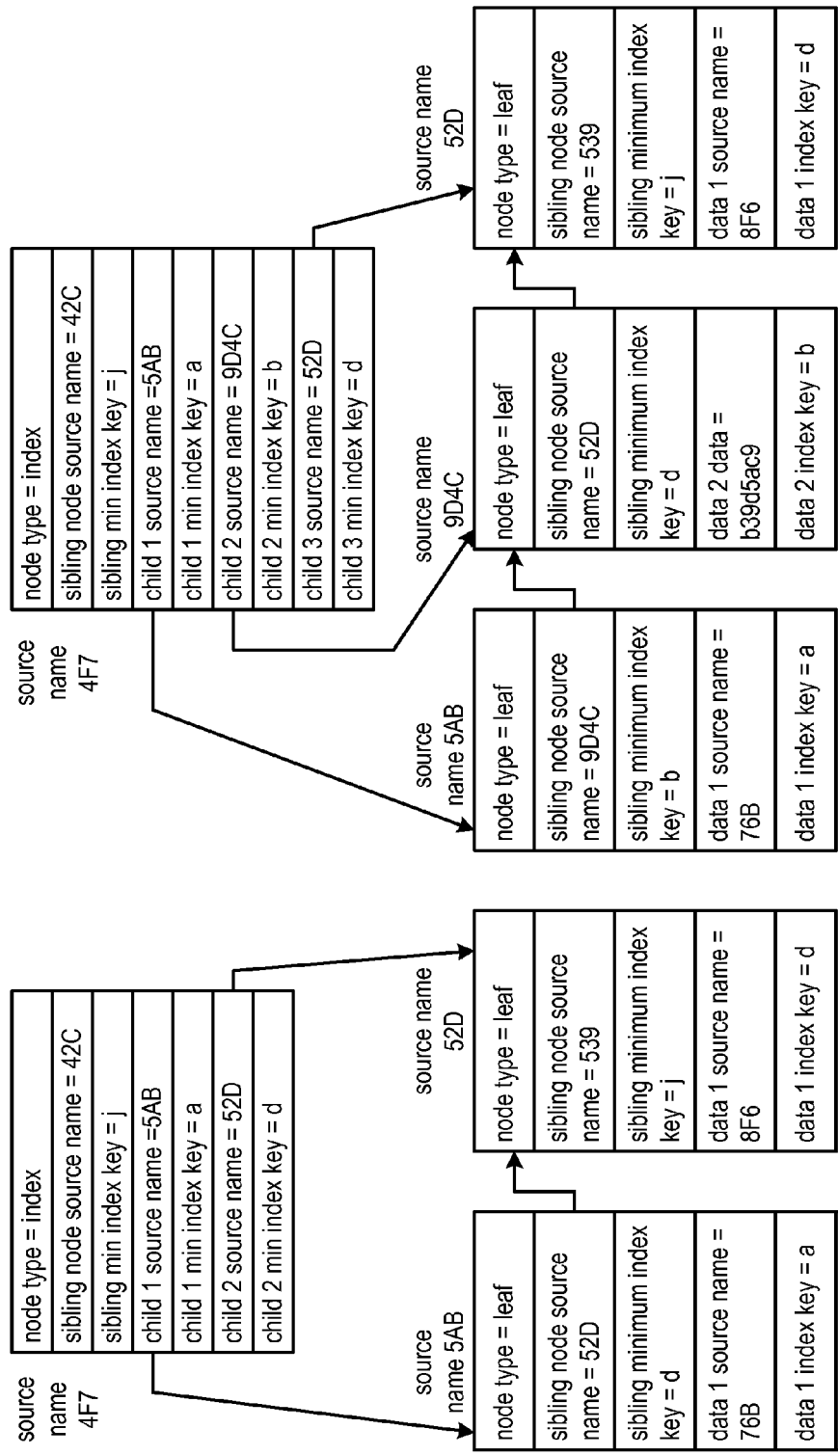

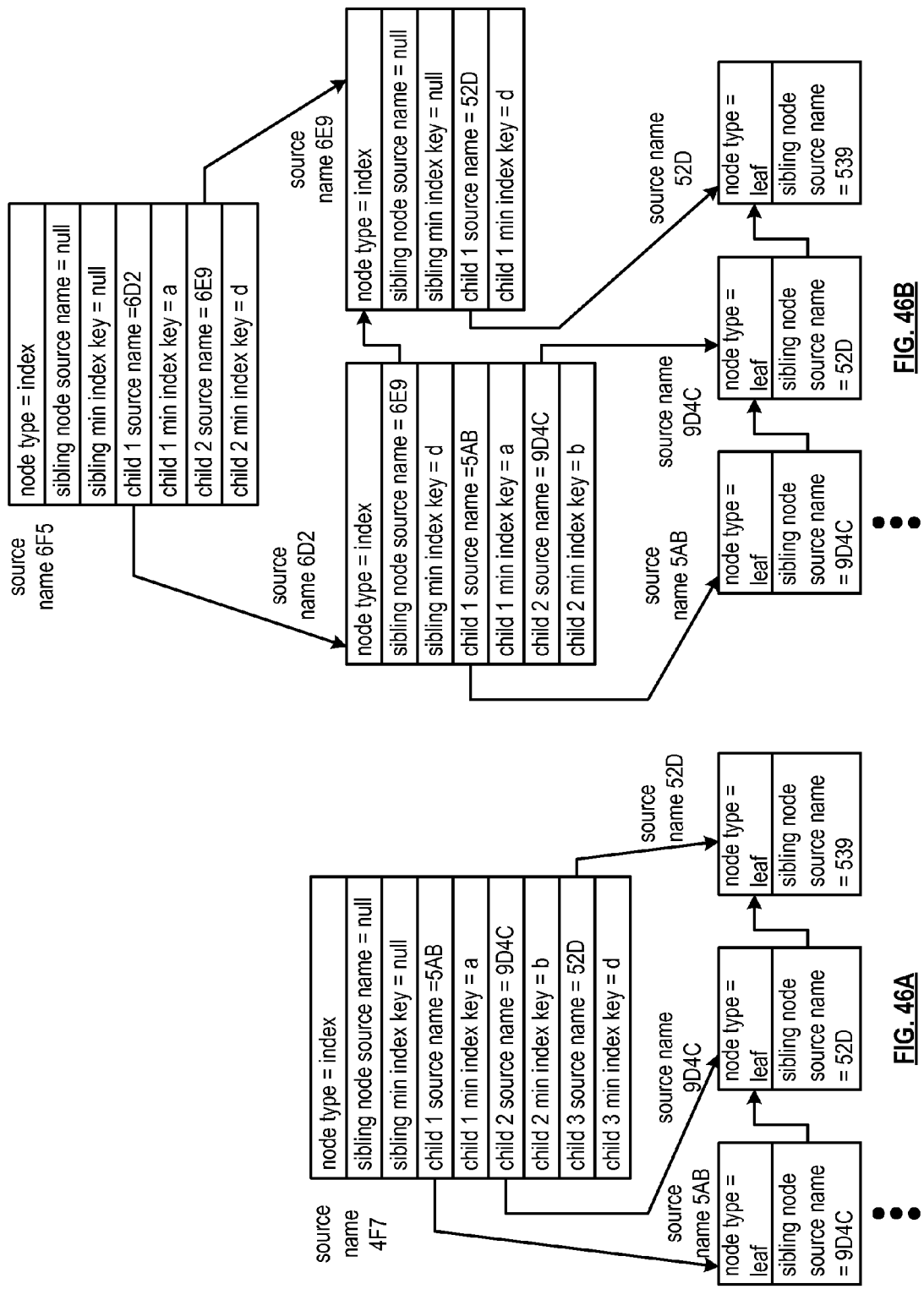

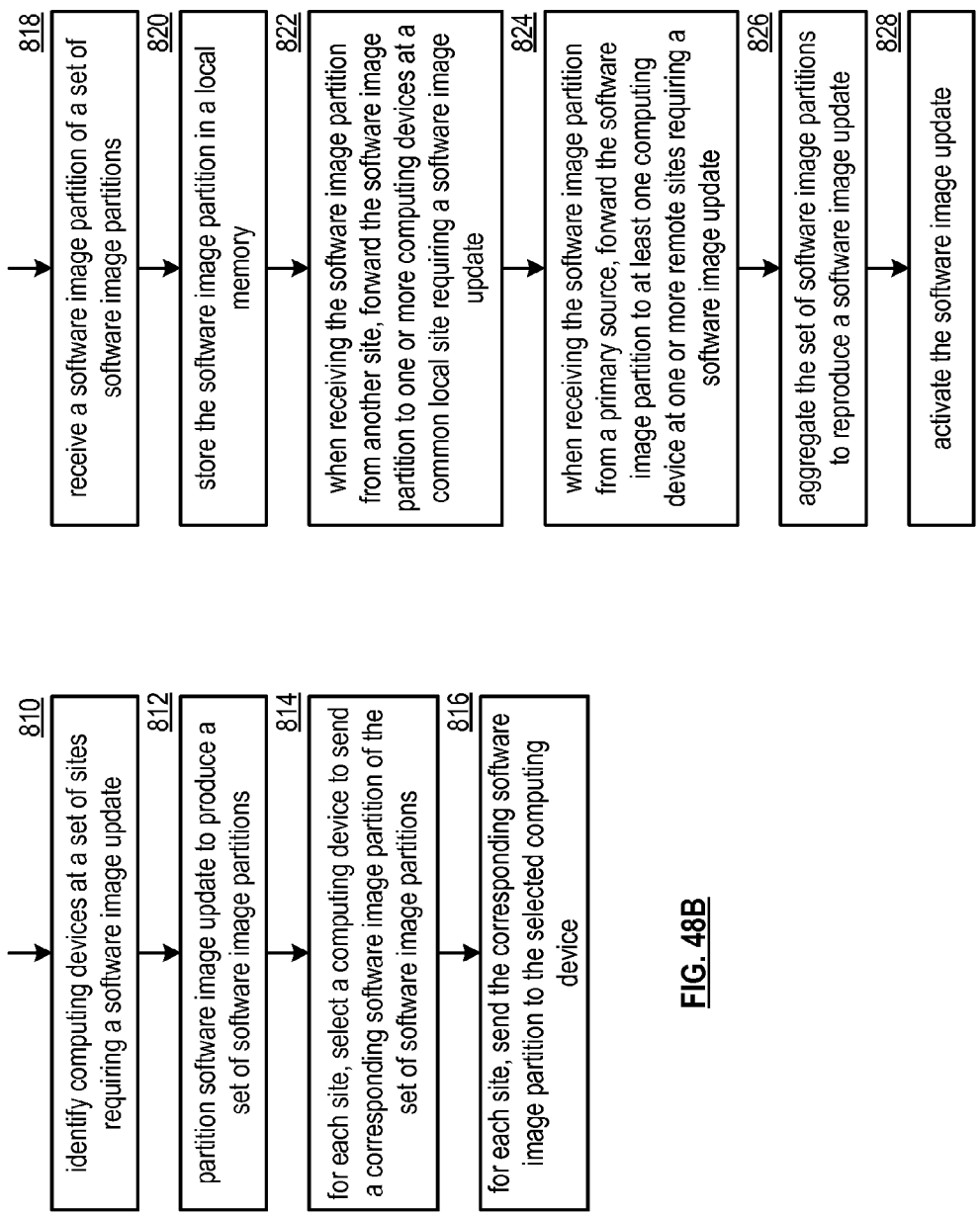

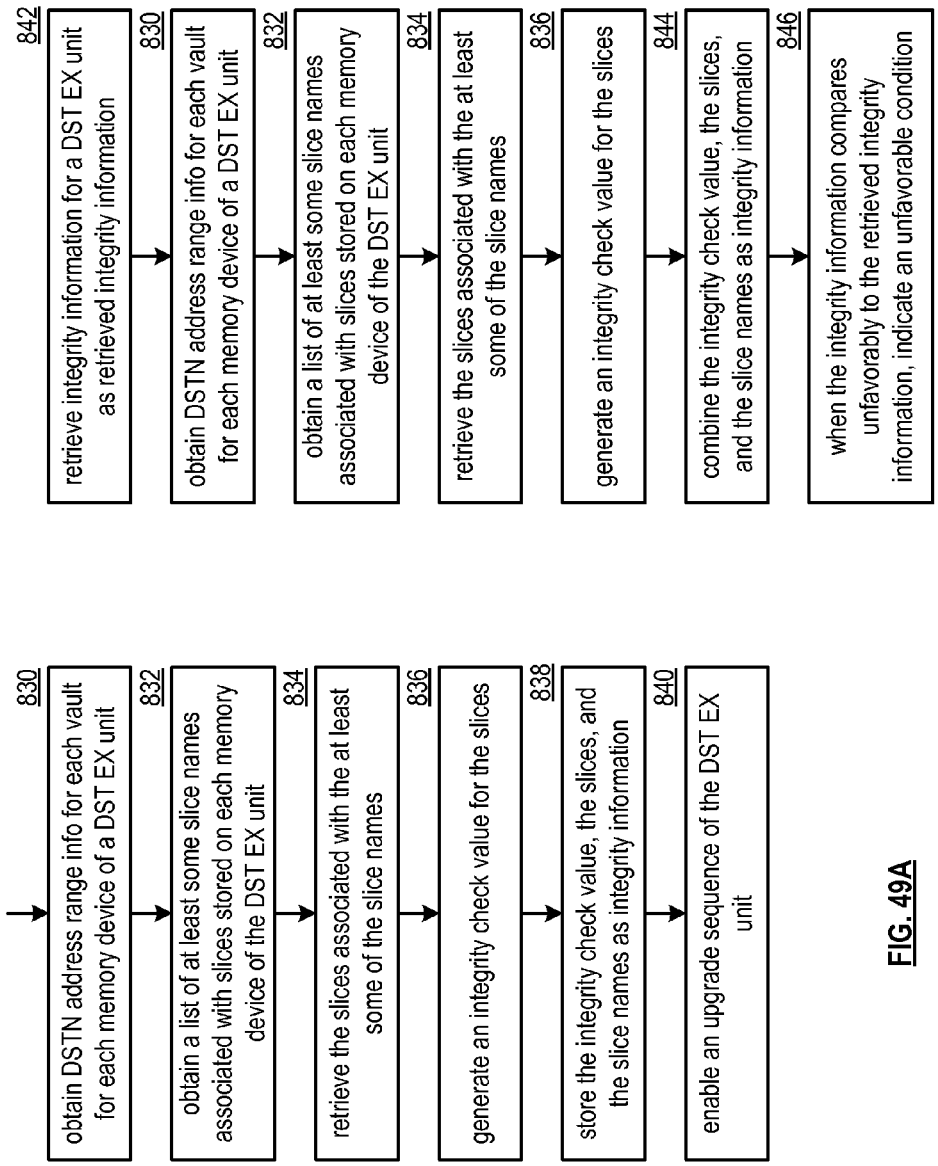

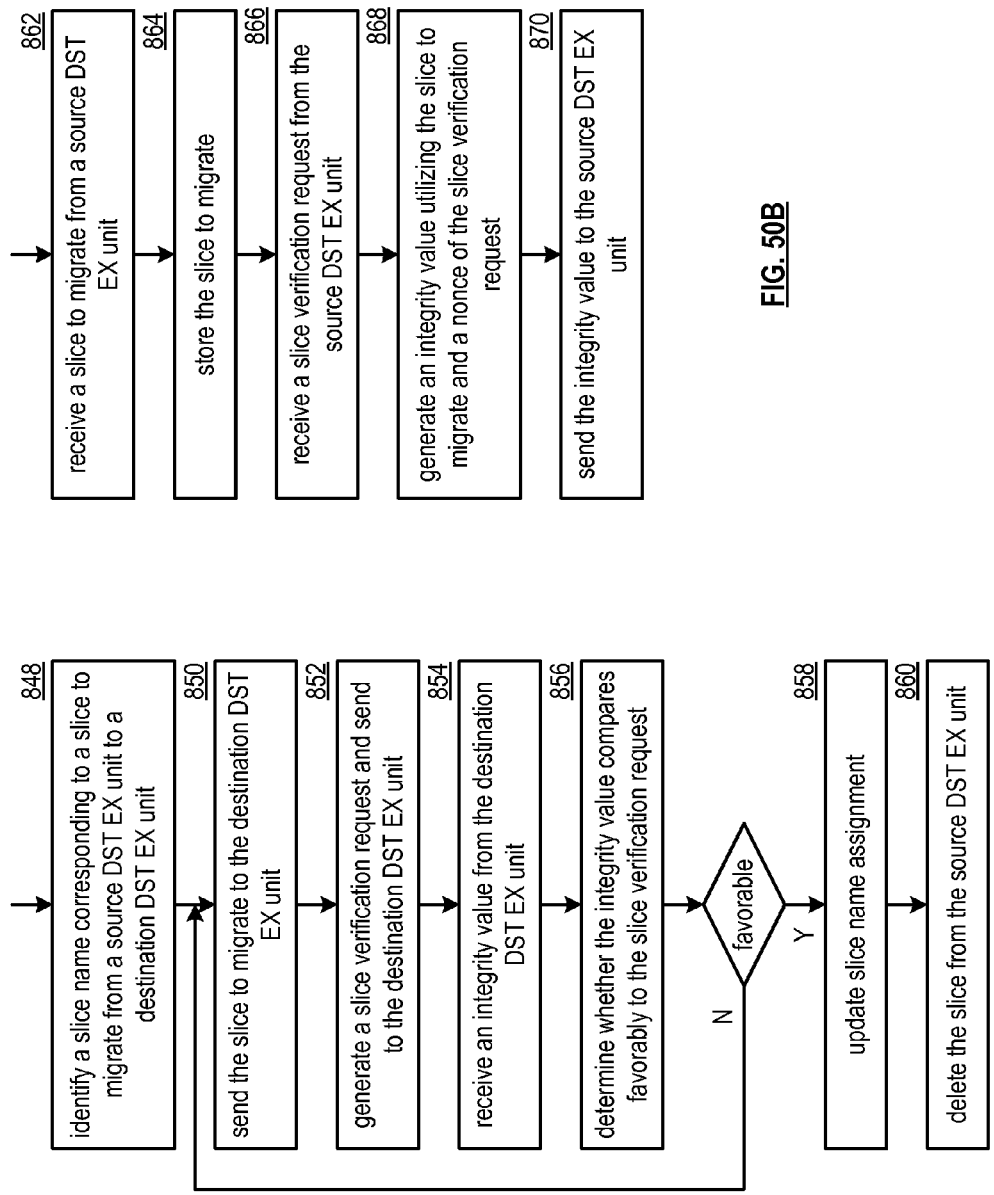

LISTING DATA OBJECTS USING A HIERARCHICAL DISPERSED STORAGE INDEX

CROSS REFERENCE TO RELATED PATENTS

The present U.S. Utility Patent Application claims priority pursuant to 35 U.S.C. § 119(e) to U.S. Provisional Application No. 61/605,856, entitled "Utilizing an Index of a Distributed Storage and Task Network" filed Mar. 2, 2012, pending, which is incorporated herein by reference in its entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 40B is a diagram illustrating an example of an index node structure in accordance with the present invention;

FIG. 44E is a schematic block diagram of another embodiment of a dispersed storage system in accordance with the present invention;

FIG. 46A is a diagram illustrating another example of an index structure in accordance with the present invention;

FIG. 46B is a diagram illustrating another example of an index structure in accordance with the present invention;

FIG. 48B is a flowchart illustrating an example of issuing a software image update in accordance with the present invention;

FIG. 48C is a flowchart illustrating an example of receiving a software image update in accordance with the present invention;

FIG. 49A is a flowchart illustrating an example of preparing for an upgrade in accordance with the present invention;

FIG. 49B is a flowchart illustrating an example of verifying an upgrade in accordance with the present invention;

FIG. 50A is a flowchart illustrating an example of migrating an encoded data slice in accordance with the present invention;

FIG. 50B is a flowchart illustrating an example of saving a migrated encoded data slice in accordance with the present invention;

DETAILED DESCRIPTION OF THE INVENTION

Figure 1:
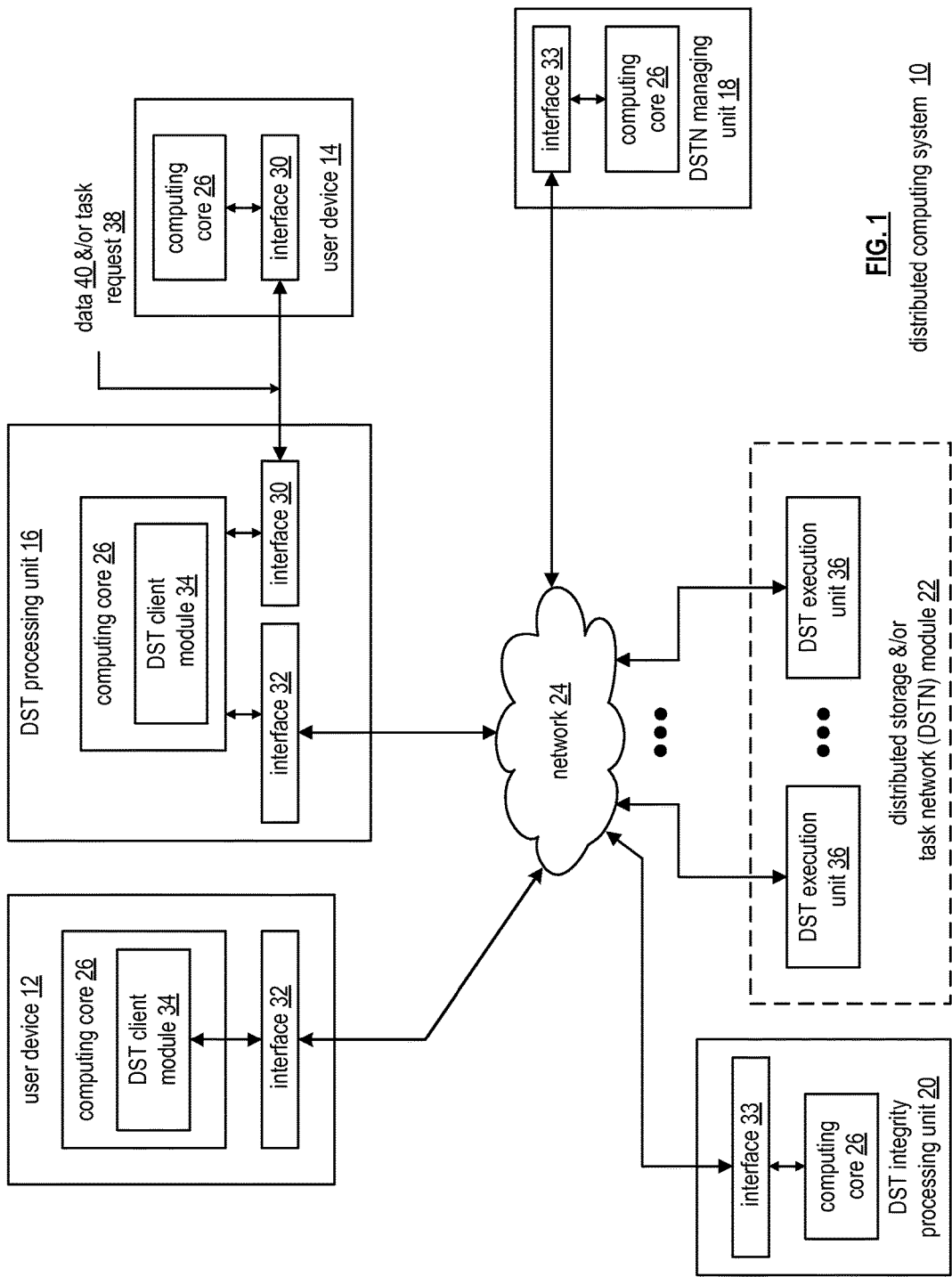
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
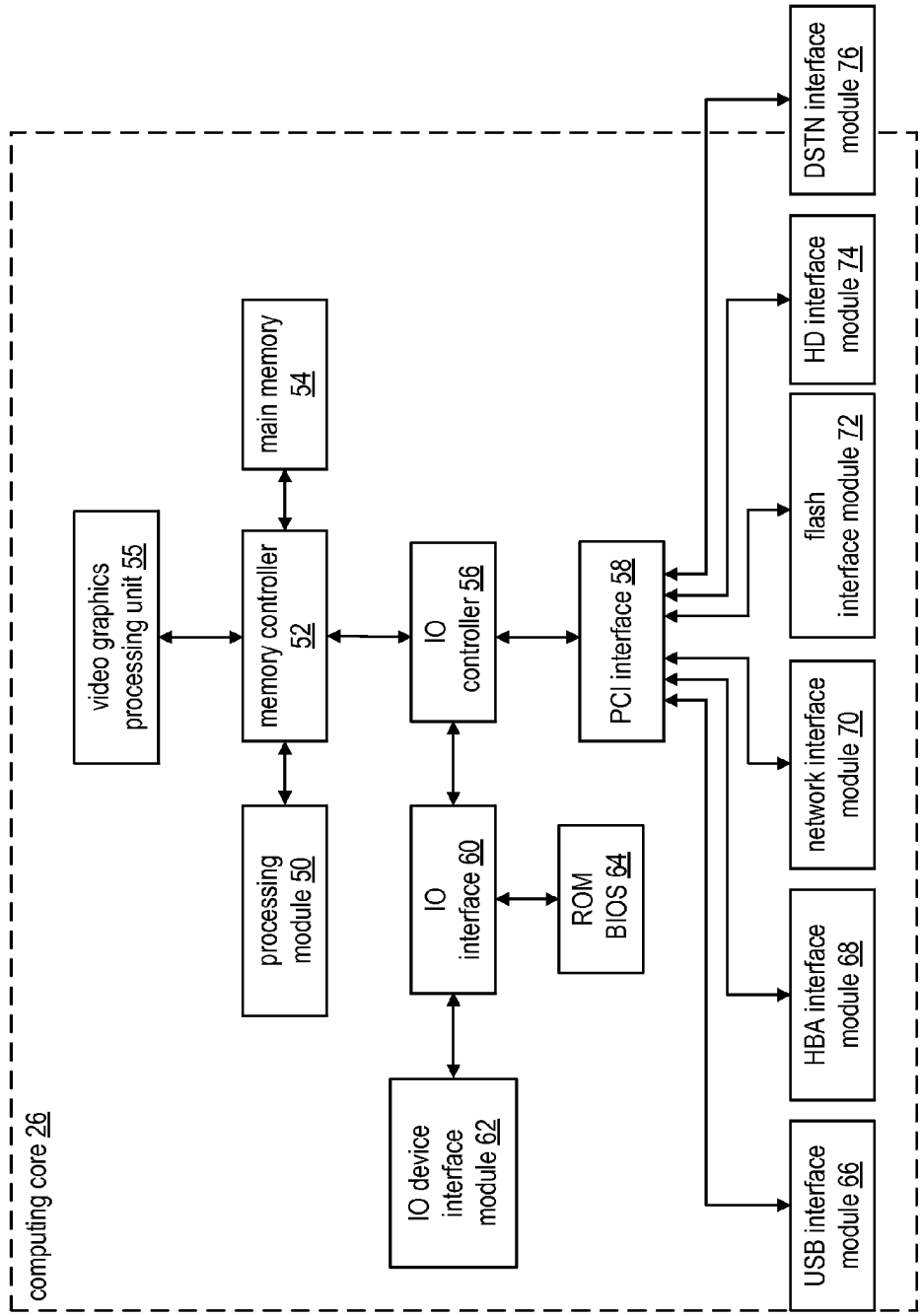
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
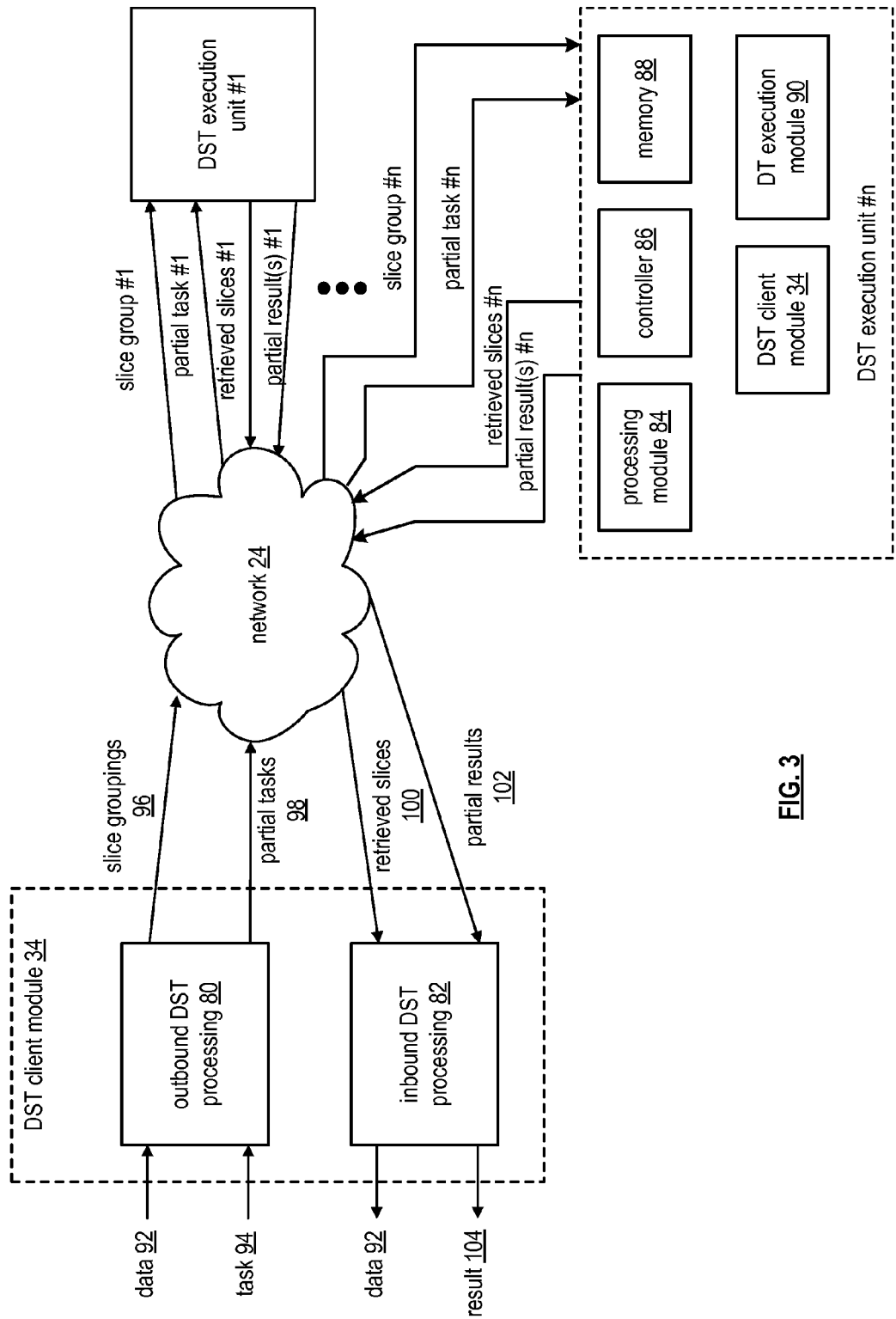
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
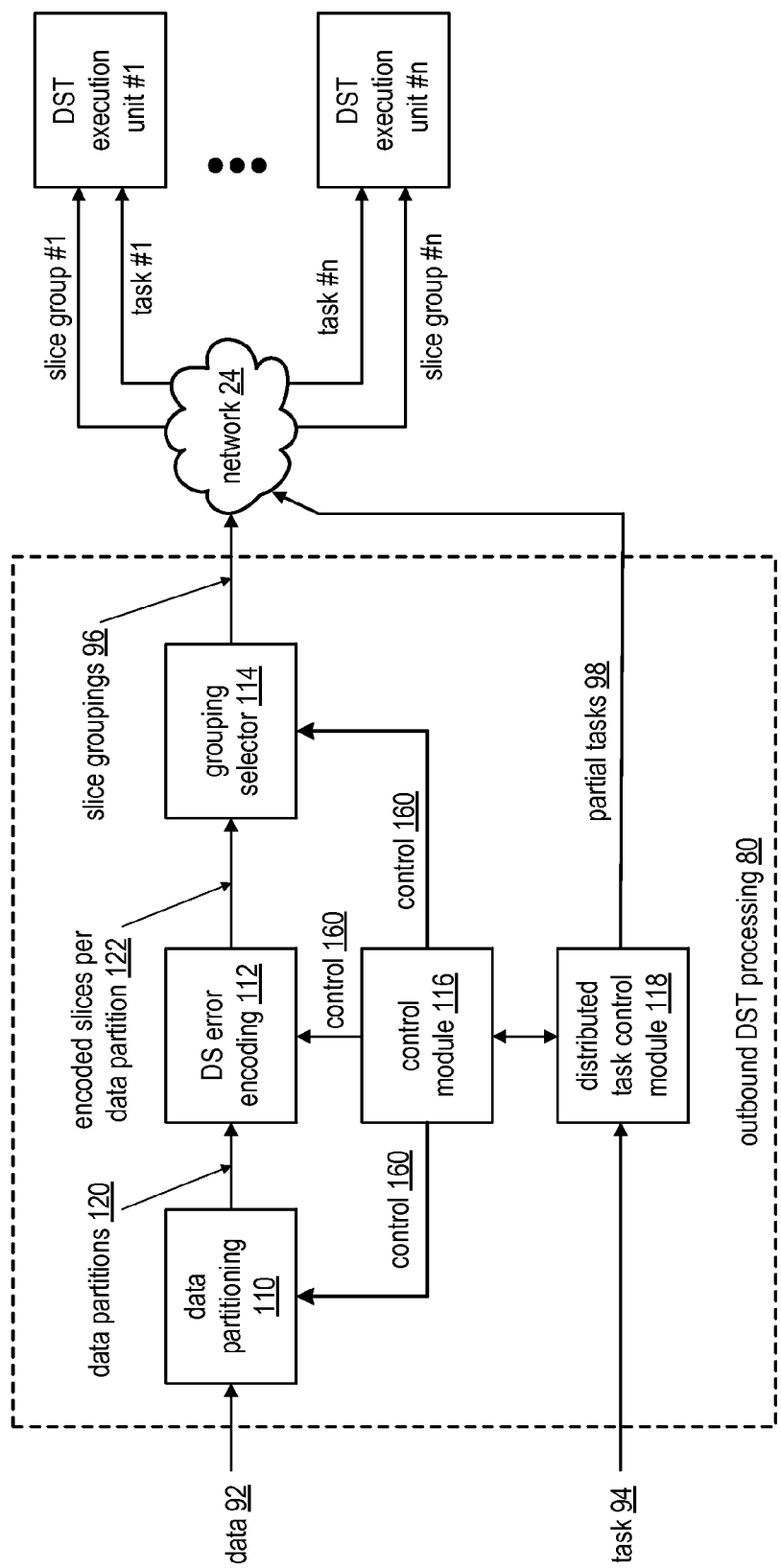
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
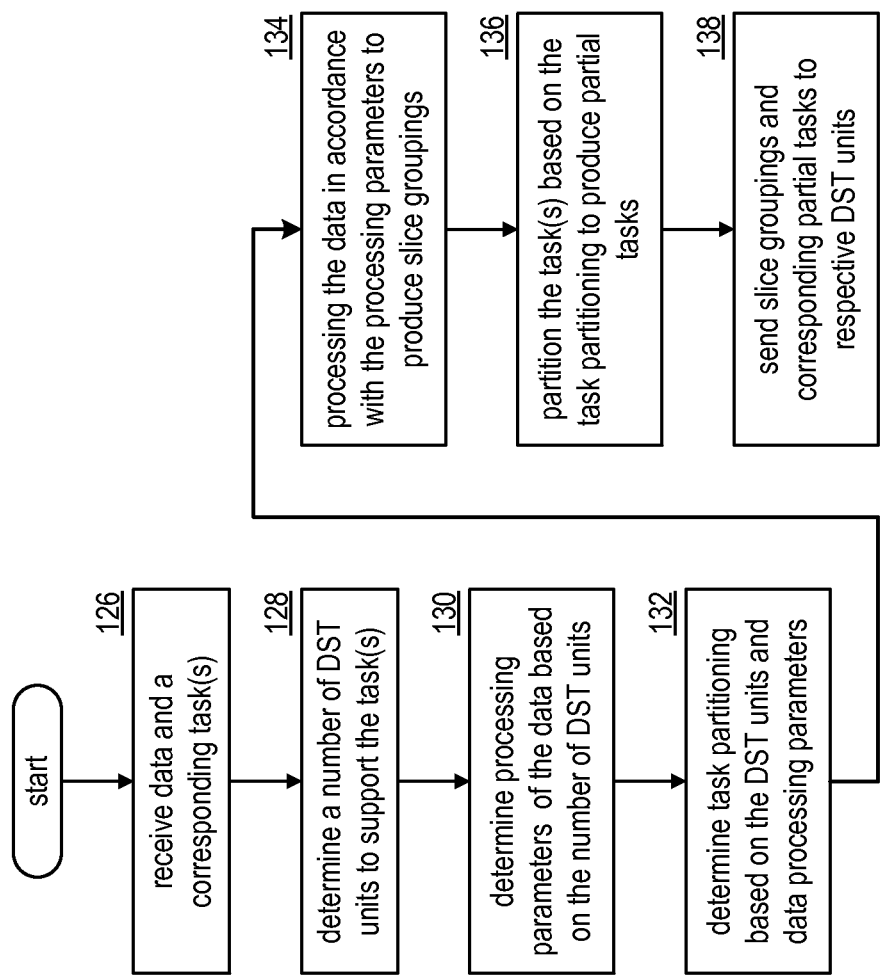
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
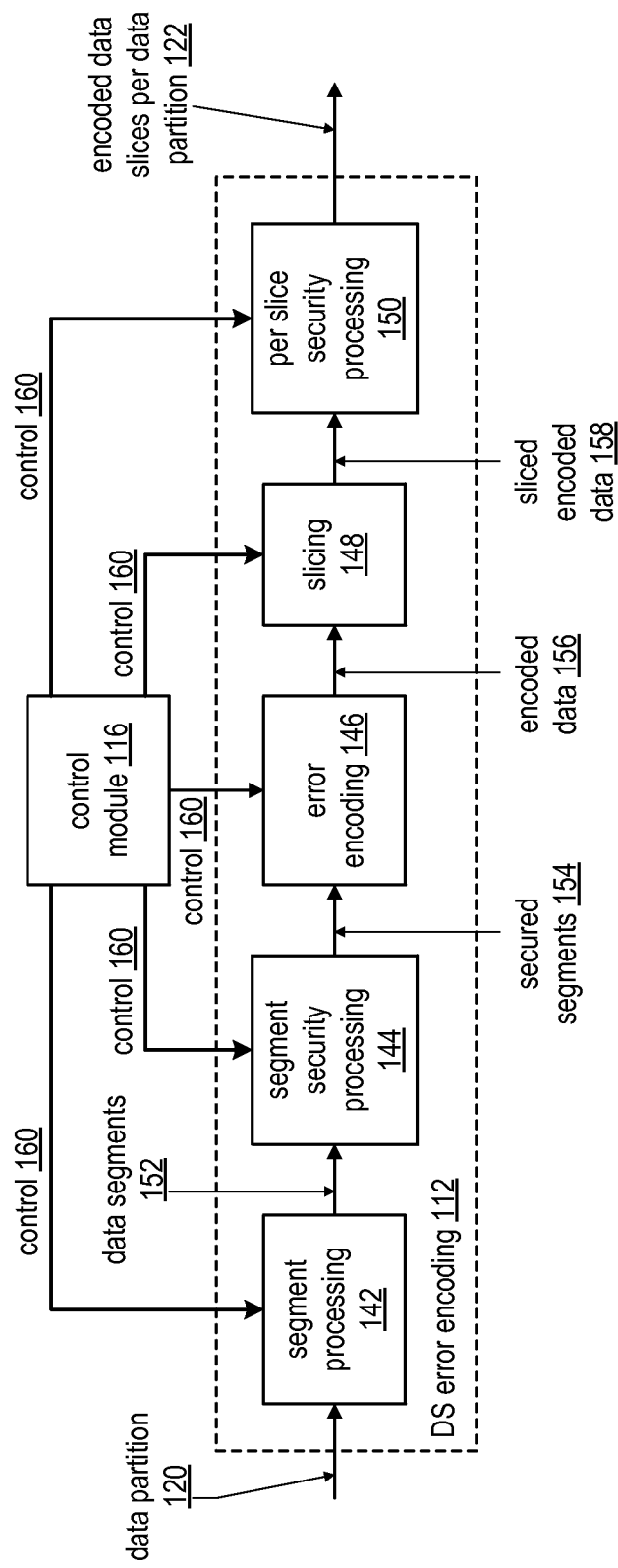
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120.

For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
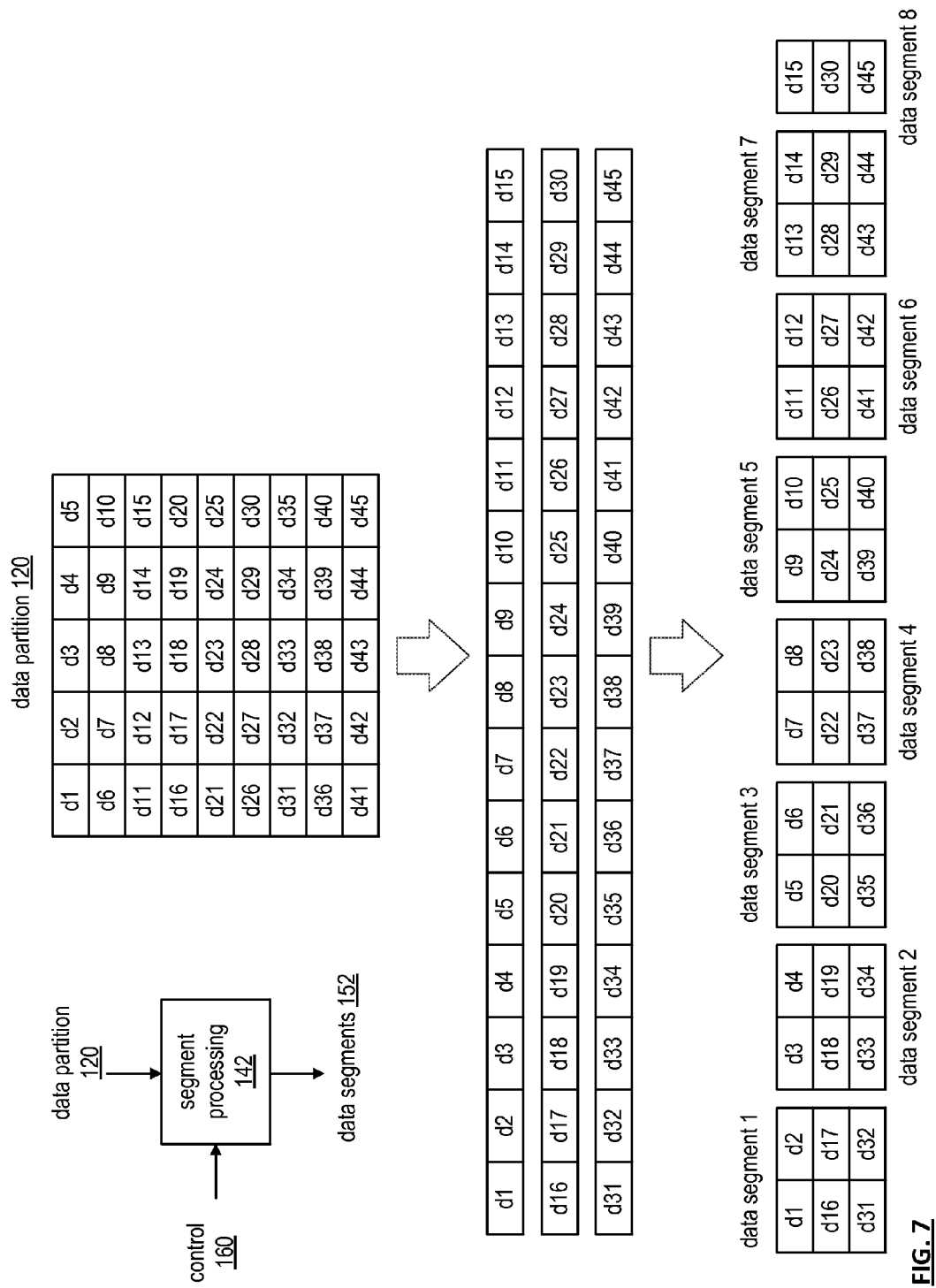
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
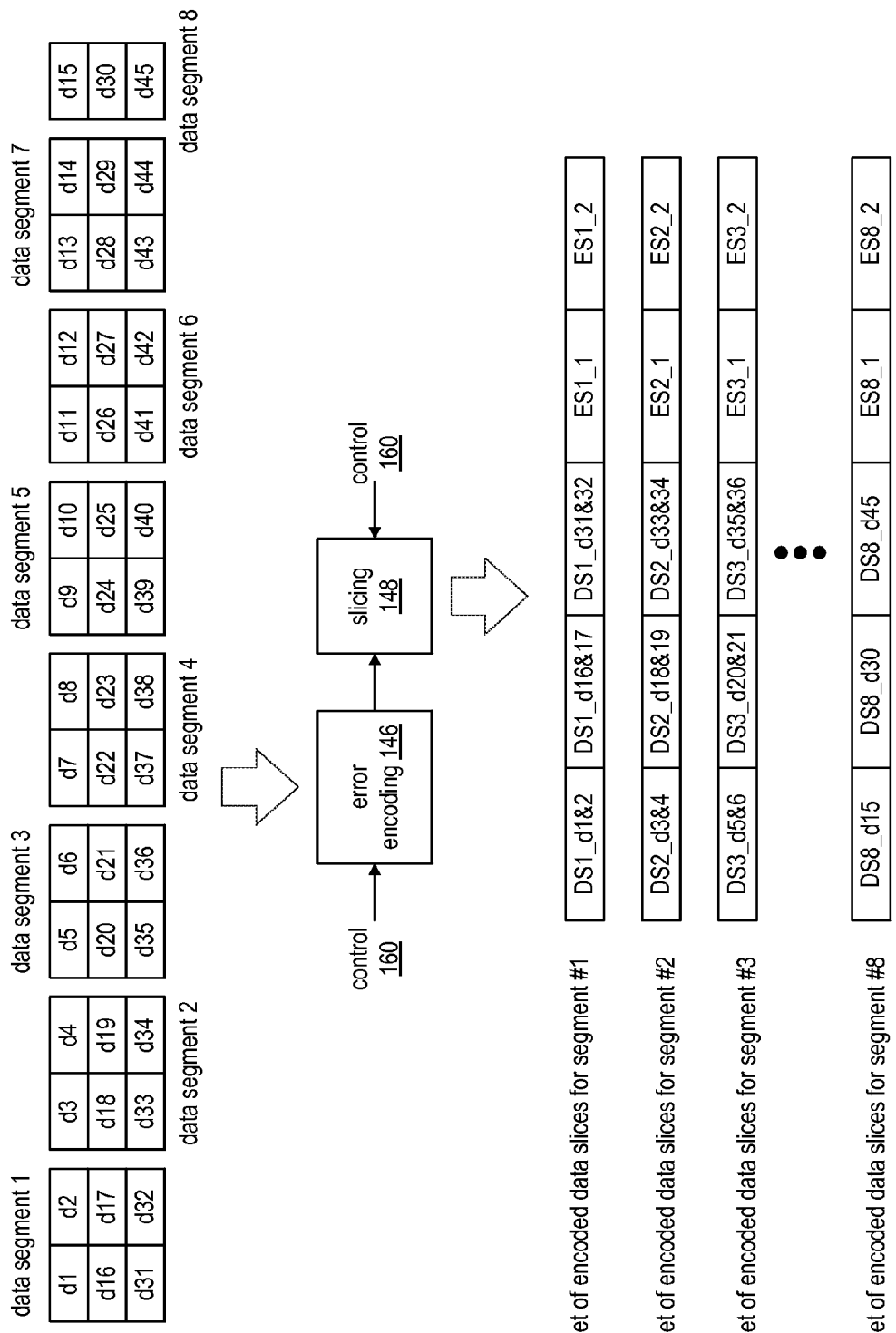
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
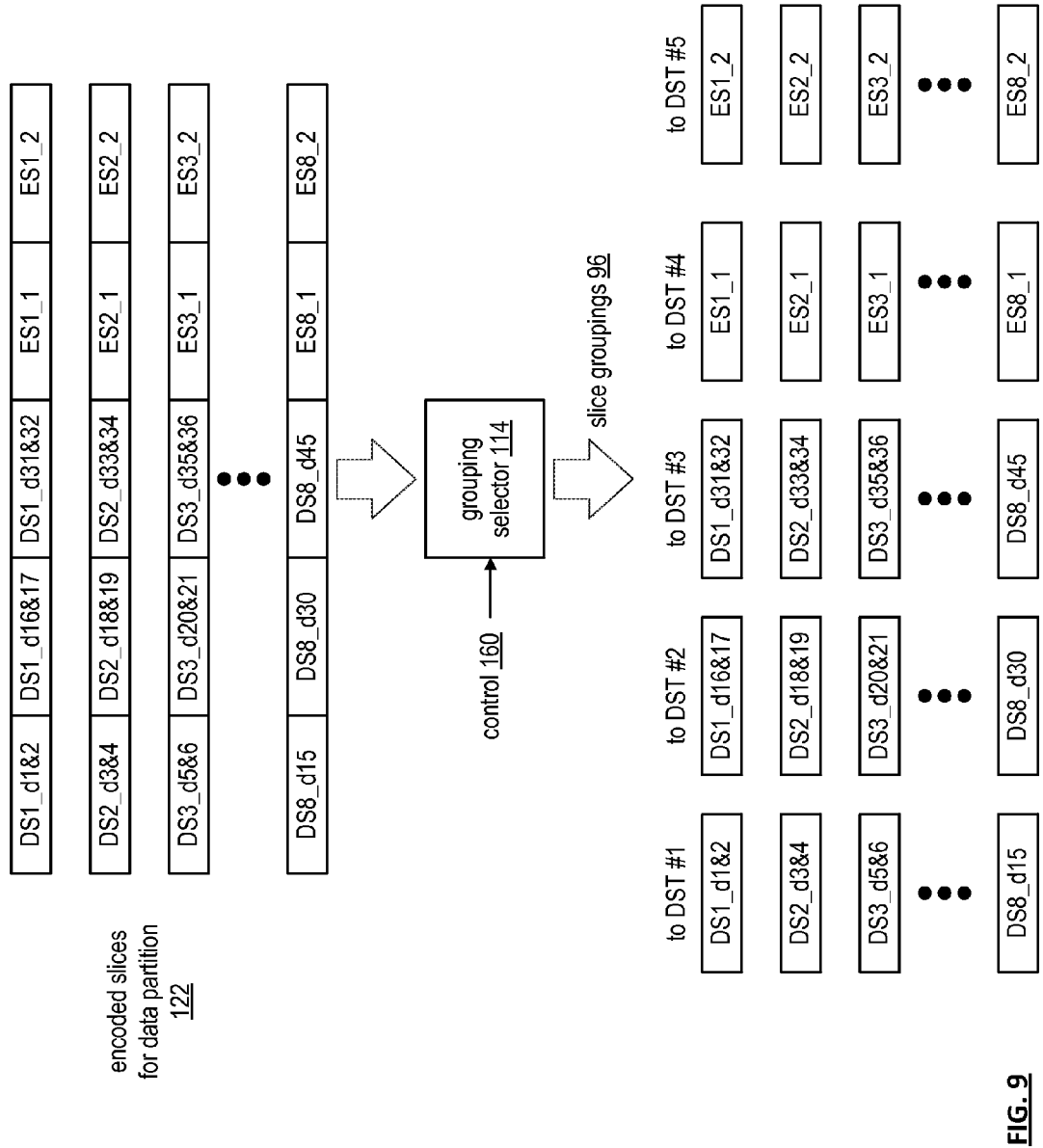
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
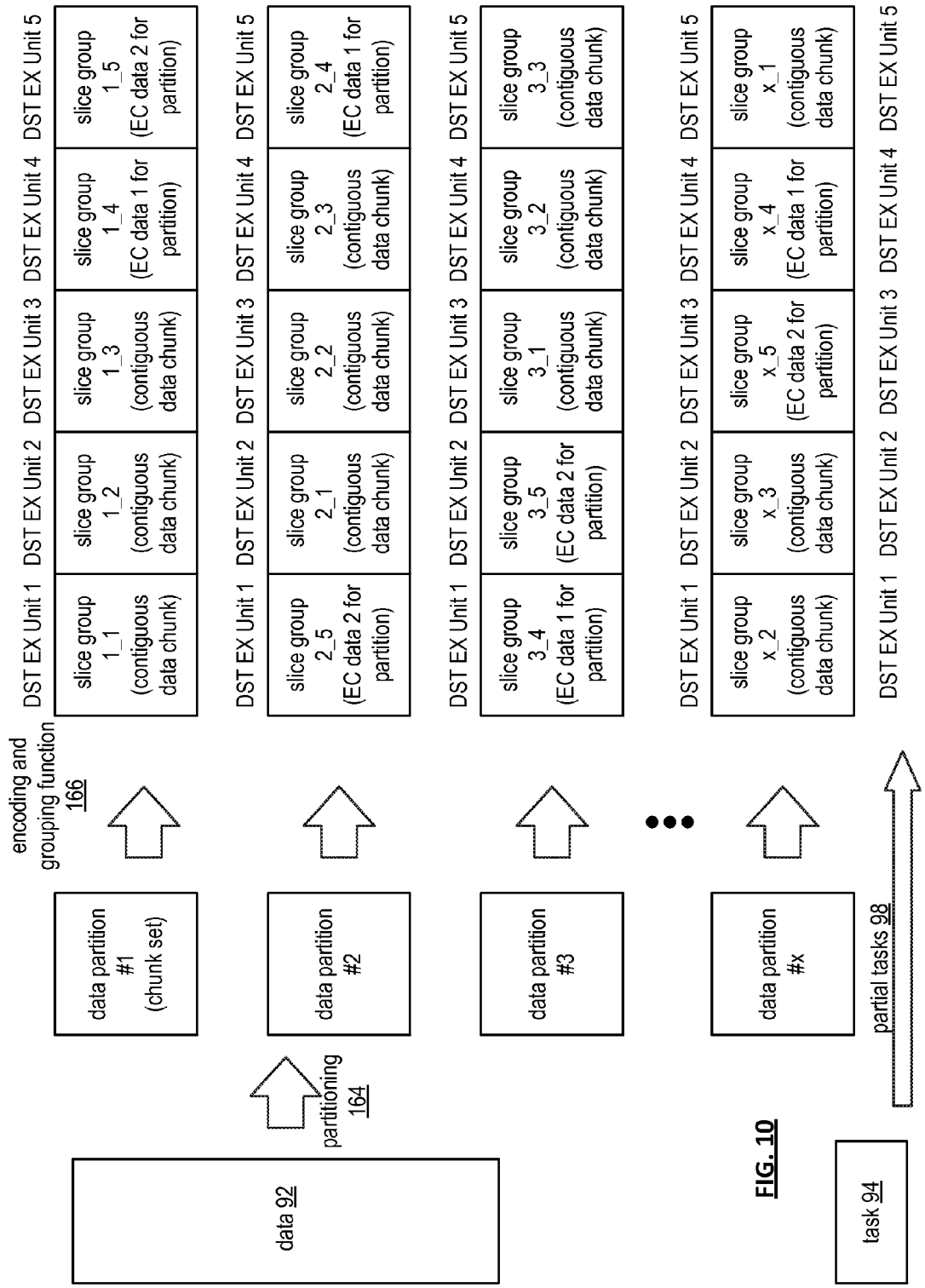
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
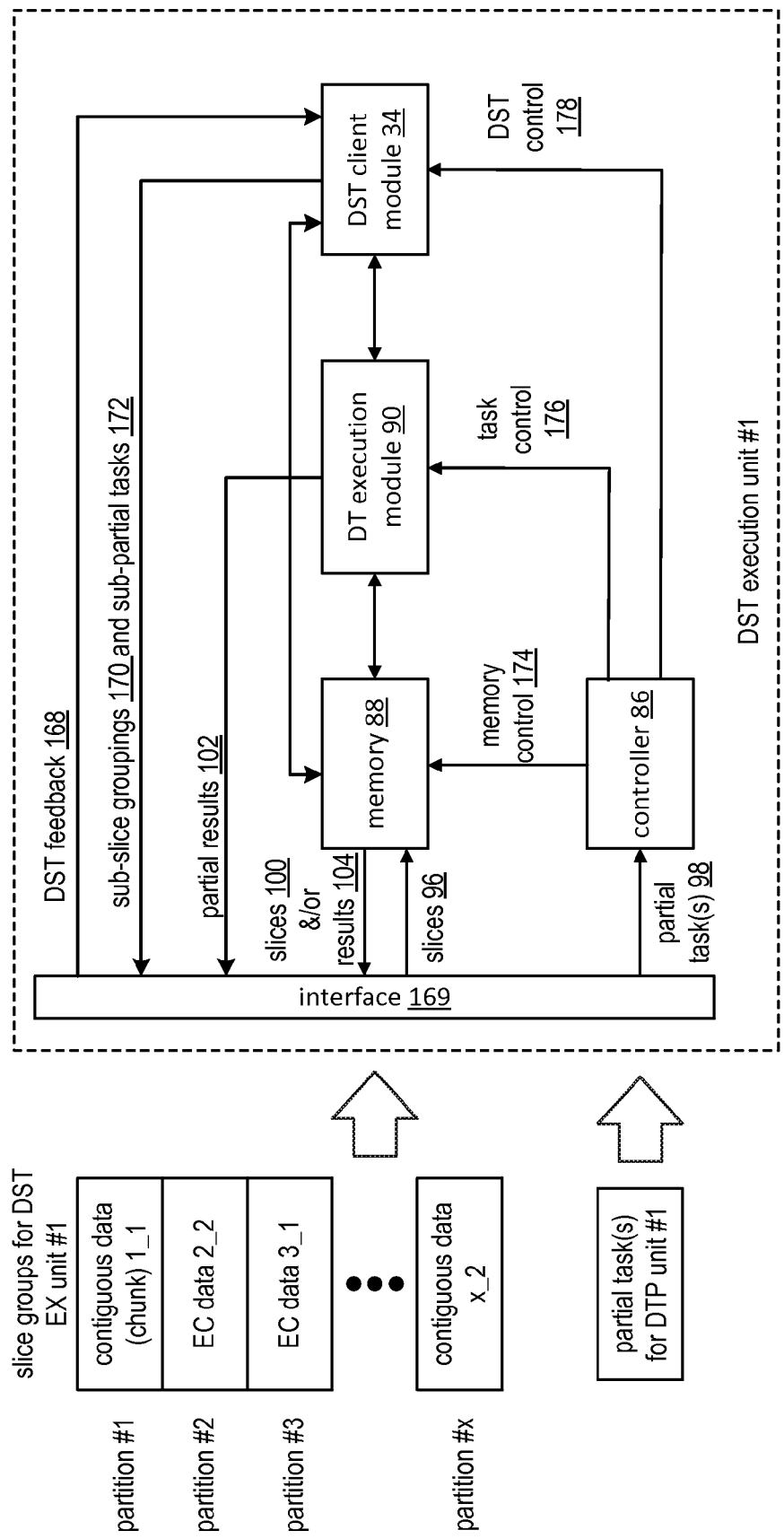
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
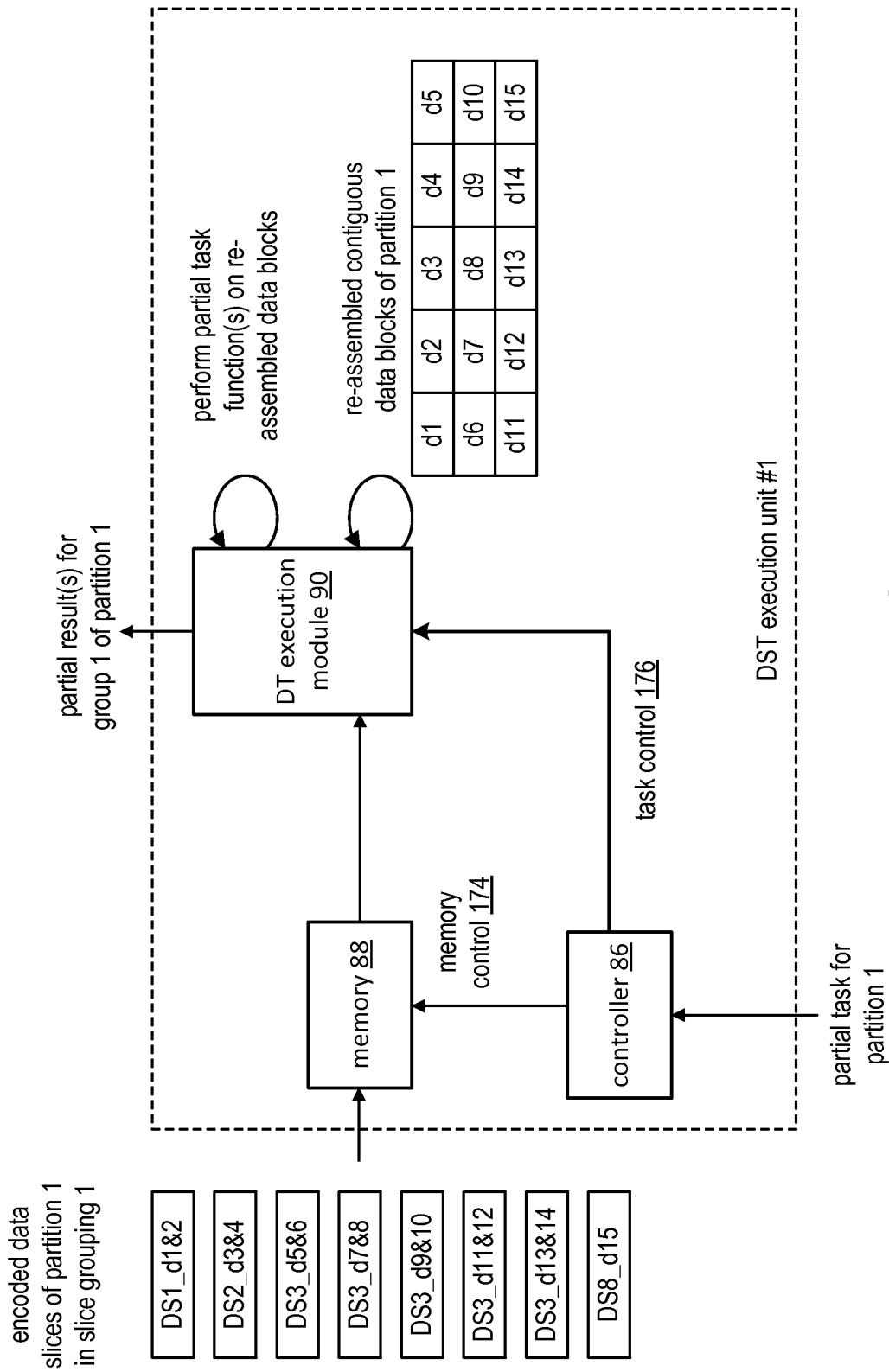
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
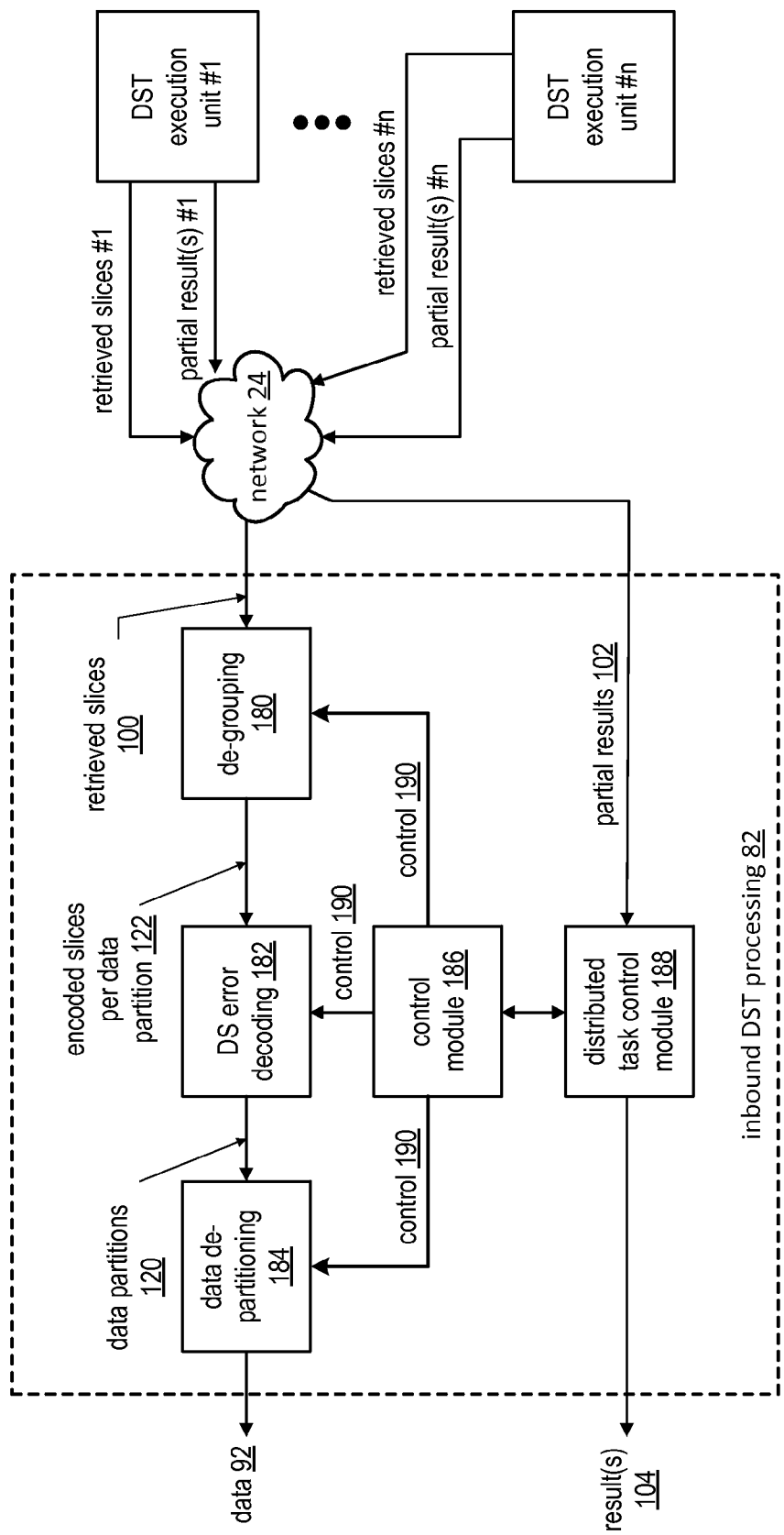
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
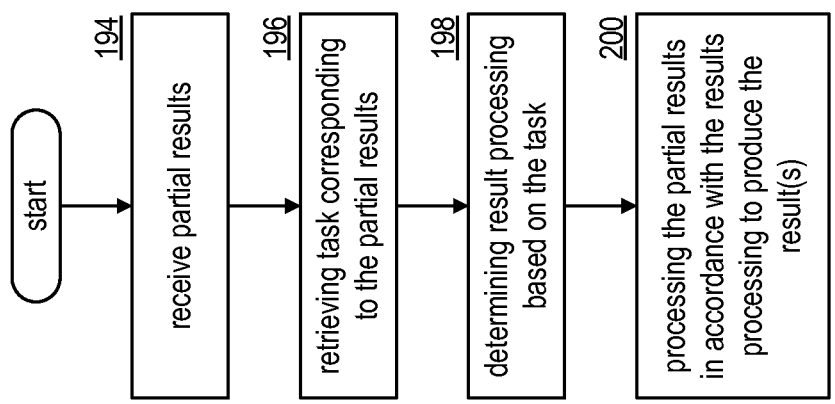
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
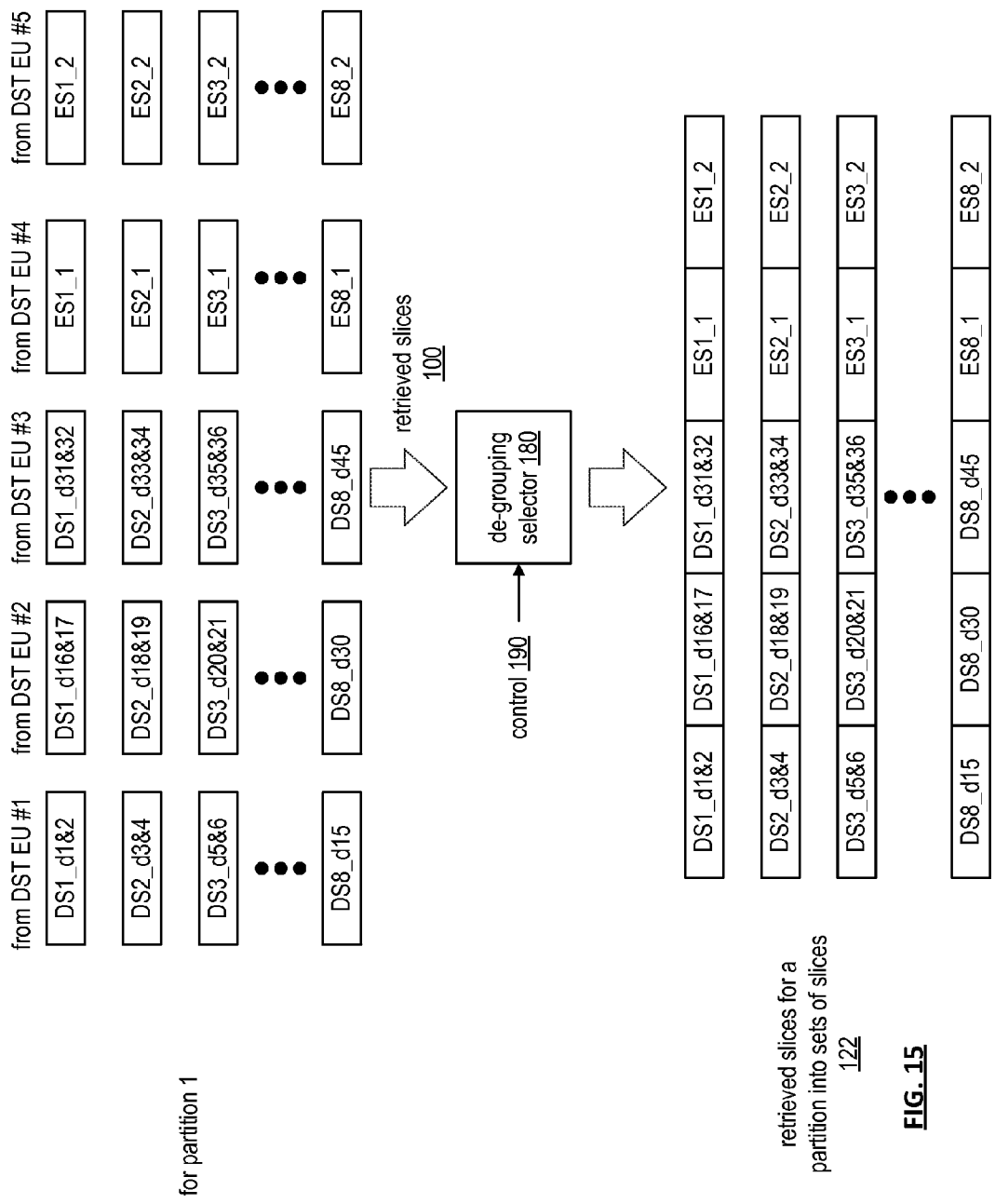
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
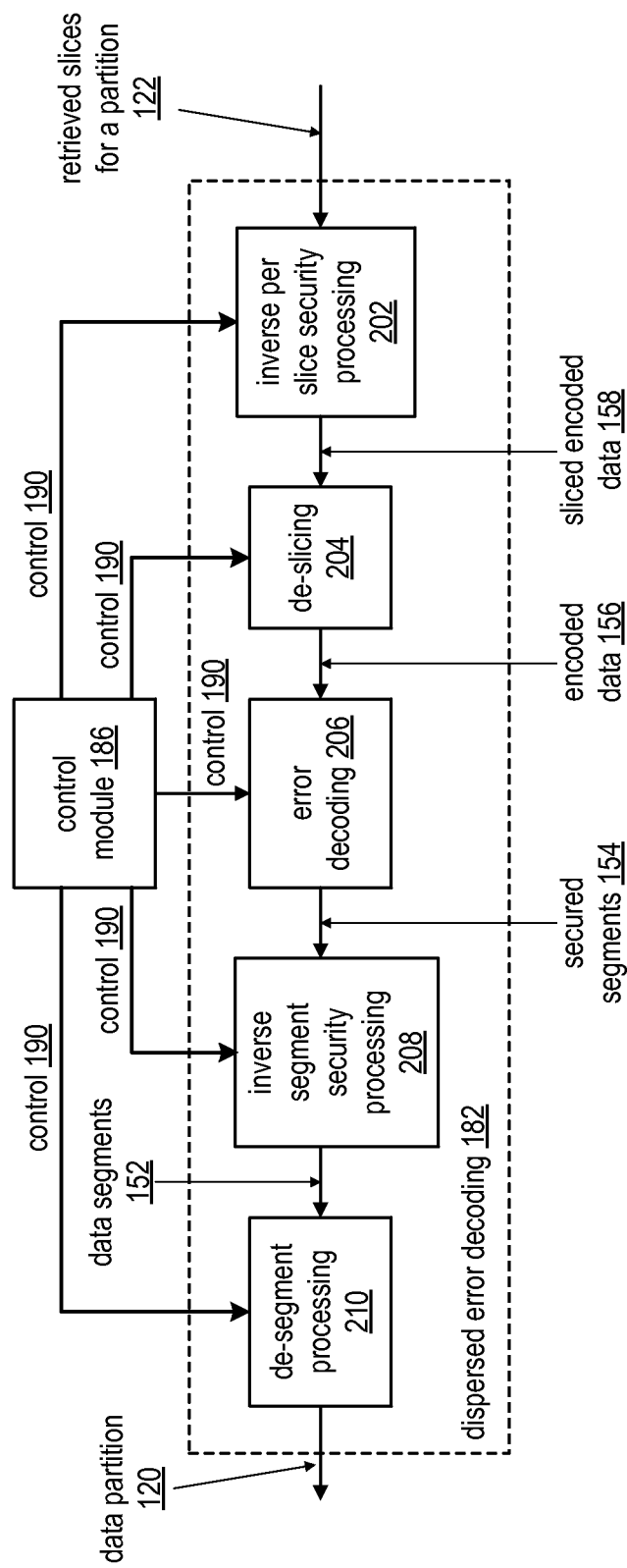
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
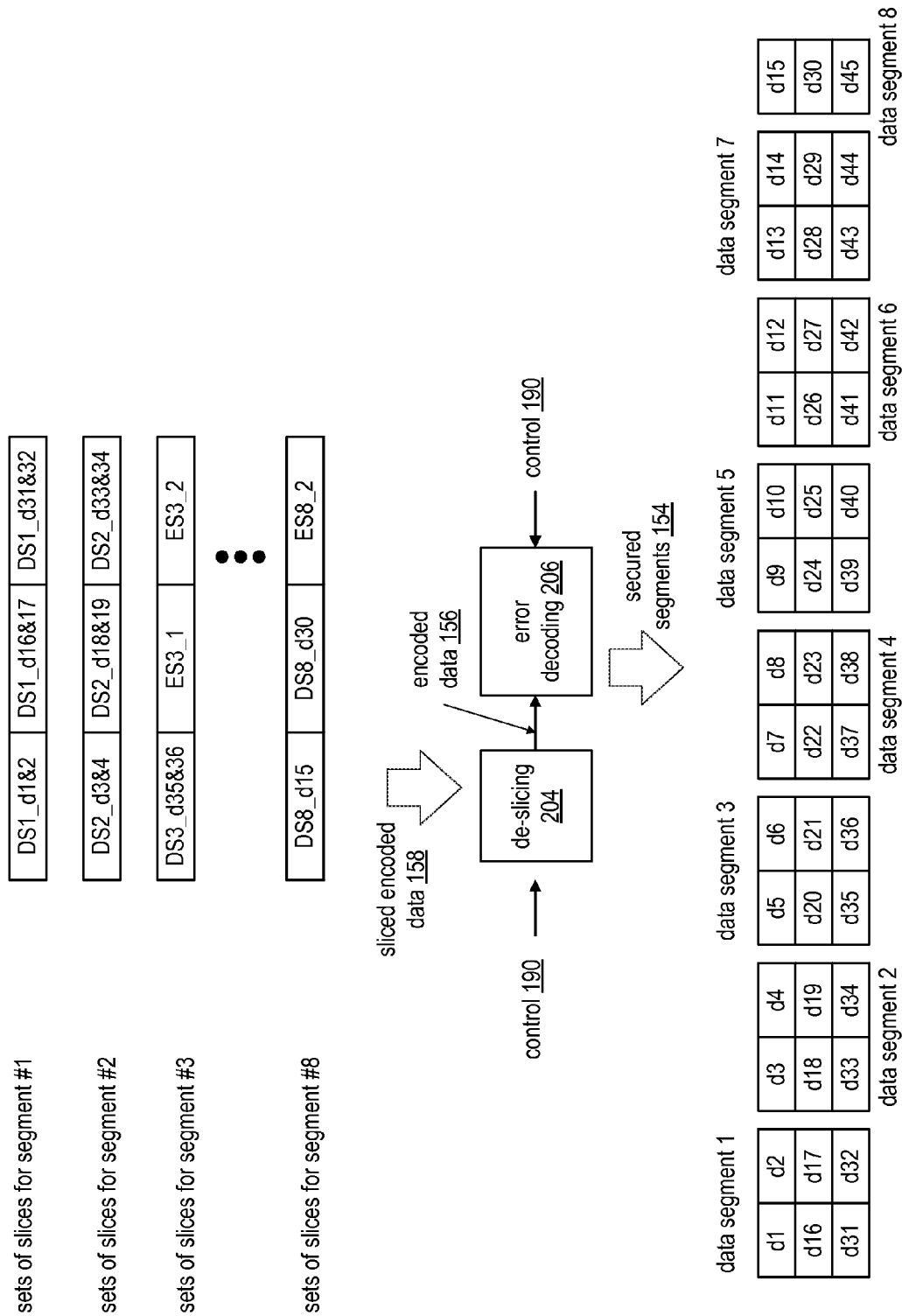
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
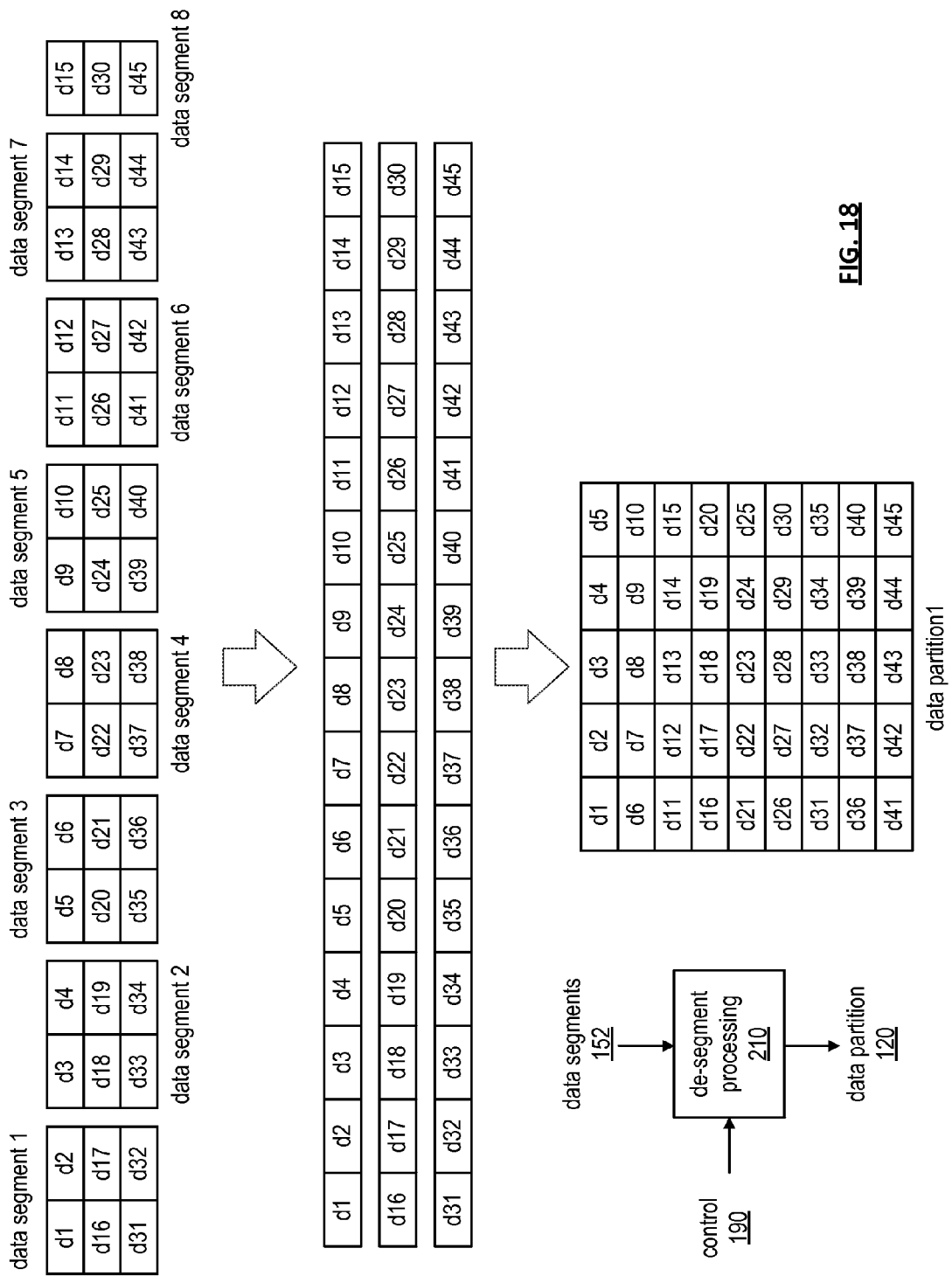
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
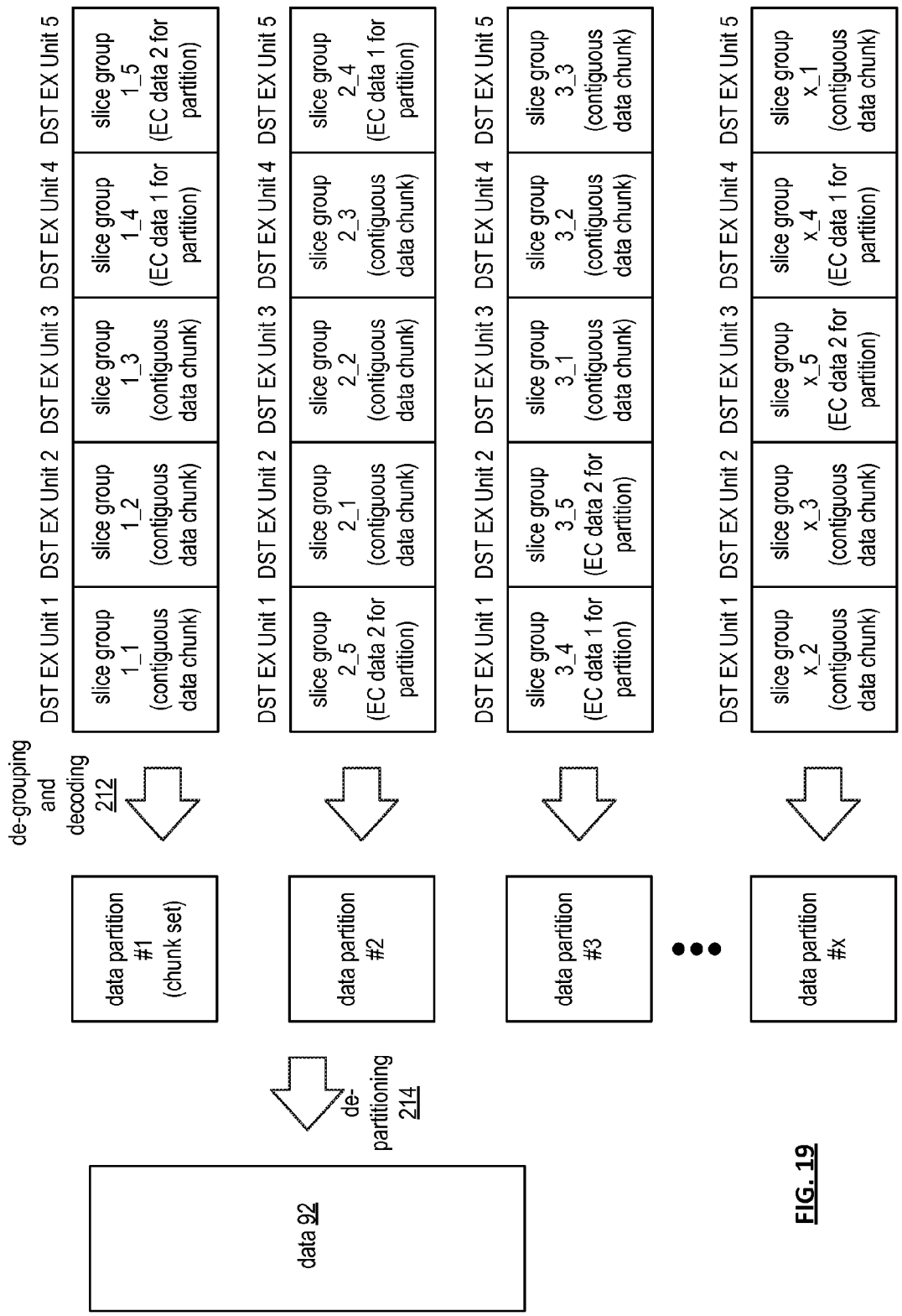
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
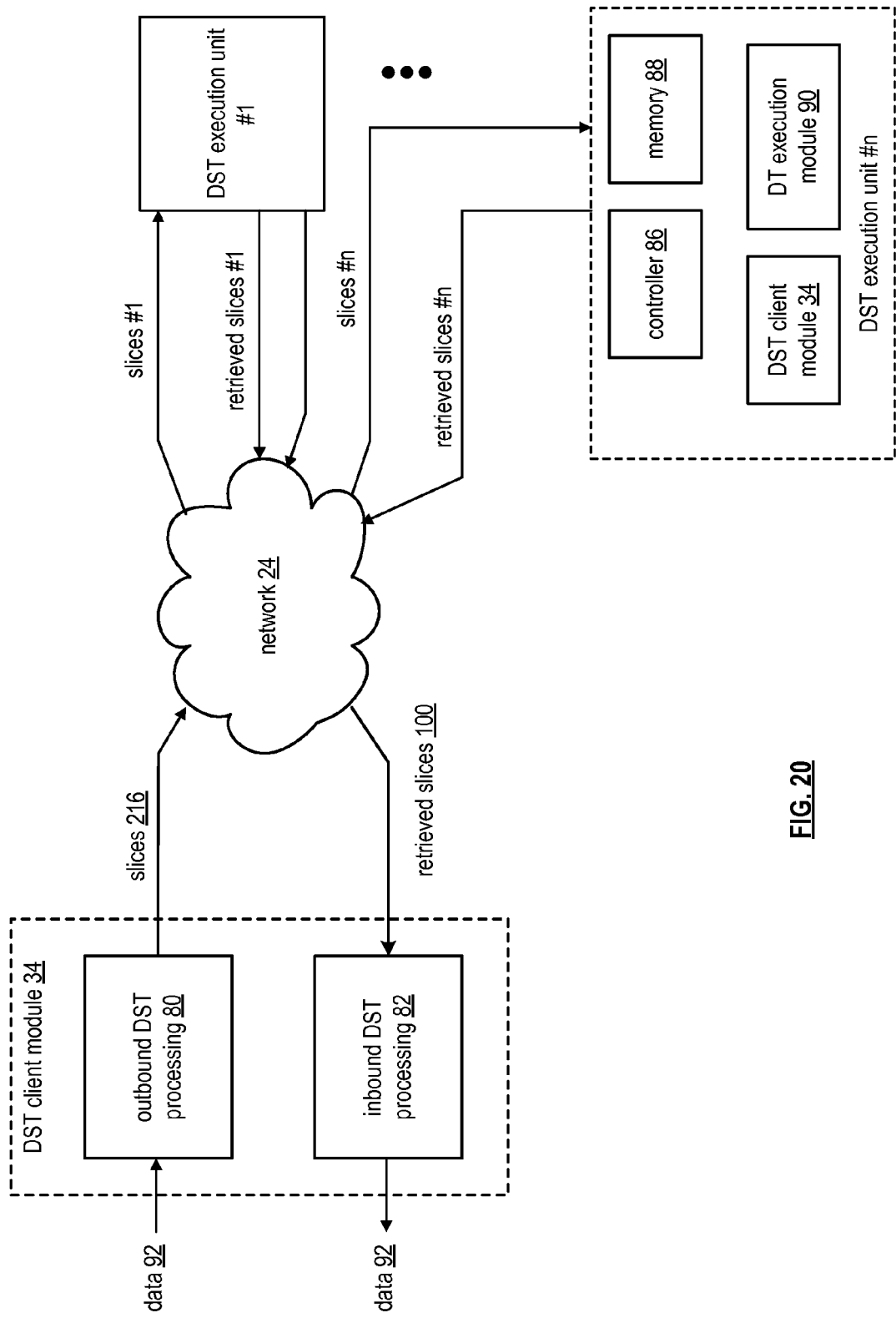
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
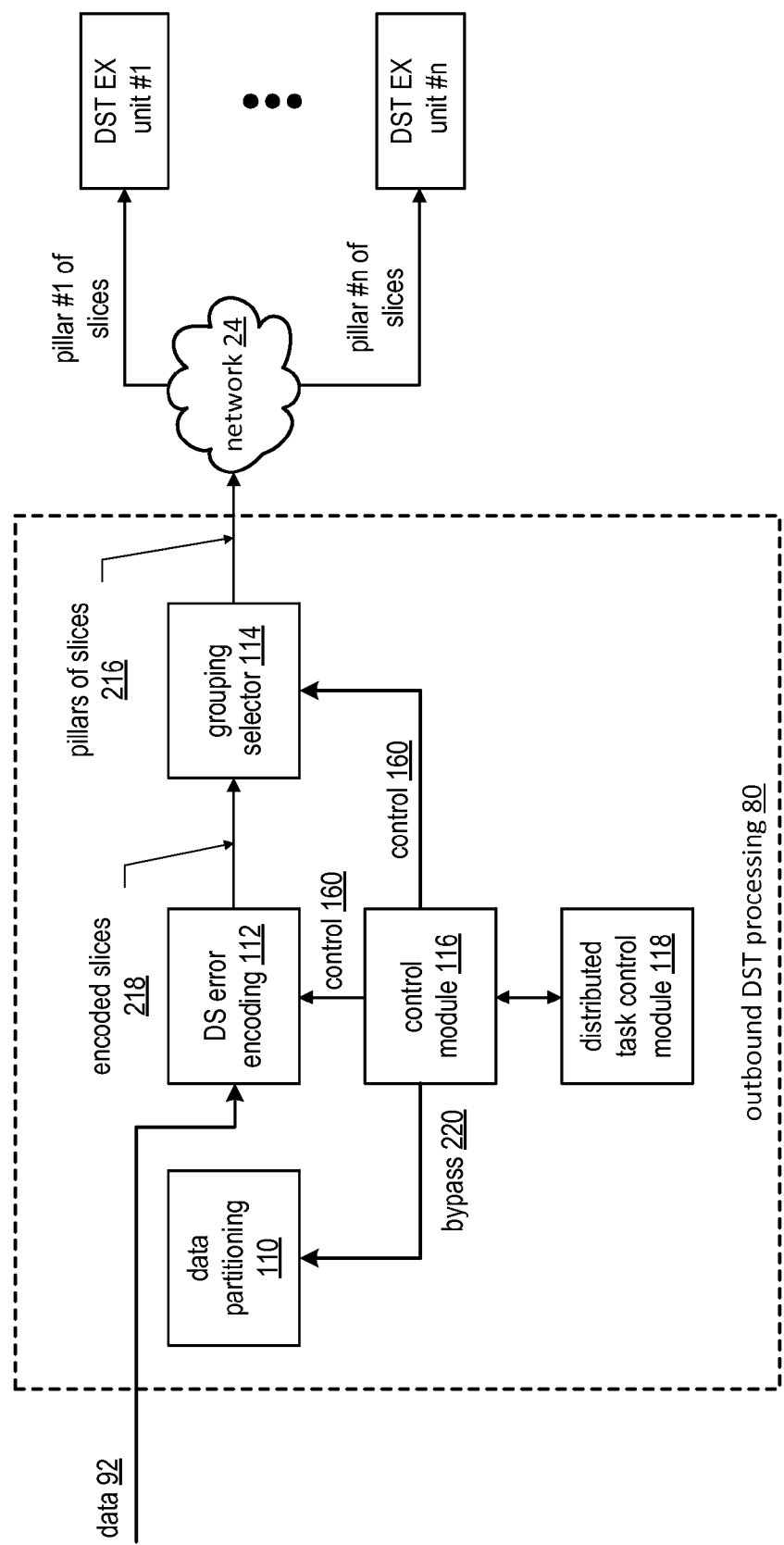
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
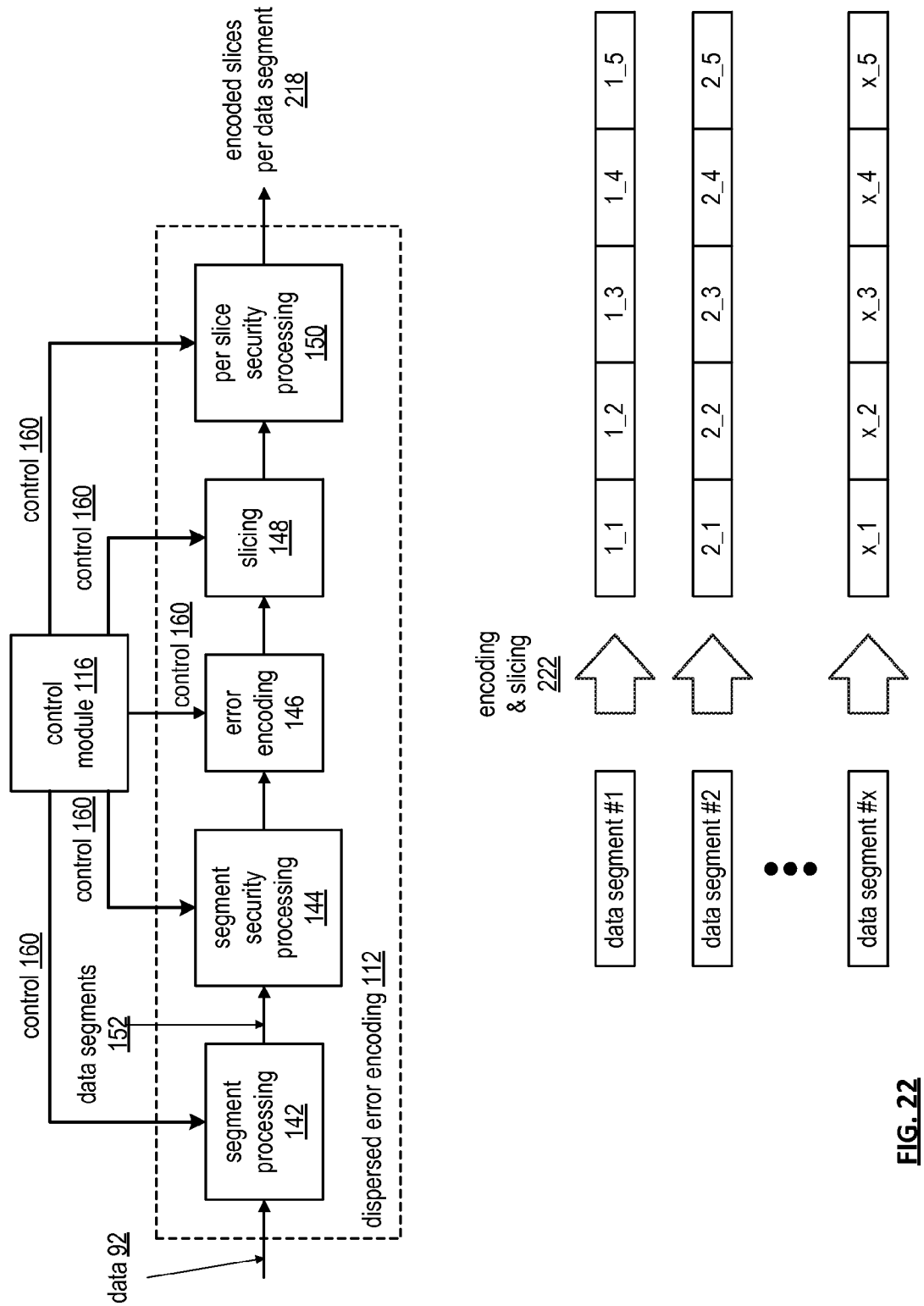
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
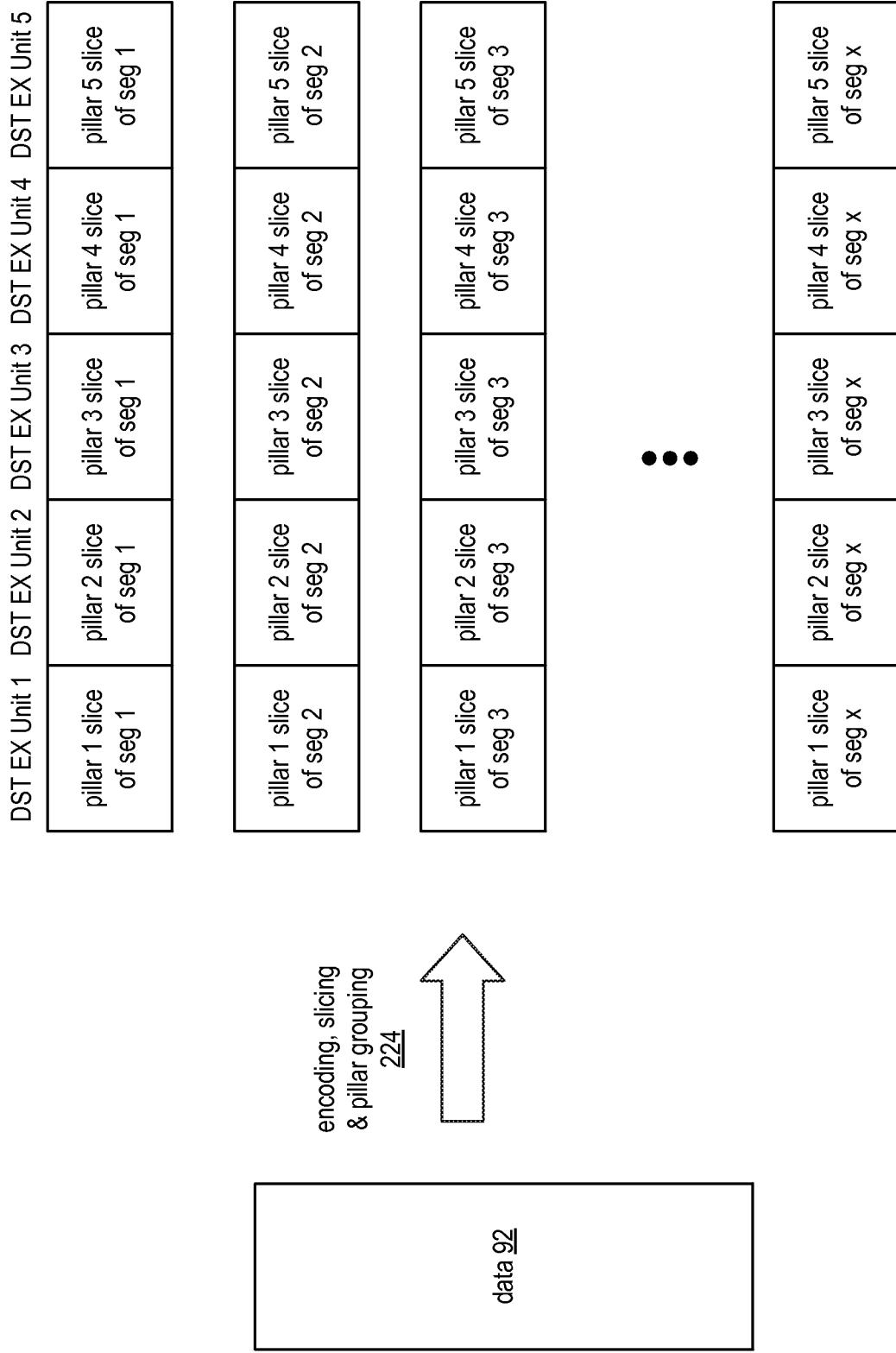
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
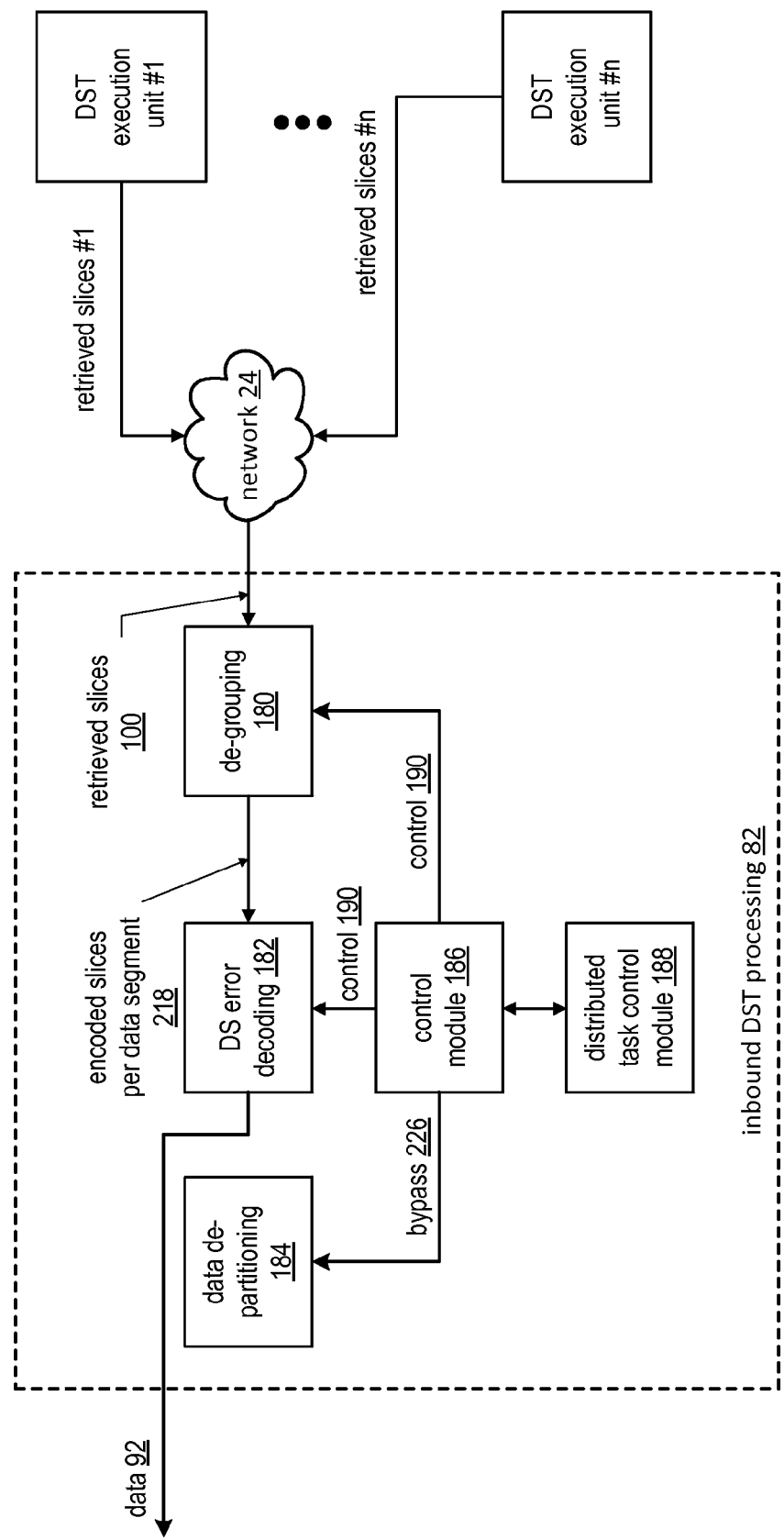
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
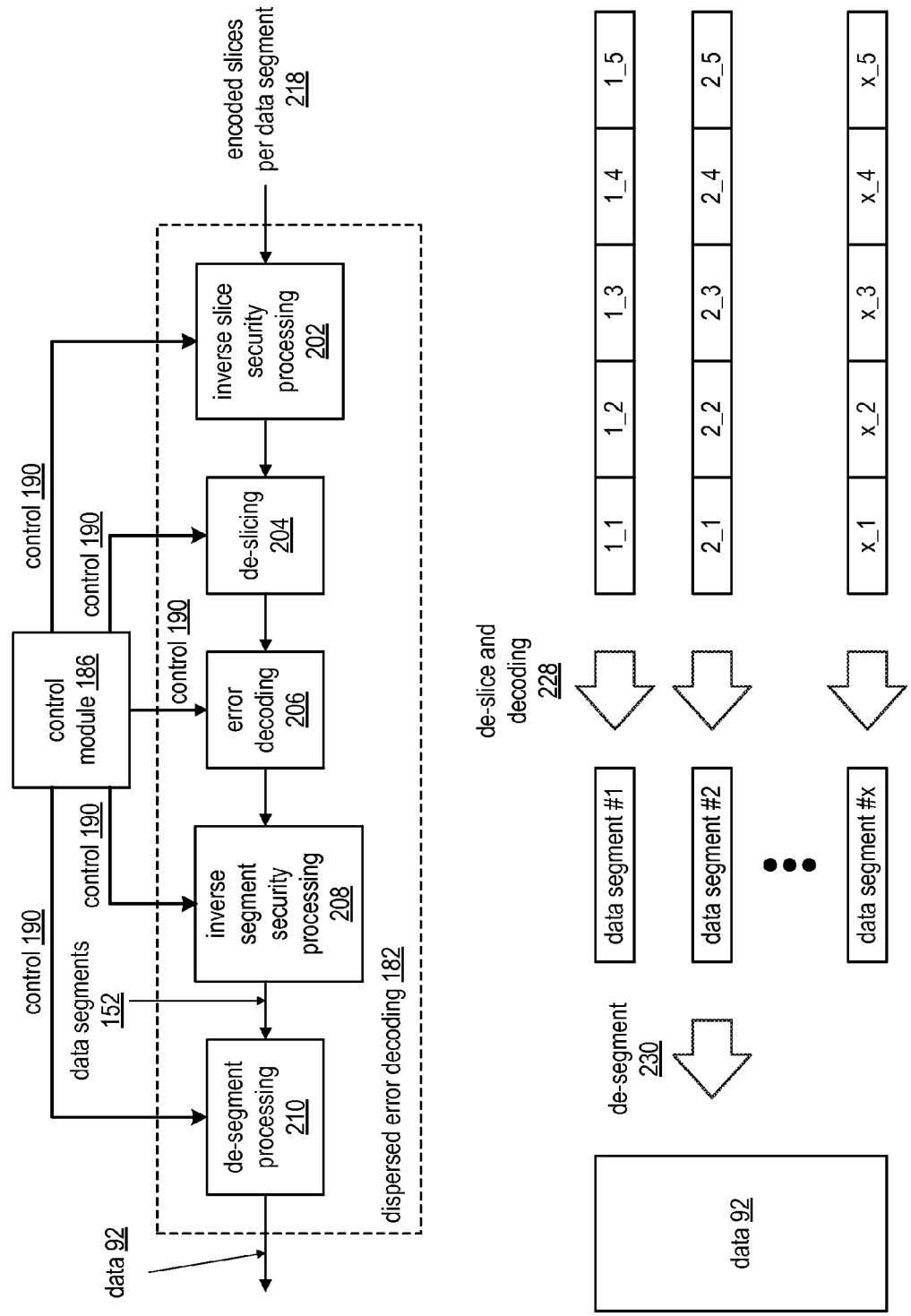
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
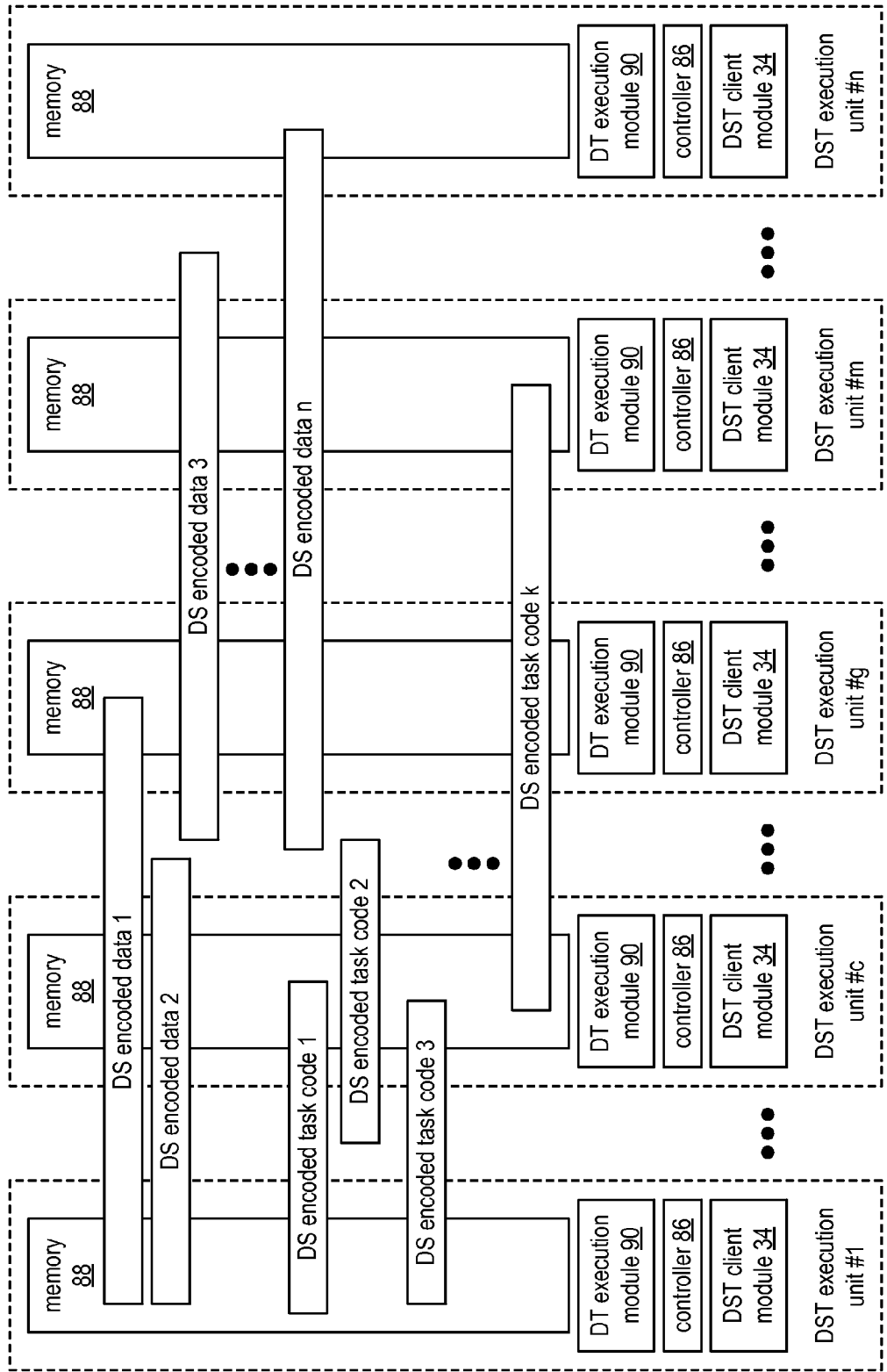
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
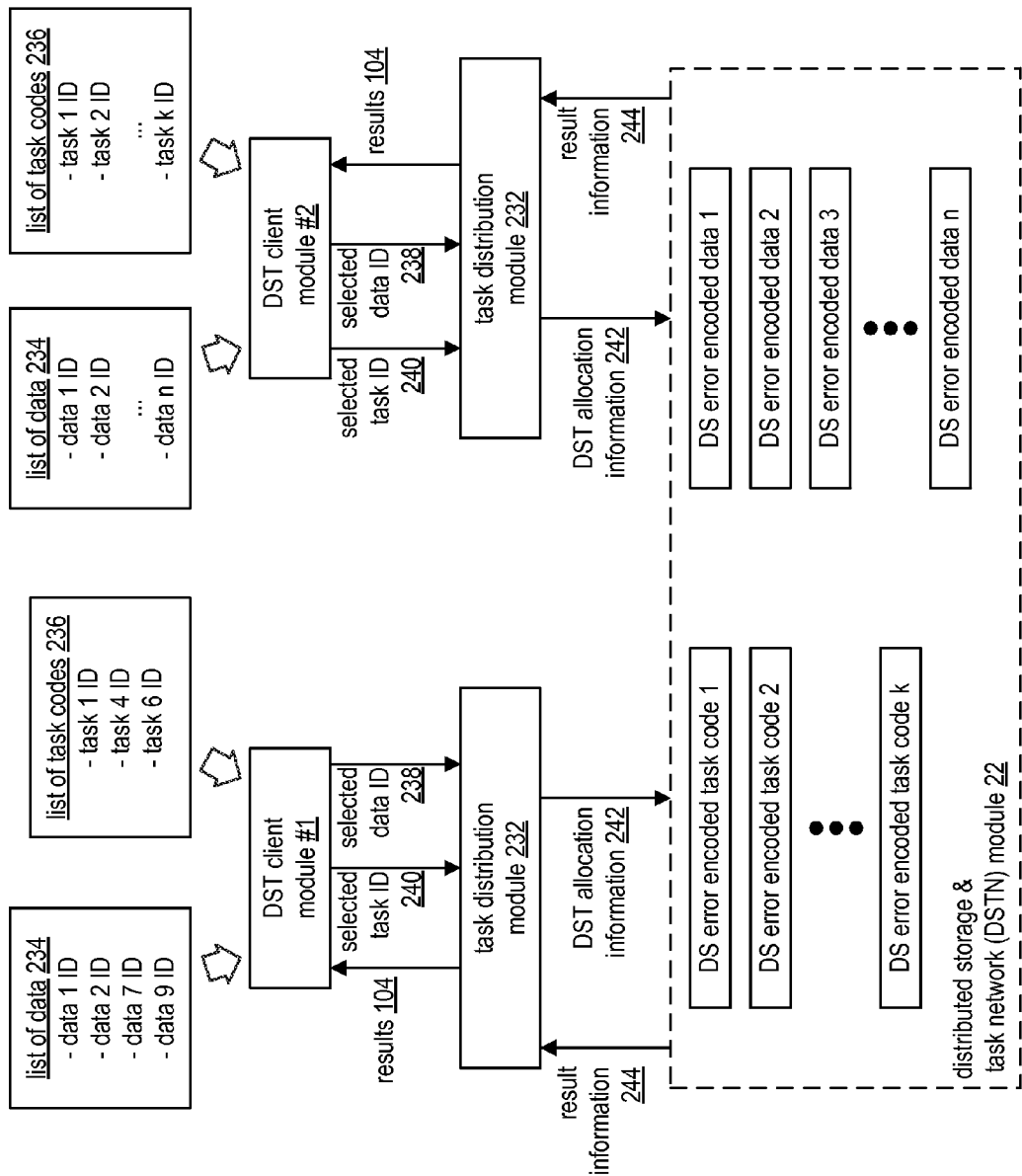
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
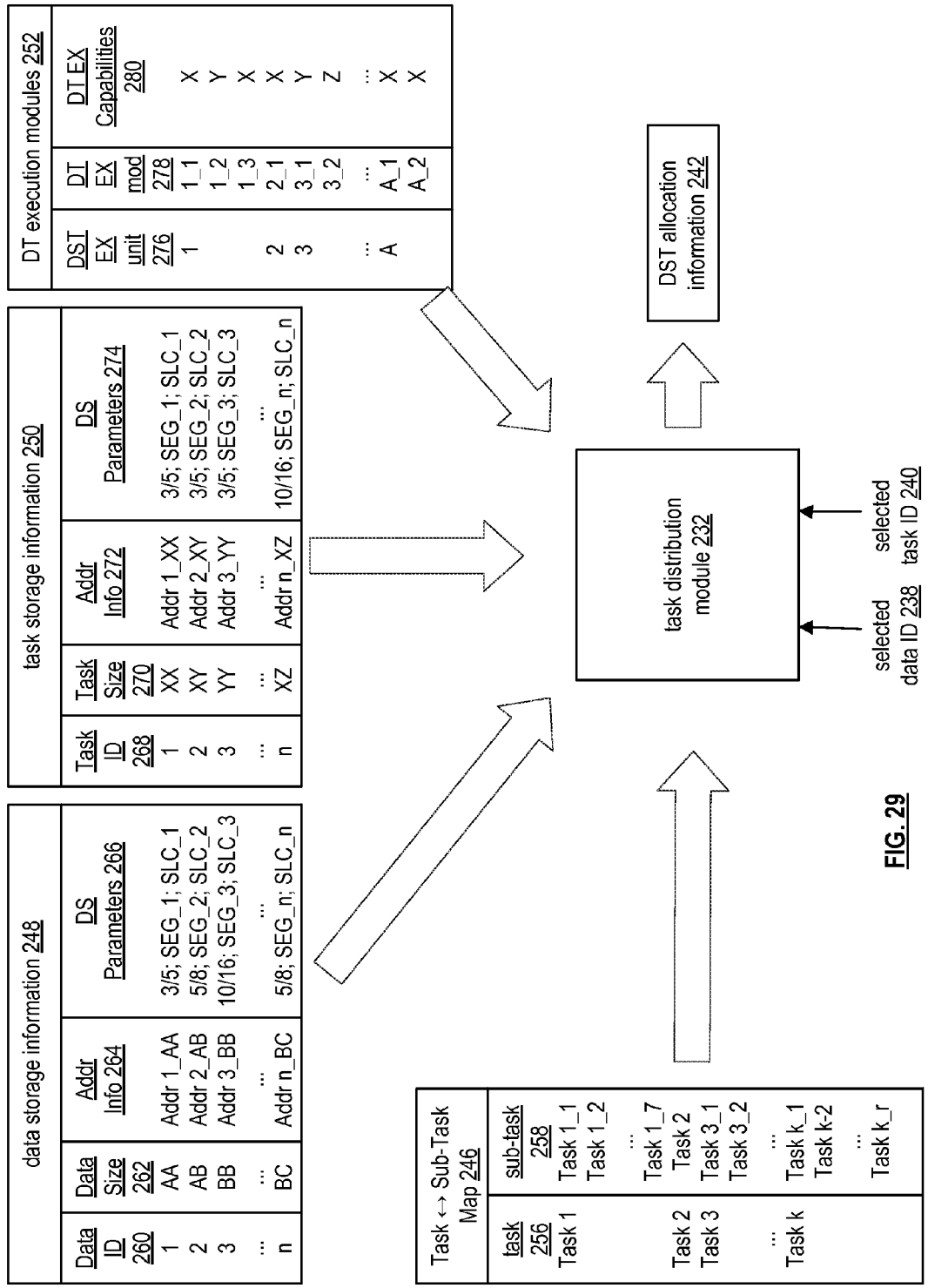
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task⇔sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
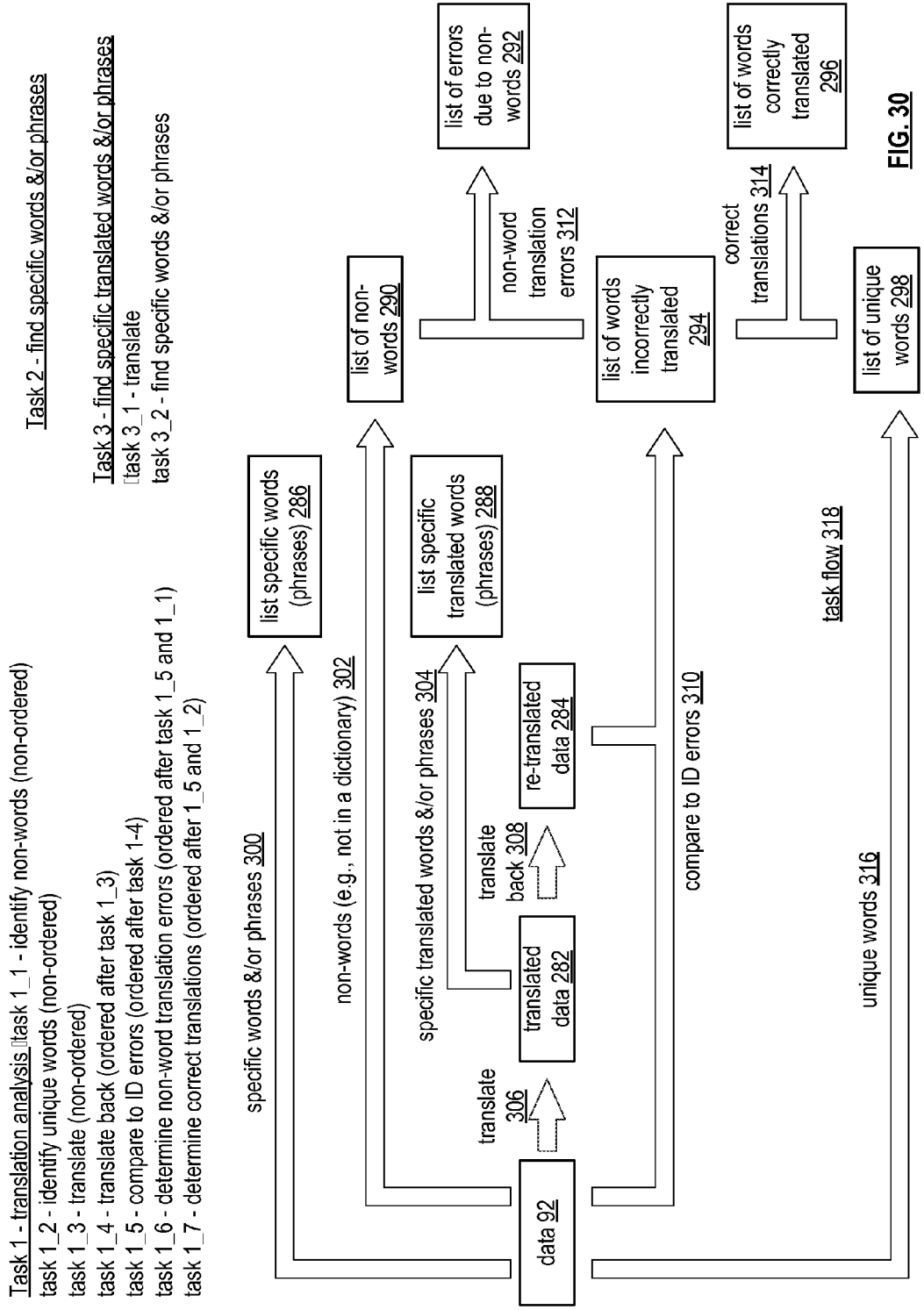
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4-translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
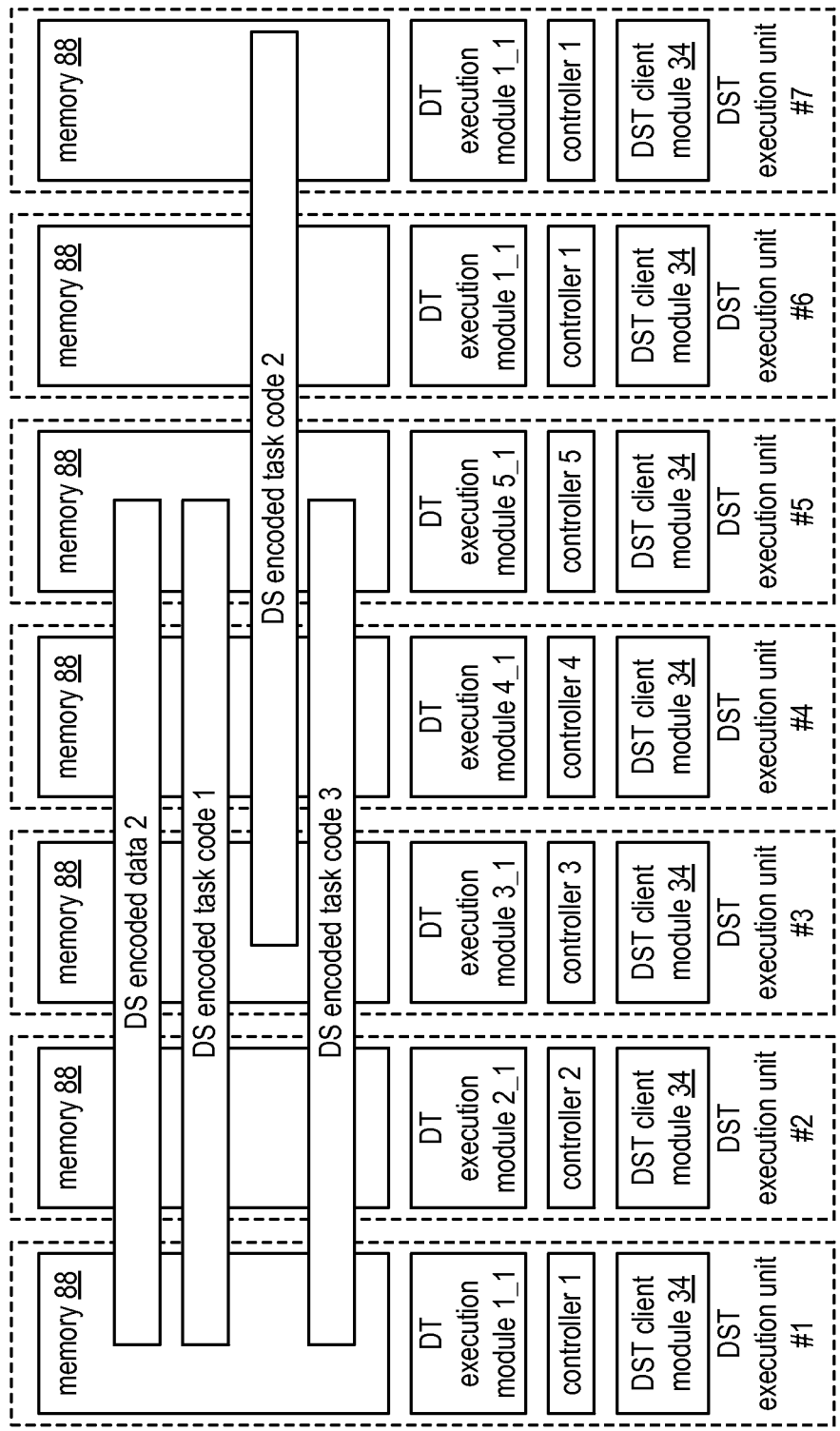
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

Figure 33:
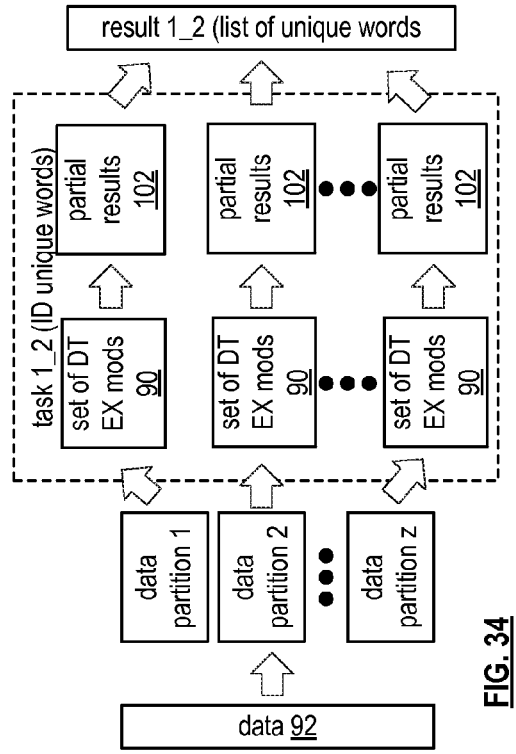

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

Figure 34:
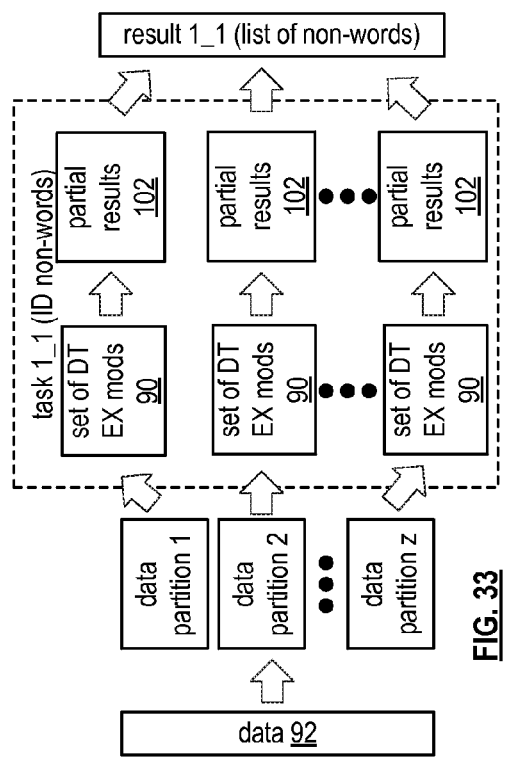

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

Figure 35:
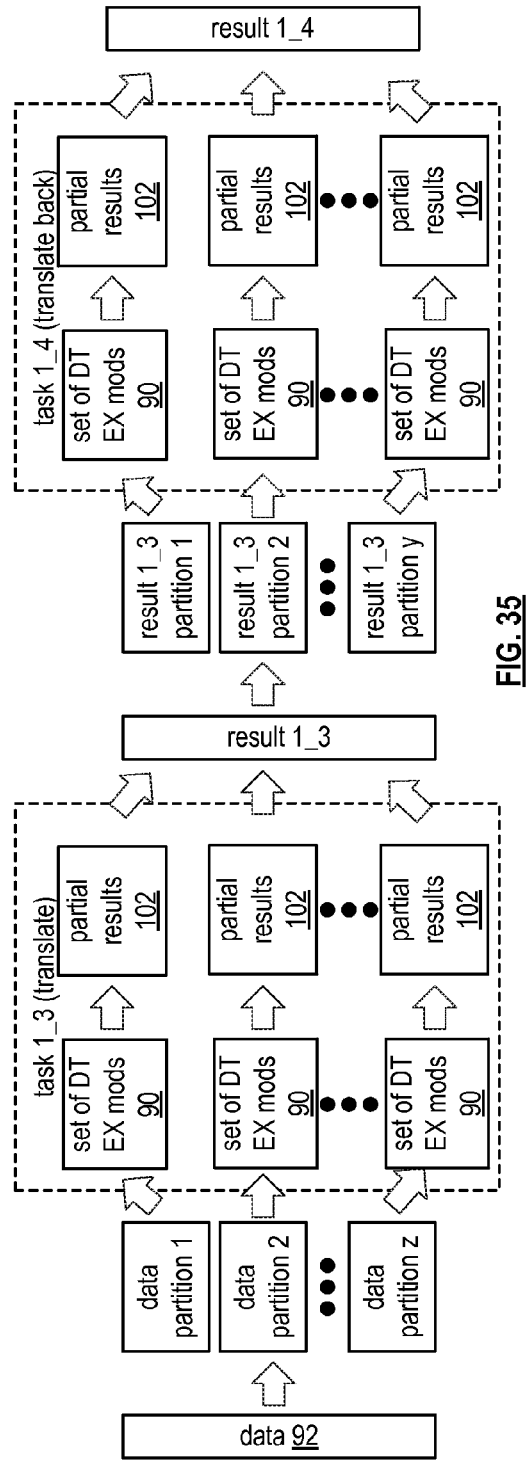

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
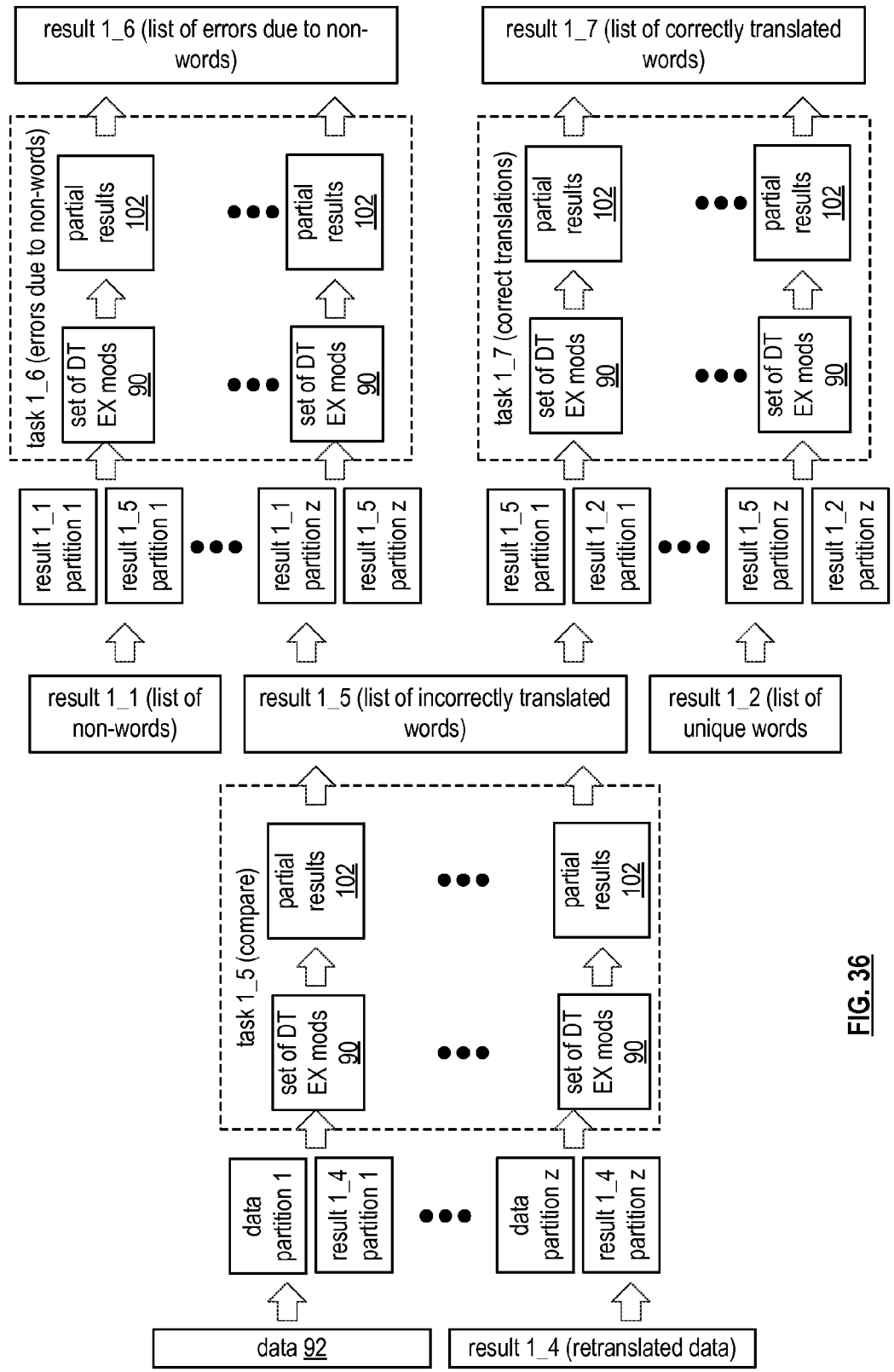

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1st through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., 1st through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
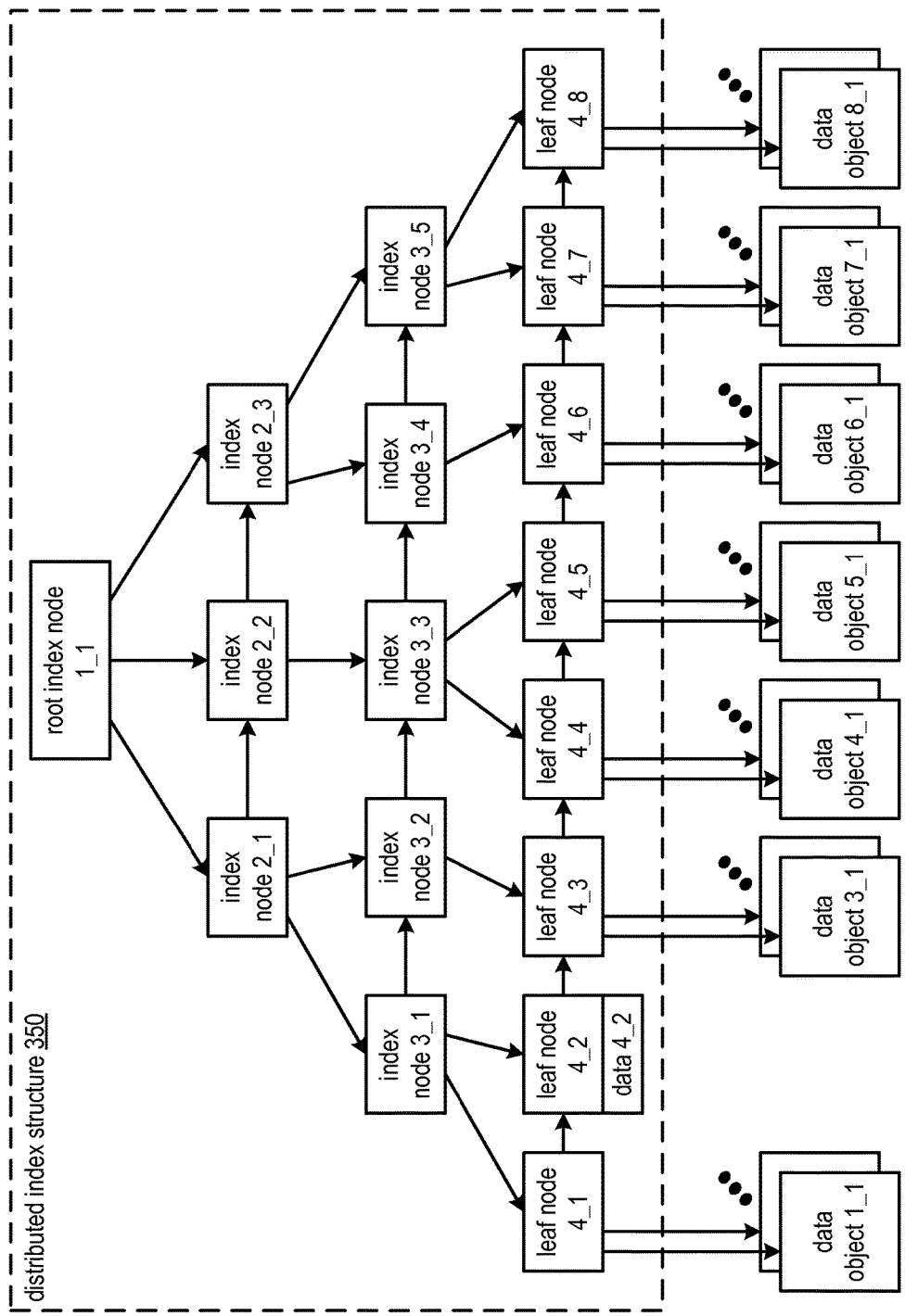
FIG. 40A is a diagram illustrating an example of an index structure in accordance with the present invention.

FIG. 40A is a diagram illustrating an example of a distributed index structure 350 of one or more indexes utilized to access a data object of one or more data objects 1_1 through 1_w, 3_1 through 3_w, 4_1 through 4_w, etc., where at least some of the one or more data objects are stored in at least one of a distributed storage and task network (DSTN) and a dispersed storage network (DSN), and where a data object of the one or more data objects is dispersed storage error encoded to produce a plurality sets of encoded data slices, and where the plurality of sets of encoded data slices are stored in the DSN (e.g., and/or DSTN) utilizing a common source name (e.g., DSN address). The source name provides a DSTN and/or DSN address including one or more of a vault identifier (ID) (e.g., such a vault ID associates a portion of storage resources of the DSN with one or more DSN user devices), a vault generation indicator (e.g., identify a vault generation of one or more of generations), and an object number that corresponds to the data object (e.g., a random number assigned to the data object when the data object is stored in the DSN).

The distributed index structure 350 includes at least two nodes represented in the index structure as nodes associated with two or more node levels. One or more nodes of the at least two nodes of the distributed index structure 350 may be dispersed storage error encoded to produce one or more sets of encoded index slices. The one or more sets of encoded index slices may be stored in at least one of a local memory, a DSN memory, and a distributed storage and task network (DSTN) module. For example, each node of a 100 node distributed index structure are individually dispersed storage error encoded to produce at least 100 sets of encoded index slices for storage in the DSTN module. As another example, the 100 node index structure is aggregated into one index file and the index file is dispersed storage error encoded to produce a set of encoded index slices for storage in the DTSN module.

Each node of the at least two nodes includes at least one of an index node and a leaf node. One index node of the at least two nodes includes a root index node. Alternatively, the distributed index structure 350 includes just one node, wherein the one node is a leaf node and where the leaf node is a root node. The distributed index structure 350 may include any number of index nodes, any number of leaf nodes, and any number of node levels. Each level of the any number of node levels includes nodes of a common node type. For example, all nodes of node level 4 are leaf nodes and all nodes of node level 3 are index nodes. As another example, as illustrated, the distributed index structure 350 includes eight index nodes and eight leaf nodes, where the eight index nodes are organized in three node levels, where a first node level includes a root index node 1_1, a second node level includes index nodes 2_1, 2_2, and 2_3, and a third node level includes index nodes 3_1, 3_2, 3_3, 3_4, and 3_5, and where the eight leaf nodes are organized in a last (e.g., fourth) node level, where the last node level includes leaf nodes 4_1, 4_2, 4_3, 4_4, 4_5, 4_6, 4_7, and 4_8.

Each data object of the one or more data objects is associated with at least one index key per distributed index structure of the one or more distributed indexes, where the index key includes a searchable element of the distributed index and may be utilized to locate the data object in accordance with key type traits. An index key type of an index key includes a category of the index key (e.g. string integer, etc.). An index key type exhibits traits. Each index key is associated with one or more key type traits (e.g., for an associated index structure), where a key type traits includes one or more of a type indicator, a trait indicator, a comparing function (e.g., defining how an associate index key of this type should be compared, such as sorting and/or manipulation, to other such index keys), a serialization function (e.g., encoding function for storage), a de-serialization function (e.g., decoding function for retrieval), and an absolute minimum value of the index key.

Each leaf node of the at least two nodes may be associated with one or more data objects. The association includes at least one of, for each data object of the one or more data objects, storing an index key associated with the data object in the leaf node, storing a source name associated with the data object in the leaf node, and storing the data object in the leaf node. For example, leaf node 4_2 includes a data object 4_2 and an index key associated with data object 4_2. As another example, leaf node 4_3 includes source names associated with data object 3_1 through 3_w and index keys associated with data object 3_1 through 3_w. Each leaf node is associated with a minimum index key, where the minimum index key is a minimum value of one or more index keys associated with the one or more data objects in accordance with the key type traits (e.g., sorted utilizing a comparing function of the key type traits to identify the minimum value).

Each leaf node is a child in a parent-child relationship with one index node, where the one index node is a parent in the parent-child relationship. Each child node has one parent node and each parent node has one or more child nodes. The one index node (e.g., parent node) stores a minimum index key associated with the leaf node (e.g., child node). As such, a parent node stores a minimum index key for each child node of the one or more child nodes. Two index nodes may form a parent-child relationship. In such a parent-child relationship, a parent-child node pair is represented in the index structure with a parent node of the parent-child relationship associated with a parent node level that is one level above in the index structure than a child node level associated with a child node of the parent-child relationship.

A leaf node is a sibling node of another leaf node when a minimum index key associated with the leaf node is ordered greater than a last minimum index key associated with the other leaf node, where the last minimum index key associated with the leaf node is sorted above any other last minimum index keys associated with any other lower order leaf nodes and where the minimum index key associated with the leaf node is ordered less than any other minimum index keys associated with any other higher order leaf nodes. A sibling node of a node is represented in the index structure on a common level with the node and one node position to the right. A last node on the far right of a node level has a no sibling (e.g., null sibling). All other nodes, if any, other than a last far right node, of a common node level have a sibling node. For example, leaf node 4_2 is a sibling node to leaf node 4_1, leaf node 4_3 is a sibling node to leaf node 4_2, etc., leaf node 4_8 is a sibling node to leaf node 4_7 and leaf node 4_8 has no sibling node.

Each index node of the at least two nodes may be associated with one or more child nodes. Such a child node includes at least one of another index node or a leaf node. The association includes, for each child node of the one or more child nodes, storing a minimum index key associated with the child node in the index node and storing a source name associated with the child node in the index node. Each child node is associated with a minimum index key, where the minimum index key is a minimum value of one or more index keys associated with the child node (e.g., the minimum index key is a minimum value of one or more index keys associated with one or more children nodes of the child node or one or more data objects of the child node in accordance with the key type traits, sorted utilizing a comparing function of the key type traits to identify the minimum value when the child node is a leaf node). For example, index node 3_2 includes a minimum index key (e.g., of data object 3_1) and source name associated with leaf node 4_3. As another example, index node 3_3 includes a minimum index key and source name associated with leaf node 4_4 and another minimum index key and another source name associated with leaf node 4_5. As yet another example, index node 2_3 includes a minimum index key and source name associated with index node 3_4 and minimum index key and another source name associated with index node 3_5.

An index node is a sibling node of another index node when a minimum index key associated with the index node is ordered greater than a last minimum index key associated with the other index node, where the last minimum index key associated with the index node is sorted above any other last minimum index keys associated with any other lower order index nodes and where the minimum index key associated with the index node is ordered less than any other minimum index keys associated with any other higher order index nodes. For example, index node 3_2 is a sibling node to index node 3_1, index node 3_3 is a sibling node to index node 3_2, etc., index node 3_5 is a sibling node to index node 3_4 and index node 3_5 has no sibling node.

FIG. 40B is a diagram illustrating an example of an index node structure 352 for an index node that includes index node information 356, sibling node information 358, and children node information 360. Alternatively, there is no sibling node information 358 when the index node has no sibling node. The index node information 356 includes one or more of an index node source name field 362, an index node revision field 364, and a node type field 366. Inclusion and/or use of the index node source name field 362 and the index node revision field 364 is optional.

The sibling node information 358 includes a sibling node source name field 368, a sibling minimum index key field 370, and a sibling key type traits field 372. Inclusion and/or use of the sibling key type traits field 372 is optional. The children node information 360 includes one or more child node information sections 374, 376, etc. corresponding to each child node of the index node. Each child node information section of the one or more child node information sections includes a corresponding child node source name field 378, a corresponding child minimum index key field 380, and a corresponding child key type traits field 382. For example, the corresponding child node source name field 378 of a child 1 node information section 374 includes a child 1 node source name entry. Inclusion and/or use of the corresponding child key type traits field 382 is optional.

The index node source name field 362 may include an index node dispersed storage network (DSN) address 354 entry (e.g., source name) corresponding to a storage location for the index node. The index node revision field 364 may include an index node revision entry corresponding to a revision number of information contained in the index node. Use of the index node revision field 364 enables generating two or more similar indexes while saving each revision of the two or more similar indexes. The node type field 366 includes a node type entry, where the node type entry indicates whether the node is a leaf node or not a leaf node. The node type indicates that the node is not a leaf node when the node is the index node.

The sibling node source name field 368 includes a sibling node source name entry (e.g., sibling node DSN address) corresponding to where a sibling node is stored in a DSN memory and/or a distributed storage and task network (DSTN) module when the index node has the sibling node as a sibling. The sibling node is another index node when the index node has the sibling. The sibling node source name field 368 may include a null entry when the index node does not have a sibling. The sibling minimum index key field 370 includes a sibling of minimum index key corresponding to the sibling node when the index node has the sibling node as the sibling. The sibling key type traits field 372 may include sibling key type traits corresponding to the sibling node when the index node has the sibling node as the sibling and when the sibling key type traits field is utilized. Alternatively, index structure metadata may include key type traits utilized globally for each node of the index structure.

The index structure metadata may include one or more of key type traits to be utilized for all nodes of a corresponding index, key type traits to be utilized for all index nodes of the corresponding index, key type traits to be utilized for all leaf nodes of the corresponding index, a source name of a root node of the index structure, a maximum number of index structure levels, a minimum number of the next level structures, a maximum number of elements per index structure level, a minimum number of elements per index structure level, and index revision number, and an index name. The index structure metadata may be utilized for one or more of accessing the index, generating the index, updating the index, saving the index, deleting portions of the index, adding a portion to the index, cloning a portion of the index, and searching through the index. The index structure metadata may be stored in one or more of a local memory, one or more nodes of the index structure, and as encoded metadata slices in at least one of the DSTN module and the DSN memory.

The child node source name field 378 includes a child node source name entry (e.g., child node DSN address) corresponding to a storage location for the child node. For example, a child 1 node source name field 378 of a child 1 node information section 374 includes a child 1 node source name. The child minimum index key field 380 includes a child minimum index key corresponding to the child node. For example, a child 1 minimum index key field 380 of the child 1 node information section 374 includes a child 1 minimum index key. The child key type traits field 382 may include child key type traits corresponding to the child node when the index node has the child node as the child and when the child key type traits field is utilized. Alternatively, the index structure metadata may include key type traits utilized globally for each node of the index structure.

Figure 40C:
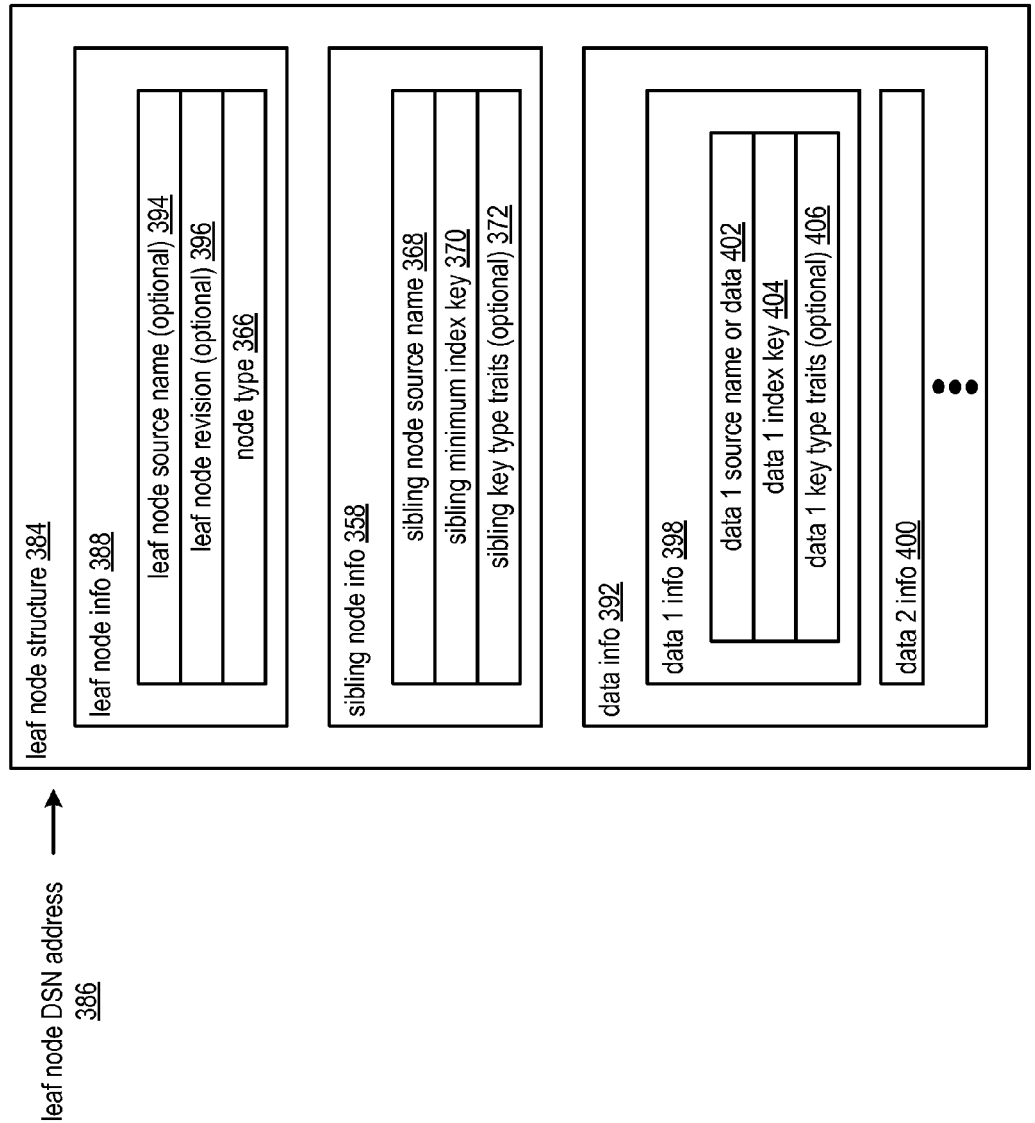
FIG. 40C is a diagram illustrating an example of a leaf node structure in accordance with the present invention.

FIG. 40C is a diagram illustrating an example of a leaf node structure 384 that includes leaf node information 388, sibling node information 358, and data information 392. Alternatively, there is no sibling node information 358 when the leaf node has no sibling node. The leaf node information 388 includes one or more of a leaf node source name field 394, a leaf node revision field 396, and a node type field 366. Inclusion and/or use of the leaf node source name field 394 and the leaf node revision field 396 is optional. The sibling node information 358 includes a sibling node source name field 368, a sibling minimum index key field 370, and a sibling key type traits field 372. Inclusion and/or use of the sibling key type traits field 372 is optional. The data information 392 includes one or more data information sections 398, 400, etc. corresponding to each data object associated with the leaf node. Alternatively, the data information 392 includes null information when no data object is presently associated with the leaf node. Each data information section of the one or more data information sections includes a corresponding data (e.g., data object) source name or data field 402, a corresponding data index key field 404, and a corresponding data key type traits field 406. For example, the corresponding data source name field 402 of a data 1 node information section 398 includes a data 1 source name entry. Inclusion and/or use of the corresponding data key type traits field 406 is optional.

The leaf node source name field 394 may include a leaf node source name entry (e.g., leaf node distributed storage and task network (DSTN) address and/or a dispersed storage network (DSN) address 386) corresponding to a storage location of the leaf node. The leaf node revision field 396 may include a leaf node revision entry corresponding to a revision number of information contained in the leaf node. Use of the leaf node revision enables generating two or more similar indexes while saving each revision of the two or more similar indexes. The node type field 366 includes a node type, where the node type indicates whether the node is a leaf node or not a leaf node. The node type indicates that the node is a leaf node when the node is the leaf node.

The sibling node source name field 368 includes a sibling node source name entry (e.g., sibling node DSN address) corresponding to a storage location for a sibling when the leaf node has the sibling node as a sibling. The sibling node is another leaf node when the leaf node has the sibling. The sibling node source name field 368 may include a null entry when the leaf node does not have a sibling. The sibling minimum index key field 370 includes a minimum index key associated with the sibling node when the leaf node has the sibling node as the sibling. The sibling key type traits field 372 may include sibling key type traits corresponding to the sibling node when the leaf node has the sibling node as the sibling and when the sibling key type traits field 372 is utilized. Alternatively, index structure metadata may include key type traits utilized globally for each leaf node of the index structure.

The data source name or data field 402 includes at least one of a data source name entry (e.g., a DSN address) corresponding to a storage location of data and the data (e.g., a data object, one or more encoded data slices of data). For example, a data 1 source name or data field 402 of a data 1 information section 398 includes a DSN address source name of a first data object. As another example, the data 1 source name or data field 402 of the data 1 information section includes the data 1 data object. The data index key field 404 includes a data index key corresponding to the data. For example, a data 1 index key field order for the data 1 information section 398 includes a data 1 index key. The data key type traits field 406 may include data key type traits corresponding to the data when the data key type traits field 406 is utilized. Alternatively, the index structure metadata may include key type traits utilized globally for each data object associated with the index structure.

Figure 40D:
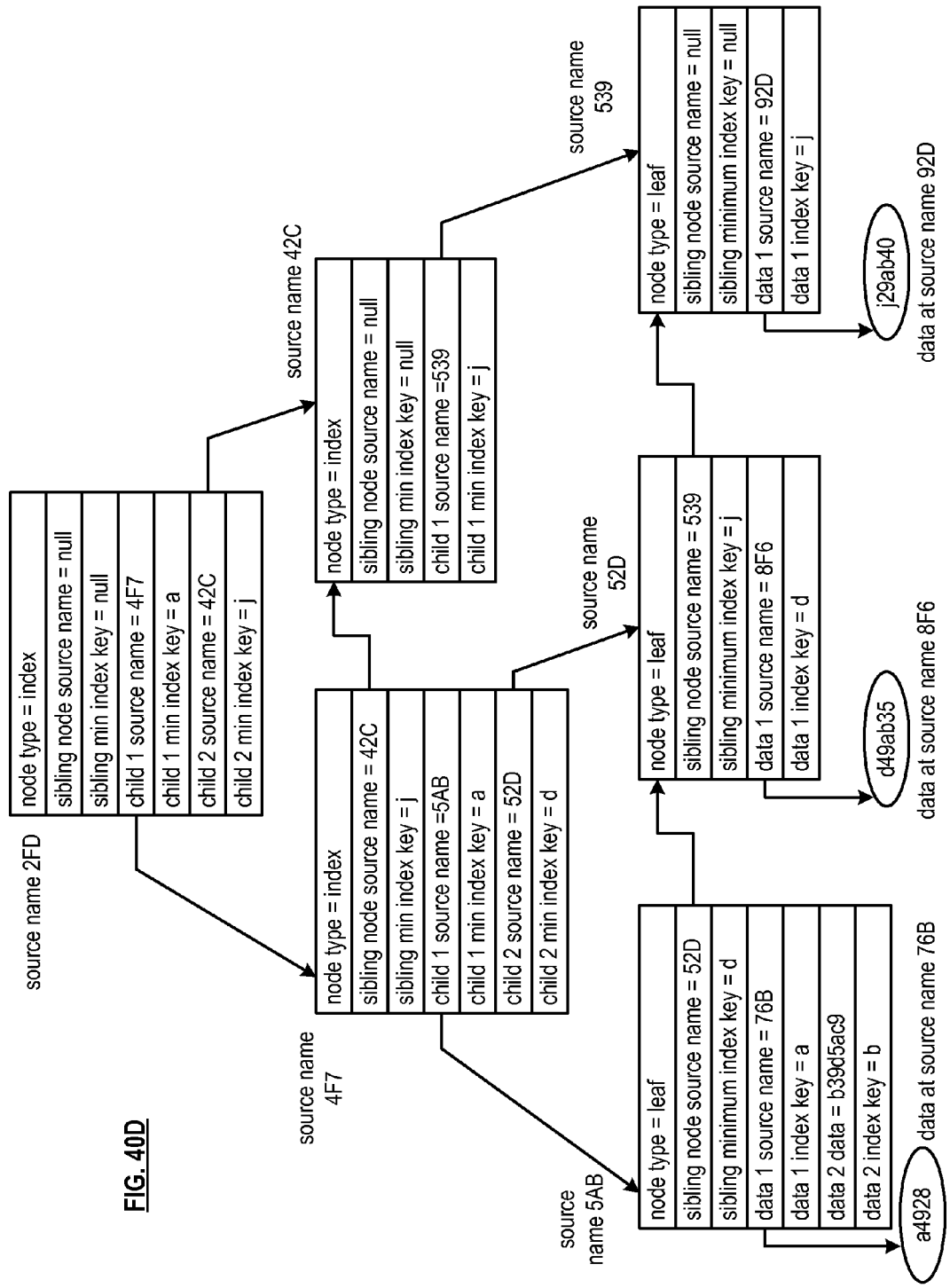
FIG. 40D is a diagram illustrating another example of an index structure in accordance with the present invention.

FIG. 40D is a diagram illustrating another example of an index structure of an example index utilized to access data stored in at least one of a dispersed storage network (DSN) memory and a distributed storage and task network (DSTN) module. In the example, the index structure includes three leaf nodes and three index nodes. Each of the three leaf nodes and the three index nodes are individually encoded using a dispersed storage error coding function to produce a set of corresponding node slices that are stored in the DSTN module. The index structure provides an index for three data objects stored in the DSTN module, where the data objects stored in the DSTN module utilizing source names 76B, 8F6, and 92D, and global key type traits includes a comparing function to sort string type index keys alphabetically. The data stored at source name 76B is associated with an index key of "a" as that data begins with a character "a". The data stored at source name 8F6 is associated with an index key of "d" as that data begins with a character "d". The data stored at source name 92D is associated with an index key of "j" as that data begins with a character "j".

A leaf node stored at source name 5AB includes a node type indicating a leaf node, a sibling node source name pointing to a leaf node stored at source name 52D, a sibling minimum index key of "d", a data 1 source name of 76B, a data 1 index key of "a", a data 2 direct data entry (e.g., b39d5ac9), and a data 2 index key of "b". The leaf node stored at source name 52D includes a node type indicating a leaf node, a sibling node source name pointing to a leaf node stored at source name 539, a sibling minimum index key of "j", a data 1 source name of 8F6, and a data 1 index key of "d". The leaf node stored at source name 539 includes a node type indicating a leaf node, a null sibling node source name (e.g., since last leaf node of leaf node level), a null sibling minimum index key, a data 1 source name of 92D, and a data 1 index key of "j".

An index node stored at source name 4F7 includes a node type indicating not a leaf node (e.g., index node), a sibling node source name pointing to an index node stored at source name 42C, a sibling minimum index key of "j", a child 1 source name of 5AB, a child 1 minimum index key of "a", a child 2 source name of 52D, and a child 2 minimum index key of "d". The index node stored at source name 42C includes a node type indicating not a leaf node (e.g., index node), a null sibling node source name (e.g., since last index node of an index node level), a null sibling minimum index key, a child 1 source name of 539, and a child 1 minimum index key of "j". An index node (e.g., a root node) stored at source name 2FD includes a node type indicating not a leaf node (e.g., index node), a null sibling node source name (e.g., since root node), a null sibling minimum index key, a child 1 source name of 4F7, a child 1 minimum index key of "a", a child 2 source name of 42C, and a child 2 minimum index key of "j". An example of utilizing the index in accordance with the index structure to access data is discussed with reference to FIG. 40E.

Figure 40E:
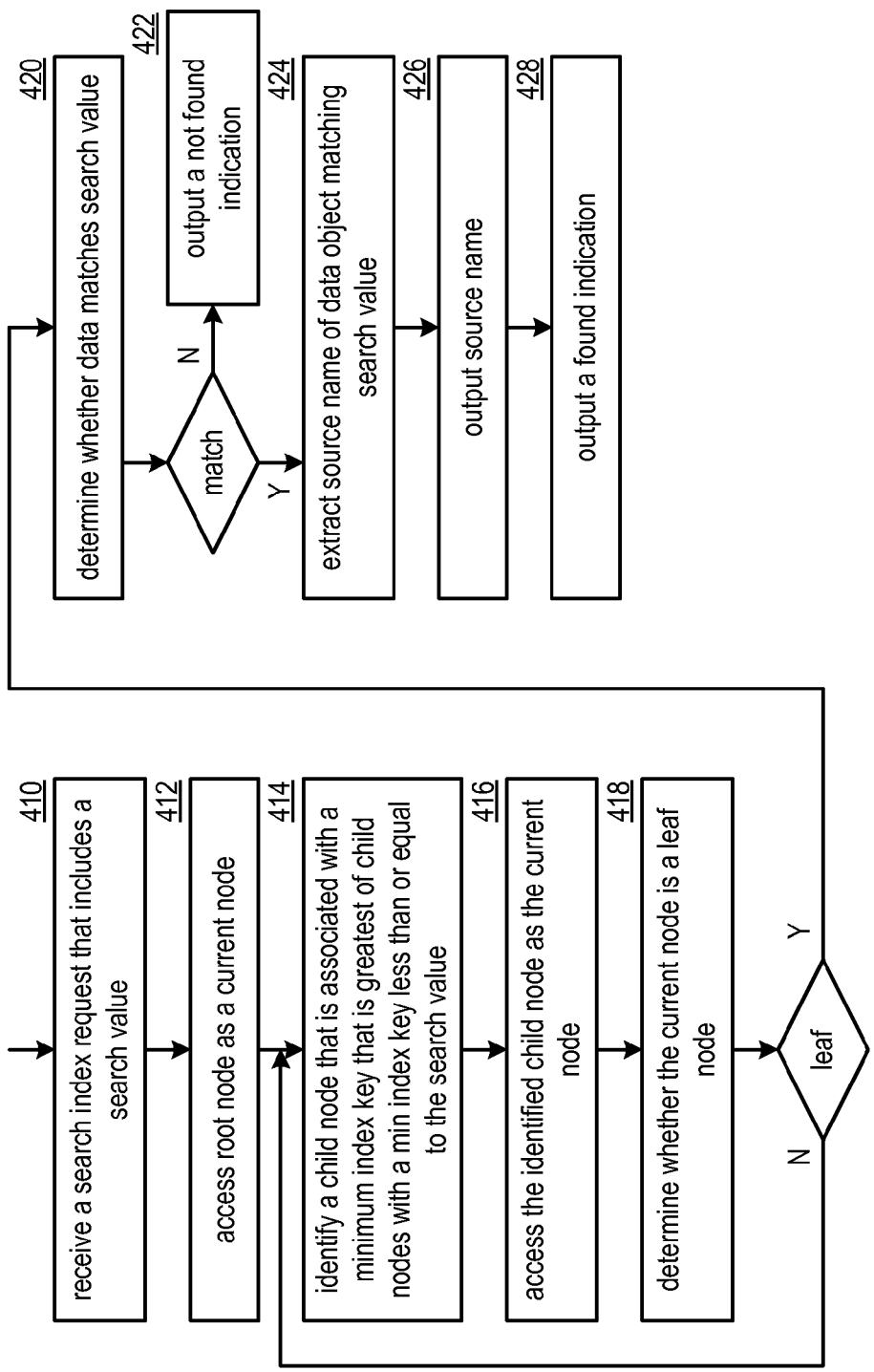
FIG. 40E is a flowchart illustrating an example of searching an index structure in accordance with the present invention.

FIG. 40E is a flowchart illustrating an example of searching an index structure. The method begins at step 410 where a processing module (e.g. of a distributed storage and task (DST) client module) receives a search index request that includes a search value (e.g., from a distributed storage and task network (DSTN) module). The request includes one or more of a search value, a data object identifier (ID), a comparing function, comparing criteria, search criteria, a pathname, an object ID, an index name, an index ID, an index source name, a root node source name, and a user ID.

The method continues at step 412 where the processing module accesses a root node as a current node. For example, the processing module extracts a root node source name from an index metadata lookup and retrieves the root node from the DSTN module utilizing the root node source name. The method continues at step 414 where the processing module identifies a child node that is associated with a minimum index key that is the greatest minimum index key of all child nodes of the current node that are associated with a minimum index key less than or equal to the search value. For example, the processing module identifies all the child nodes of the current node, retrieves a minimum index key associated with each of the child nodes, identifies index keys that are less than the search value as candidate index keys in accordance with the comparing function, identifies the index key of the candidate index keys that has the greatest value in accordance with the comparing function, and identifies the child node associated with the index key of greatest value.

The method continues at step 416 where the processing module accesses the child node as the current node (e.g., retrieves the child node and sets the child node as the current node). The method continues at step 418 where the processing module determines whether the current node is a leaf node. The determination may be based on extracting a node type of the current node and comparing the node type to a value associated with leaf node. The method branches back to step 414 when the processing module determines that the current node is not a leaf node. The method continues to step 420 when the processing module determines that the current node is a leaf node.

The method continues at step 420 where the processing module determines whether data of the current node matches the search value. For example, the processing module compares the search value to the data of the current node. The method branches to step 424 when the processing module determines that the data matches the search value. The method continues to step 422 when the processing module determines that the data does not match the search value. The method continues at step 422 where the processing module outputs an indication that the data was not found (e.g., search failure). For example, the processing module sends the indication to a requesting entity.

The method continues at step 424 where the processing module extracts a source name of a data object matching the search value from the current node. Alternatively, the processing module extracts the data object from the current node when data is stored in the current node rather than a source name of the data object. The method continues at step 426 where the processing module outputs the source name (e.g., to the requesting entity). The method continues at step 428 where the processing module outputs an indication that the data was found (e.g., to the requesting entity).

Figure 41A:
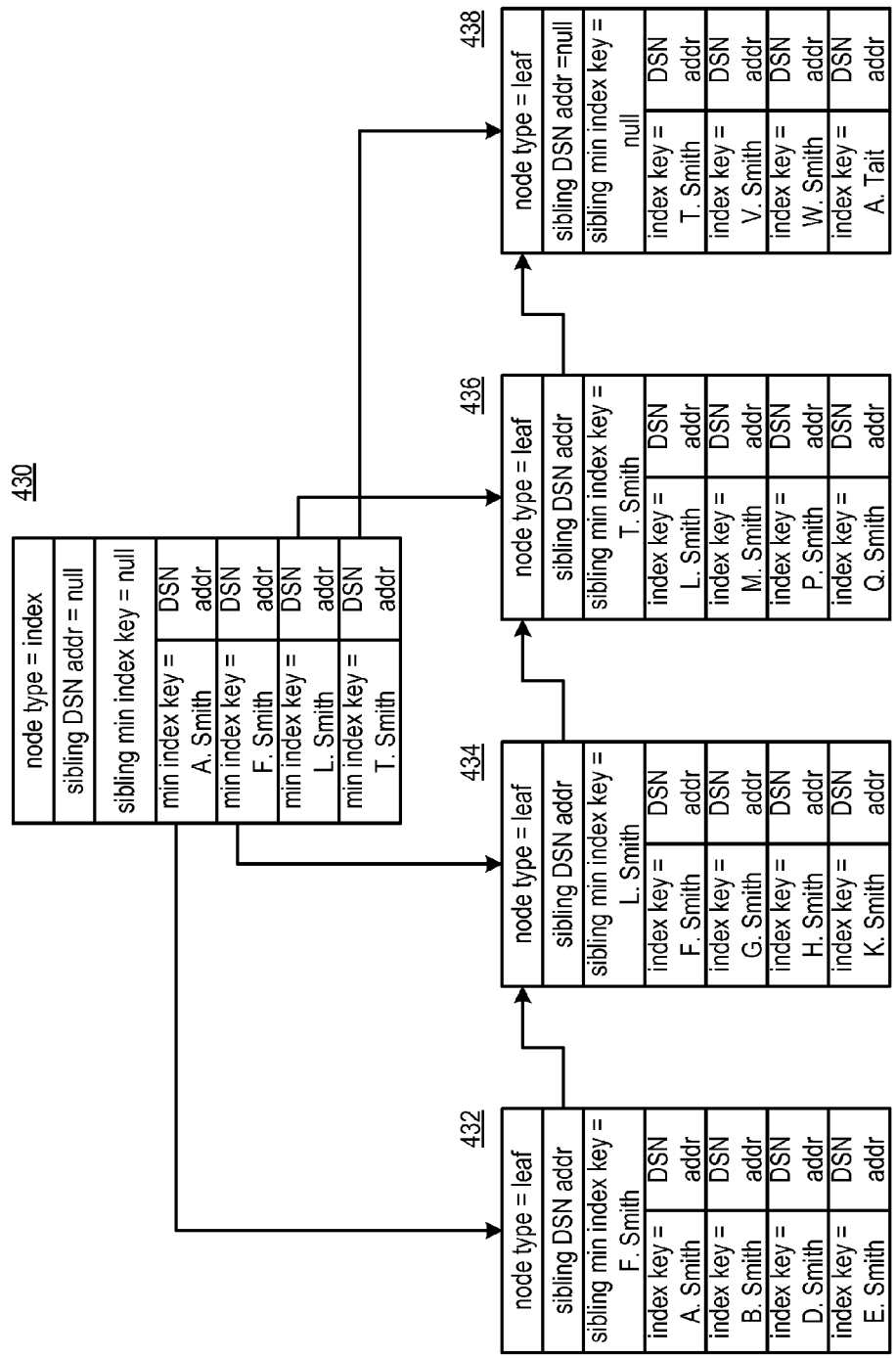
FIG. 41A is a diagram illustrating another example of an index structure in accordance with the present invention.

FIG. 41A is a diagram illustrating another example of an index structure that includes a representation of a portion of a dispersed index that includes an index node 430 and a plurality of leaf nodes 432, 434, 436, and 438. As illustrated, each of the plurality of leaf nodes 432-438 are child nodes with respect to the index node 430. As illustrated, leaf node 434 is a sibling node to leaf node 432, leaf node 436 as a sibling node to leaf node 434, and leaf node 438 is a sibling node to leaf node 436.

The plurality of leaf nodes 432-438 includes a corresponding plurality of data object index keys that is ordered in accordance with ordering of attributes of an attribute category where a data object index key of the plurality of data object index keys uniquely identifies one of a plurality of data objects in accordance with the attribute category. For example, the plurality of leaf nodes 432-438 includes a plurality of data object index keys that includes names of a portion of a phonebook where the plurality of object keys are ordered in accordance with an alphabetical ordering of an alphabetical attribute category. For instance, leaf node 432 includes index keys for phonebook names A. Smith through E. Smith, leaf node 434 includes index keys for phonebook names F. Smith through K. Smith, leaf node 436 includes index keys for phonebook names L. Smith through Q. Smith, and leaf node 438 includes index keys for phonebook names T. Smith through A. Tait. The data object index key identifies the one of the plurality of data objects by an associated dispersed storage network (DSN) address that corresponds to a storage location for the one of the plurality of data objects within a DSN.

The dispersed index enables generation of a data index list that identifies data objects having one or more common attributes of an attribute category where indexing of the plurality of data objects is organized in accordance with the ordering of attributes of the attribute category. For example, generation of a data index list includes identifying data objects associated with data object index keys G. Smith, H. Smith, K. Smith, L. Smith, and M. Smith when the one or more common attributes includes identifying data objects associated with data object index keys starting with G. Smith and ending with M. Smith and the attribute category includes alphabetized names. As another example, generation of a data index list includes identifying data objects associated with data object index keys Q. Smith, T. Smith, V. Smith, W. Smith, and A. Tait when the one or more common attributes includes identifying data objects associated with data object index keys starting with Q. Smith and higher (e.g., in an ascending alphabetized ordering) and the attribute category includes alphabetized names. As yet another example, generation of a data index list includes identifying data objects associated with data object index keys F. Smith, E. Smith, D. Smith, B. Smith, and A. Smith when the one or more common attributes includes identifying data objects associated with data object index keys starting with F. Smith and lower (e.g., in a descending alphabetized ordering) and the attribute category includes alphabetized names.

In an example of operation, a request is received for a data index list that identifies data objects having one or more common attributes (e.g., G. Smith through M. Smith) of an attribute category (e.g., alphabetized names). The hierarchical ordered index structure that maps the indexing of the plurality of data objects is searched to identify data object level index node 434 of the index structure that includes a first boundary data object index key (e.g., G. Smith) corresponding to a first data object boundary match of the one or more common attributes. A determination is made whether the data object level index node 434 includes a second boundary data object index key (e.g., M. Smith) corresponding to a second data object boundary match of the one or more common attributes. Since the data object level index node 434 does not include the second boundary data object index key M. Smith, an adjacent data object level index node 436 of the hierarchical ordered index structure is searched to determine whether the adjacent data object level index node 436 includes the second boundary data object index key M. Smith. Since the adjacent data object level index node 436 includes the second boundary data object index key M. Smith, the data index list is generated to include the first boundary data object index key G. Smith, a first ordered set of data object index keys of the data object level index node (e.g., H. Smith, K. Smith), the second boundary data object index key M. Smith, and a second ordered set of data object index keys (L. Smith) of the adjacent data object level index node 436. Next, the data index list is outputted to a requesting entity. The method to generate the data index list is discussed in greater detail with reference to FIGS. 41B and 41C.

Figure 41B:
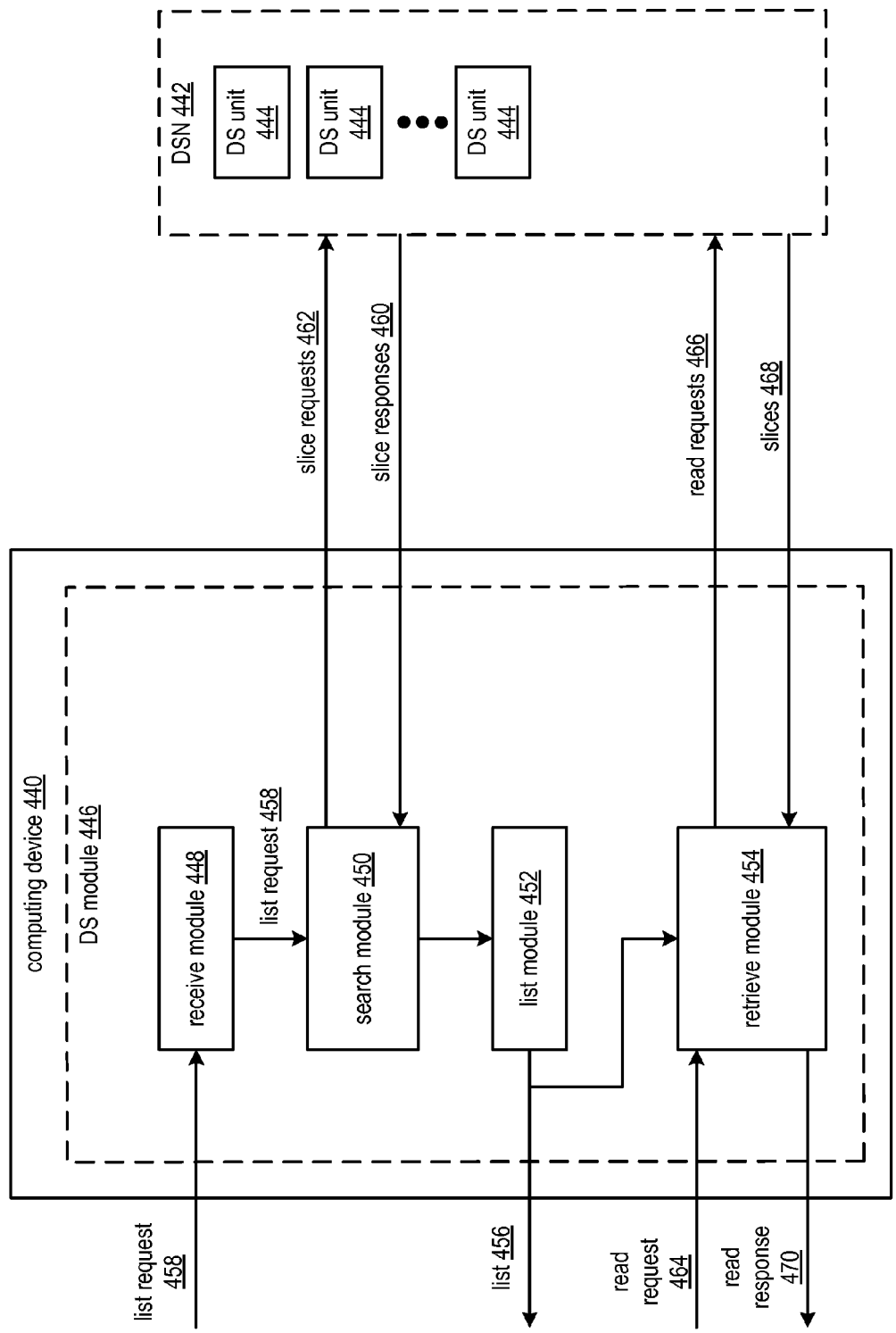
FIG. 41B is a schematic block diagram of an embodiment of a dispersed storage system in accordance with the present invention.

FIG. 41B is a schematic block diagram of an embodiment of a dispersed storage system that includes a computing device 440 and a dispersed storage network (DSN) 442. The DSN 442 may be implemented utilizing one or more of multiple computers, multiple computing devices, a DSN memory, a distributed storage and task network (DSTN), and a DSTN module. The DSN 442 includes a plurality of dispersed storage (DS) units 444. Each DS unit 444 of the plurality of DS units 444 may be implemented utilizing at least one of a storage server, a storage unit, a storage module, a memory device, a memory, a distributed storage and task (DST) execution unit, a user device, a DST processing unit, and a DST processing module. The computing device 440 may be implemented utilizing at least one of a server, a storage unit, a storage server, a storage module, a DS processing unit, a DS unit, a DST execution unit, a user device, a DST processing unit, and a DST processing module. The computing device 440 includes a dispersed storage (DS) module 446. The DS module 446 includes a receive module 448, a search module 450, a list module 452, and a retrieve module 454.

The system functions to provide a data index list 456 that identifies data objects having one or more common attributes of an attribute category where indexing of a plurality of data objects is organized in accordance with an ordering of attributes of the attribute category and where the plurality of data objects is stored in the DSN 442. The indexing of the plurality of data objects includes a corresponding plurality of data object index keys that is ordered in accordance with the ordering of the attributes of the attribute category where a data object index key of the plurality of data object index keys uniquely identifies one of the plurality of data objects in accordance with the attribute category.

The providing of the data index list 456 includes one or more of receiving a request 458 for the data index list, searching a hierarchical ordered index structure, generating the data index list 456, and retrieving a data object identified in the data index list 456. With regards to receiving the request 458, the receive module 448 receives the request 458 for the data index list that identifies the data objects having one or more common attributes of the attribute category. The request 458 may include one or more of a dispersed index identifier (ID), the attribute category, the one or more common attributes, one or more attribute traits, a search start value, a search end value, a search range, a null search end indicator, an ascending search ordering indicator, a descending search ordering indicator, a data object ID, a comparing function, comparing criteria, search criteria, a pathname, an object ID, an index name, an index ID, an index source name, a root node source name, a requesting entity ID, and a user ID.

With regards to searching the hierarchical ordered index structure, the search module 450 performs a series of search steps. In a first search step, the search module 450 searches, based on the one or more common attributes of the request 458, the hierarchical ordered index structure that maps the indexing of the plurality of data objects to identify a data object level index node (e.g., a leaf node) of the index structure that includes a first boundary data object index key (e.g., a start value) corresponding to a first data object boundary match of the one or more common attributes. The search module 450 further functions to identify the data object boundary match of the one or more common attributes by identifying a first one of a plurality of index keys associated with the data object level index node that includes an indication that substantially matches the one or more common attributes, where the plurality of index keys are sequentially ordered in accordance with indicators corresponding to attributes of the attribute category.

The search module 450 searches the hierarchical ordered index structure by a sequence of sub-search steps. A first sub-search step includes the search module 450 identifying a category index node (e.g., an index node of the index structure) based on the request 458. For example, the search module 450 performs a dispersed index DSN address lookup based on the attribute category of the request 458. A second sub-search step includes the search module 450 retrieving a set (e.g., at least a decode threshold number) of category index slices 460 from the DSN 442. For example, the search module 450 issues slice requests 462 to the DSN 442 based on the dispersed index DSN address and the one or more common attributes. A third sub-search step includes the search module 450 reconstructing a category index file from the set of category index slices 460. For example, the search module 450 decodes the set of category index slices 460 using a dispersed storage error coding function to reproduce the category index file. A fourth sub-search step includes the search module 450 interpreting the category index file based on the one or more common attributes to identify a next level index node. When the next level index node is not the data object level index node (e.g., does not include a leaf node type indicator, does not include data object index keys), a loop is entered that includes a series of further sub-search steps.

A first further sub-search step includes the search module 450 retrieving a set (e.g., at least a decode threshold number) of next level index slices 460 from the DSN 442. For example, the search module 450 issues a set of next level index slice requests 462 to the DSN 442 based on a DSN address of a next index file extracted from the next level index node. A second further sub-search step includes the search module 450 reconstructing the next index file from the set of next level index slices 460 (e.g., decoding at least a decode threshold number of the set of next level index slices 460 to reproduce the next index file). A third further sub-search step includes the search module 450 interpreting the next index file based on the one or more common attributes to identify a new next level index node. A fourth further sub-search step includes the search module 450 determining whether the new next level index node is the data object index node. When the new next level index node is the data object index node, the loop is exited. When the new next level index node is not the data object index node, the loop is repeated with the new next level index node as the next level index node.

In a second search step to search the hierarchical ordered index structure, the search module 450 determines whether the data object level index node includes a second boundary data object index key (e.g., an end value) corresponding to a second data object boundary match of the one or more common attributes. When the data object level index node does not include the second boundary data object index key, in a third search step, the search module 450 searches an adjacent data object level index node (e.g., a sibling node) of the hierarchical ordered index structure to determine whether the adjacent data object level index node includes the second boundary data object index key. For example, the search module 450 issues slice requests 462 to the DSN 442 based on a DSN address of the adjacent data object level index node extracted from the data object level index node when the adjacent data object level index node is a sibling node to the data object level index node. As another example, the search module 450 issues slice requests 462 to the DSN 442 based on the DSN address of the adjacent data object level index node extracted from a parent node to the data object level index node. For instance, the search module 450 extracts the DSN address associated with a next child node in a descending order from the data object level index node.

When the adjacent data object level index node does not include the second boundary data object index key, a loop is entered to include a series of alternative search steps. In a first alternative search step, the search module 450 searches a next adjacent data object level index node of the hierarchical ordered index structure to determine whether the next adjacent data object level index node includes the second boundary data object index key. When the next adjacent data object level index node includes the second boundary data object index key, the loop is exited and a second alternative search step includes the search module 450 generating the data index list 456. When the next adjacent data object level index node does not include the second boundary data object index key, the loop is repeated using a second next adjacent data object level index node as the next adjacent data object level index node. For example, the search module 450 identifies a sibling node of the sibling node of the data object level index node.

With regards to generating the data index list 456, the list module 452 performs a series of listing steps. In a first listing step, when the adjacent data object level index node includes the second boundary data object index key, the list module 452 generates the data index list 456 to include the first boundary data object index key, a first ordered set of data object index keys of the data object level index node, the second boundary data object index key, and a second ordered set of data object index keys of the adjacent data object level index node. The list module 452 generates the data index list by determining DSN addresses corresponding to each of the data object index keys in the data index list 456 and adding the DSN addresses to the data index list 456. When the data object level index node includes the second boundary data object index key, the list module 452, in the first listing step, generates the data index list 456 to include the first boundary data object index key, the second boundary data object index key, and an ordered set of data object index keys between the first and second boundary data object index keys. In a second listing step, the list module 452 outputs the data index list 456.

With regards to retrieving the data object identified in the data index list 456, the retrieve module 454 performs a series of retrieving steps. In a first retrieving step, the retrieve module 454 receives a read request 464 regarding a data object identified in the data index list 456. In a second retrieving step, the retrieve module 454 determines a DSN address for the data object. In a third retrieving step, the retrieve module 454 identifies a set of DS servers (e.g., DS units 444) based on the DSN address (e.g., a lookup). In a fourth retrieving step, the retrieve module 454 sends a set of read requests 466 to the set of DS servers 444 to retrieve a set of data slices 468, where a data segment of the data object is stored as the set of data slices 468 in the set of DS servers 444. In a fifth retrieving step, the retrieve module 454 decodes the set of data slices 468 to reproduce the data segment. In a sixth retrieving step, the retrieve module 454 outputs a read response 470 that includes the data segment. In addition, the retrieve module 454 may decode a plurality of sets of data slices 468 to generate a plurality of data segments of the data object for inclusion in the read response 470.

Figure 41C:
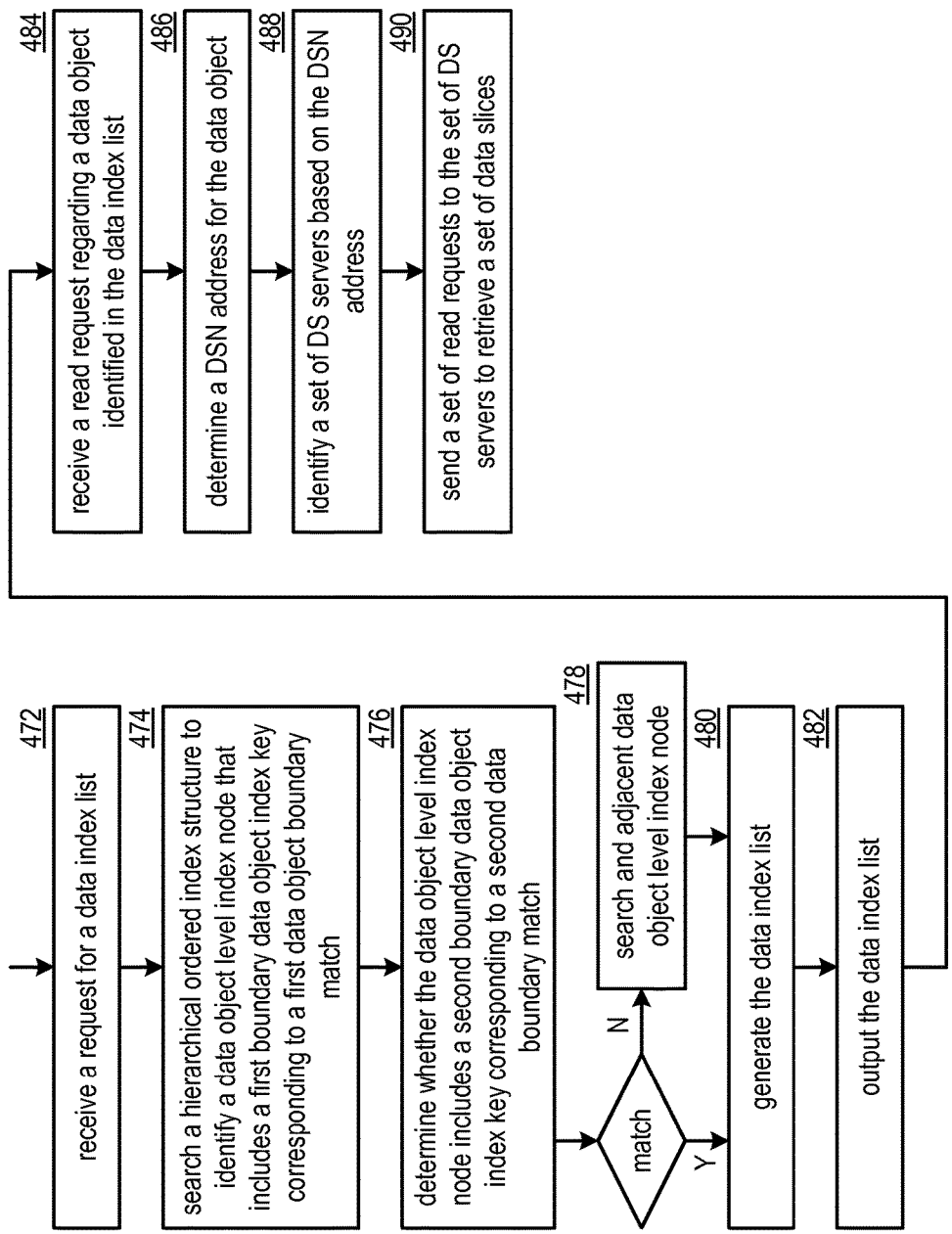
FIG. 41C is a flowchart illustrating an example of listing an index structure in accordance with the present invention.

FIG. 41C is a flowchart illustrating an example of listing an index structure. The method begins at step 472 where a processing module (e.g., of a dispersed storage (DS) processing module of a computer) receives a request for a data index list that identifies data objects having one or more common attributes of an attribute category, where indexing of a plurality of data objects is organized in accordance with an ordering of attributes of the attribute category and where the plurality of data objects is stored in a dispersed storage network (DSN). The indexing of the plurality of data objects includes a corresponding plurality of data object index keys that is ordered in accordance with the ordering of the attributes of the attribute category, where a data object index key of the plurality of data object index keys uniquely identifies one of the plurality of data objects in accordance with the attribute category.

The method continues at step 474 where the processing module searches, based on the one or more common attributes, a hierarchical ordered index structure that maps the indexing of the plurality of data objects to identify a data object level index node of the index structure that includes a first boundary data object index key corresponding to a first data object boundary match of the one or more common attributes. The identifying the data object boundary match of the one or more common attributes includes identifying a first one of a plurality of index keys associated with the data object level index node that includes an indication that substantially matches the one or more common attributes, where the plurality of index keys are sequentially ordered in accordance with indicators corresponding to attributes of the attribute category.

The searching the hierarchical ordered index structure includes a series of steps. A first step includes identifying a category index node based on the request. A second step includes retrieving a set of category index slices from the DSN. A third step includes reconstructing a category index file from the set of category index slices. A fourth step includes interpreting the category index file based on the one or more common attributes to identify a next level index node. When the next level index node is not the data object level index node, a fifth step includes entering a loop that includes a series of steps. A first loop step includes retrieving a set of next level index slices from the DSN. A second loop step includes reconstructing a next index file from the set of next level index slices. A third loop step includes interpreting the next index file based on the one or more common attributes to identify a new next level index node. A fourth loop step includes determining whether the new next level index node is the data object index node. When the new next level index node is the data object index node, a sixth step includes exiting the loop. When the new next level index node is not the data object index node, the sixth step includes repeating the loop with the new next level index node as the next level index node.

The method continues at step 476 where the processing module determines whether the data object level index node includes a second boundary data object index key corresponding to a second data object boundary match of the one or more common attributes. The method branches to step 480 when the data object level index node includes the second boundary data object index key corresponding to the second data boundary match of the one or more common attributes. The method continues to step 478 when the data object level index node does not include the second boundary data object index key corresponding to the second data boundary match of the one or more common attributes.

When the data object level index node does not include the second boundary data object index key, the method continues at step 478 where the processing module searches an adjacent data object level index node of the hierarchical ordered index structure to determine whether the adjacent data object level index node includes the second boundary data object index key. When the adjacent data object level index node does not include the second boundary data object index key, the processing module functions to perform another set of loop steps. A first other loop step includes searching a next adjacent data object level index node of the hierarchical ordered index structure to determine whether the next adjacent data object level index node includes the second boundary data object index key. When the next adjacent data object level index node includes the second boundary data object index key, a second other loop step includes exiting the loop and branching to step 480 to generate the data index list. When the next adjacent data object level index node does not include the second boundary data object index key, the second other loop step includes repeating the loop using a second next adjacent data object level index node as the next adjacent data object level index node.

When the adjacent data object level index node includes the second boundary data object index key, the method continues at step 480 where the processing module generates the data index list to include the first boundary data object index key, a first ordered set of data object index keys of the data object level index node, the second boundary data object index key, and a second ordered set of data object index keys of the adjacent data object level index node. The generating the data index list includes determining DSN addresses corresponding to each of the data object index keys in the data index list and adding the DSN addresses to the data index list. Alternatively, when the data object level index node includes the second boundary data object index key, generating, by the processing module, the data index list to include the first boundary data object index key, the second boundary data object index key, and an ordered set of data object index keys between the first and second boundary data object index keys. The method continues at step 482 where the processing module outputs the data index list.

The data index list may be utilized to identify and retrieve a data object of the plurality of data objects. When utilizing the data index list, the method continues at step 484 where the processing module receives a read request regarding the data object identified in the data index list. The method continues at step 486 where the processing module determines a DSN address for the data object. The method continues at step 488 where the processing module identifies a set of dispersed storage (DS) servers based on the DSN address. The method continues at step 490 where the processing module sends a set of read requests to the set of DS servers to retrieve a set of data slices, where a data segment of the data object is stored as the set of data slices in the set of DS servers.

Figure 42A:
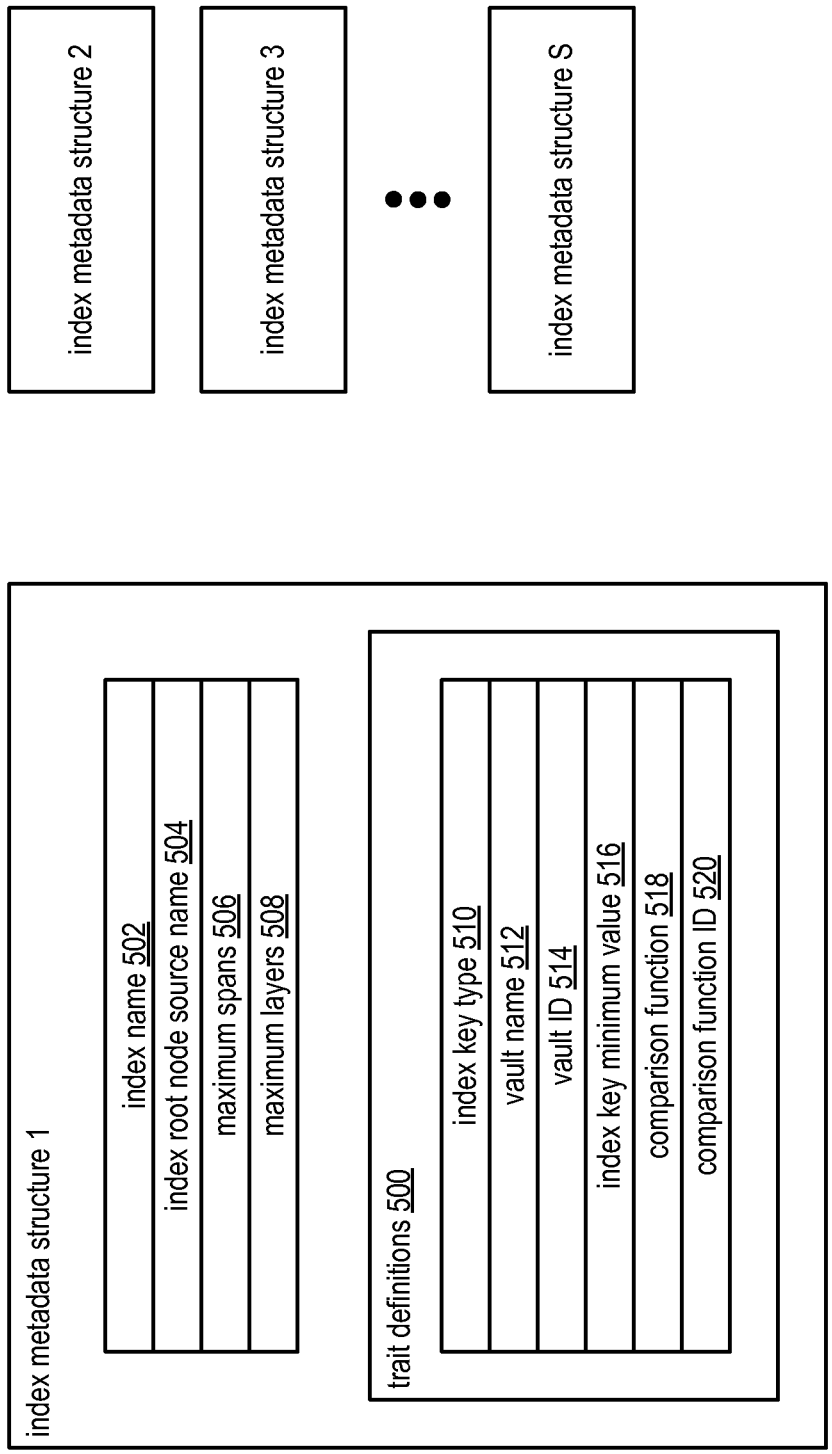
FIG. 42A is a diagram illustrating an example of an index metadata structure in accordance with the present invention.

FIG. 42A is a diagram illustrating an example of an index metadata structure of a plurality of index metadata structures 1-S. Each index metadata structure describes a corresponding dispersed index utilized to access data stored in a distributed storage and task network (DSTN) and/or a dispersed storage network (DSN). The index metadata structure 1 includes one or more of an index name field 502, an index root node source name field 504, a maximum spans field 506, a maximum layers field 508, and trait definitions 500. The index name field 502 may include one or more entries including one or more of an index identifier (ID) of a corresponding index, an index owner ID, and a naming convention. The index root node source name field 504 includes a source name entry corresponding to storage of a root node of the index. The maximum spans field 506 includes a maximum spans entry indicating how many spans of the index structure are allowed (e.g., a maximum number of nodes of a common row of the index structure). The maximum layers field 508 includes a maximum layers entry indicating how many layers of the index structure are allowed (e.g., a maximum number of nodes deep of the index structure).

The trait definitions 500 includes one or more of an index key type field 510, a vault name field 512, a vault ID field 514, an index key minimum value field 516, a comparison function field 518, and a comparison function ID field 520. The index key type field 510 includes a index key type entry indicating a general type of the index which may be utilized for searching for data indexed by the index structure (e.g., by alphanumeric, by file names, etc.). The vault name field 512 includes one or more vault names, where the index indexes data stored in the DSTN that is associated with the one or more vault names. The vault ID field 514 includes one or more vault IDs, where the index indexes data stored in the DSTN that is associated with the one or more vault IDs. The index key minimum value field 516 includes an index key minimum value entry corresponding to a lowest allowed index key value of data indexed by the index. The comparison function field 518 includes one or more comparison function entries, where each entry identifies a type of comparison function that may be utilized to search data associated with the index. The comparison function may include at least one of a compare magnitude of integers, a compare dates function, a compare lexically stored strings function, a compare strings with case sensitivity function, a compare strings without case sensitivity function, and a sort by the limiter function. The comparison function ID field 520 includes one or more comparison function ID entries, wherein the comparison function ID entry references a corresponding comparison function.

Two or more of the index metadata structures may be utilized to access common data. One or more of the index metadata structures of the plurality of index metadata structures 1-S may be selected and utilized to search DSTN data for data that corresponds to one or more search values. A method to select an index metadata structure for utilization in a search scenario is described in greater detail with reference to FIG. 42B.

Figure 42B:
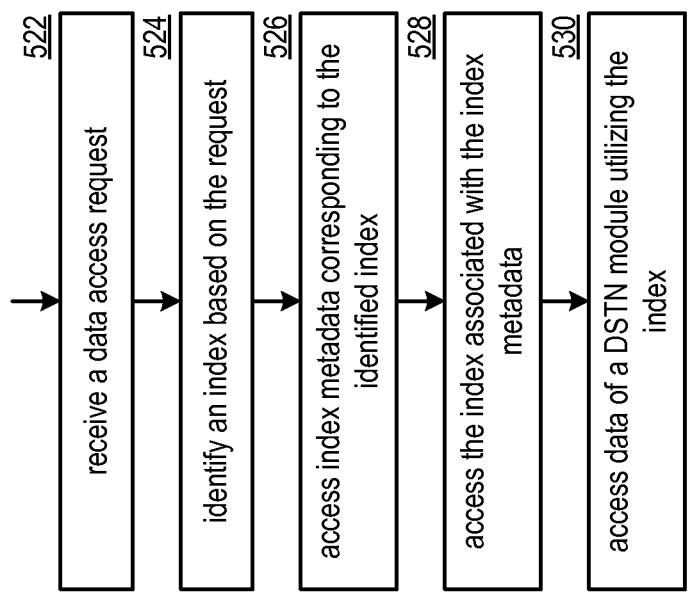
FIG. 42B is a flowchart illustrating an example of identifying an index in accordance with the present invention.

FIG. 42B is a flowchart illustrating an example of identifying an index. The method begins at step 522 where a processing module (e.g. of a distributed storage and task (DST) client module) receives a data access request. The request may include one or more of an index key type, an index identifier (ID), an index name, a comparison function ID, a comparison function, and one or more search values. The method continues at step 524 where the processing module identifies an index based on the request. The identifying includes comparing the request to one or more trait definitions of one or more index metadata structures. For example, processing module identifies the index when an index key type of the request substantially matches an index key type of trait definitions of the identified index metadata structure.

The method continues at step 526 where the processing module accesses index metadata corresponding to the identified index. For example, the processing module retrieves the index metadata from a distributed storage and task network (DSTN) module. The method continues at step 528 where the processing module accesses the index associated with the index metadata. For example, the processing module retrieves an index root node source name from the index metadata and accesses a root node stored in the DSTN module utilizing the index root node source name. The method continues at step 530 where the processing module accesses data of the DSTN module utilizing the index. For example, the processing module searches a corresponding index utilizing the root node to identify data corresponding to a search value. Alternatively, the processing module may identify a second index based on the request when a data access failure occurs utilizing the index.

Figure 43A:
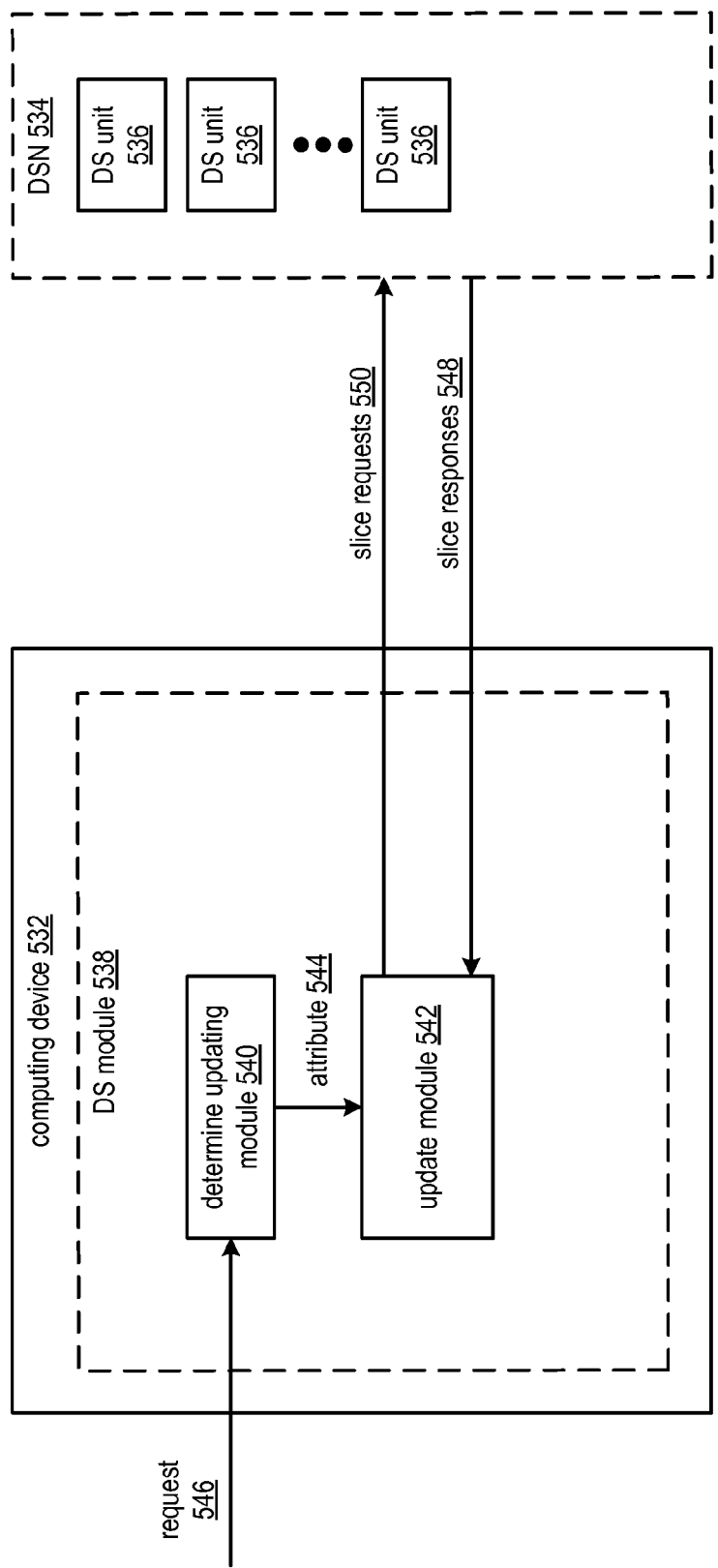
FIG. 43A is a schematic block diagram of another embodiment of a dispersed storage system in accordance with the present invention.

FIG. 43A is a schematic block diagram of another embodiment of a dispersed storage system that includes a computing device 532 and a dispersed storage network (DSN) 534. The DSN 534 may be implemented utilizing one or more of multiple computers, multiple computing devices, a DSN memory, a distributed storage and task network (DSTN), and a DSTN module. The DSN 534 includes a plurality of dispersed storage (DS) units 536. The plurality of DS units 536 includes at least one set of DS units 536. Each DS unit 536 of the plurality of DS units 536 may be implemented utilizing at least one of a storage server, a storage unit, a storage module, a memory device, a memory, a distributed storage and task (DST) execution unit, a user device, a DST processing unit, and a DST processing module. The computing device 532 may be implemented utilizing at least one of a server, a storage unit, a storage server, a storage module, a DS processing unit, a DS unit, a DST execution unit, a user device, a DST processing unit, and a DST processing module. The computing device 532 includes a dispersed storage (DS) module 538. The DS module 538 includes a determine updating module 540 and an update module 542.

The system functions to determine to create or modify a data object index key and to update a data object level index node that stores the data object index key where a hierarchical ordered index structure includes the data object level index node. The hierarchical ordered index structure includes a plurality of data object index keys that is ordered in accordance with the ordering of the attributes of the first attribute category, where a data object index key of the plurality of data object index keys uniquely identifies one of a plurality of data objects stored in the DSN 534 in accordance with the first attribute category.

With regards to creating or modifying the data object index key, the determine updating module 540 determines to create or modify the data object index key of a data object regarding an attribute 544 of a first attribute category of a plurality of attribute categories. The determine updating module 540 determines to create the data object index key by receiving a request 546 to write the data object into the DSN 534, wherein the request includes the attribute 544. Alternatively, the request 546 includes a plurality of attributes of the data object, where the plurality of attributes includes the attribute 544, and where other attributes of the plurality of attributes are from different attribute categories of the plurality of attribute categories. For each of the other attributes of the plurality of attributes, the determine updating module 540 creates a corresponding data object index key for the data object regarding the other attribute and facilitates entering a process to update the data object level index node, where a corresponding data object level index node associated with the other attributes is the data object level index node to be updated.

The determine updating module 540 determines to modify the data object index key by one of deleting the data object index key and entering the process to update the data object level index node by deleting the data object index key and changing the attribute 544 to a different attribute of the first attribute category and entering the process to update the data object level index node by modifying the data object index key. The determine updating module 540 changes the attribute 544 by a series of change steps. A first change step includes the determine updating module 540 determining to create a new data object index key in another data object level index node regarding the different attribute. For example a data object has a first priority and is being changed to a second priority (e.g., higher or lower). A second change step includes the determine updating module 540 determining to delete the data object index key in the data object level index node. A third change step includes the determine updating module 540 entering the process to update the data object level index node by deleting the data object index key. A fourth change step includes the determine updating module 540 facilitating entering the process to update the other data object level index node by adding the new data object index key.

With regards to updating the data object level index node, the update module 542 enters the process to update the data object level index node using a series of updating steps. In a first updating step, the update module 542 accesses a hierarchical ordered index structure associated with the first attribute category to identify the data object level index node containing data object index keys associated with the attribute. The update module 542 accesses the hierarchical ordered index structure by a series of accessing steps. A first accessing step includes the update module 542 identifying a category index node based on the first attribute category (e.g., a DSN address lookup for the category index node based on the first attribute category). A second accessing step includes the update module 542 retrieving a set of category index slices (e.g., at least a decode threshold number) from the DSN 534 by receiving a set of slice responses 548 that includes the set of category index slices. The retrieving further includes issuing a set of slice requests 550 based on the DSN address of the category index node. A third accessing step includes the update module 542 reconstructing a category index node from the set of category index slices (e.g., decoding the set of category index slices using a dispersed storage error coding function to reconstruct the category index node). A fourth accessing step includes the update module 542 interpreting the category index node based on the one or more search attributes to identify a next level index node. The interpreting includes selecting the next level index node that is associated with a minimum data object index key that is less than or equal to the one or more search attributes and a sibling node (e.g., an adjacent node to the right, if any) to the next level index node is associated with a minimum data object index key that is greater than the one or more search attributes.

A fifth accessing step to access the hierarchical ordered index structure includes the update module 542 retrieving a set of next level index slices from the DSN (e.g., retrieve at least a decode threshold number of next level index slices from a set of slice responses 548 in response to a set of slice requests 550 based on a DSN address of the identified next level index node). A sixth accessing step includes the update module 542 reconstructing the next level index node from the set of next level index slices (e.g., decode the set of next level index slices to reconstruct the next level index node exposing a node type indicator (i.e. a node data object level index node)). When the next level index node is not the data object level index node (e.g., not a leaf node based on a node type indicator), a seventh step includes the update module 542 entering a loop that includes a series of loop steps. A first loop step includes the update module 542 interpreting the next level index node based on the attribute to identify a new next level index node. A second loop step includes the update module 542 retrieving a set of new next level index slices from the DSN (e.g., retrieving at least a decode threshold number of new next level index slices from slice responses 548 in response to a set of slice requests 550 based on a DSN address of the identified new next level index node). A third loop step includes the update module 542 reconstructing the new next level index node from the set of new next level index slices (e.g., decode). A fourth loop step includes the update module 542 determining whether the new next level index node is the data object level index node (e.g., extract a node type indicator to determine if it is a leaf node). When the new next level index node is the data object level index node, a fifth loop step includes the update module 542 exiting the loop. When the new next level index node is not the data object level index node, the fifth loop step includes the update module 542 repeating the loop with the new next level index node as the next level index node.

In a second updating step to update the data object level index node, the update module 542 retrieves the data object level index node from a set of dispersed storage (DS) units of the DSN. For example, the update module 542 issues a set of slice requests 550 based on a DSN address of the data object level index node, receives at least a decode threshold number of slice responses 548 that includes an update reference value, (i.e. a revision number for at least a decode threshold number of index node slices), and decodes the at least the decode threshold number of slice responses 548 to reproduce the data object level index node. In a third updating step, the update module 542 adds or modifies the data object index key in the data object level index node in accordance with an ordering of attributes of the attribute category to produce an updated data object level index node. The update module 542 adds the data object index key in the data object level index node by a series of adding steps. A first adding step includes the update module 542 appending the data object index key to the data object level index node to produce an unsorted data object level index node (e.g., extract the data object index key from the request 546, add a DSN address of the data object, and add the index key associated with the data object). A second adding step includes the update module 542 sorting a plurality of data object index keys of the unsorted data object level index node in accordance with an ordering of attributes of the attribute category to produce an updated data object level index node to produce the updated data object level index node (e.g., sort the data object entry using the one or more search attributes).

In a fourth updating step to update the data object level index node, the update module 542 encodes the updated data object level index node in accordance with a dispersed storage error coding function to produce a set of encoded index node slices. In a fifth updating step, the update module 542 generates a set of write commands (e.g., slice requests 550) to write the set of encoded index node slices to the set of DS units 536, wherein each of the set of write commands includes an update reference value that is based on a reference value of the data object level index node. For example, the update module 542 extracts a revision number from one or more read slice responses 548 associated with retrieving slices of the data object level index node as the reference value of the data object level index node and establishing the update reference value as an expected revision number to be substantially the same as the extracted revision number. As another example, the generating further includes the generating the set of write commands 550 to include one or more of the set of encoded index node slices, a checked write operation code, the expected revision number, and a new revision number that is the expected revision number incremented by one.

When at least a threshold number of the set of write commands 550 are successfully executed by the set of DS units 536, in a sixth updating step, the update module 542 exits the process to update the data object level index node. The update module 542 determines whether the at least the threshold number of the set of write commands 550 are successfully executed by the set of DS units 536 by receiving a status codes (e.g., included in slice responses 548) from the set of DS units 536 indicating whether there is a checked write error due to a revision mismatch and indicating successful execution when at least a write threshold number of status codes indicate that there is no mismatch.

When less than the threshold number of the set of write commands are successfully executed by the set of DS units, in the sixth updating step, the update module 542 repeats the process to update the data object level index node. For example, the update module 542 determines to start over since another process modified the data object level index node since reading the data object level index node and the process should modify a most recent revision of the data object level index node. Alternatively, the update module 542 interprets that another computer of the DSN 534 has priority in updating the data object level index node when the less than the threshold number of the set of write commands are successfully executed by the set of DS units 536 and (e.g., actually assigned or priority in time) repeats the process to update the data object level index node in accordance with a priority scheme. The priority scheme includes at least one of waiting a predetermined amount of time, sending a priority interrupt message, and starting the process over.

Figure 43B:
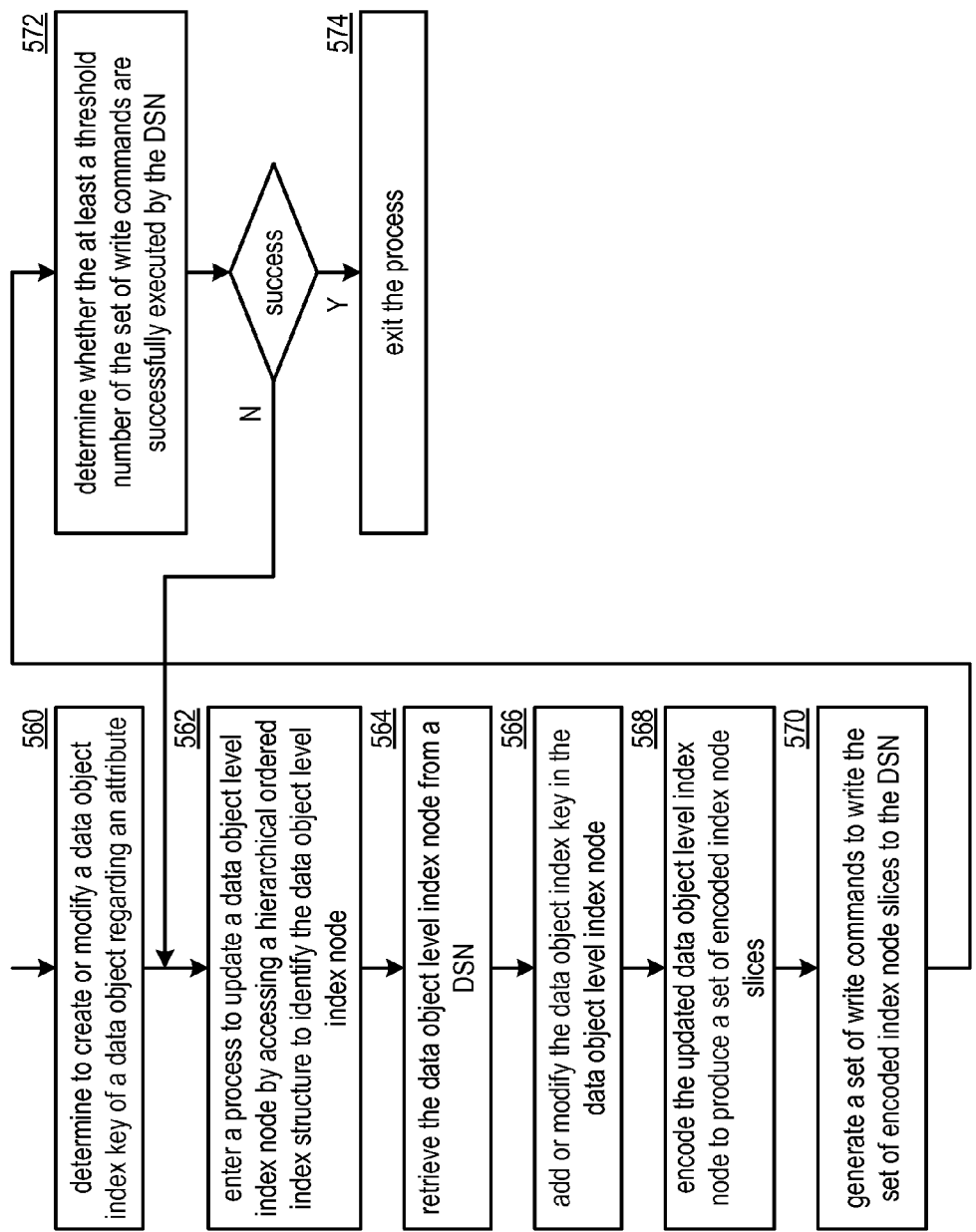
FIG. 43B is a flowchart illustrating an example of modifying an index in accordance with the present invention.

FIG. 43B is a flowchart illustrating an example of modifying an index. The method begins at step 560 where a processing module (e.g., of a dispersed storage (DS) processing module of a computing device) determines to create or modify a data object index key of a data object regarding an attribute of a first attribute category of a plurality of attribute categories. The determining to create the data object index key includes receiving a request to write the data object into a dispersed storage network (DSN), where the request includes the attribute. Alternatively, the processing module may receive a request with regards to the data object index key for the data object that was previously stored in the DSN. The request may include a plurality of attributes of the data object, where the plurality of attributes includes the attribute, and where other attributes of the plurality of attributes are from different attribute categories of the plurality of attribute categories. For each of the other attributes of the plurality of attributes, the processing module may facilitate creating a corresponding data object index key for the data object regarding the other attribute and facilitates entering a process at step 562 to update a data object level index node, where a corresponding data object level index node associated with the other attributes is the data object level index node to be updated.

The determining to modify the data object index key includes one of deleting the data object index key and entering the process at step 562 to update the data object level index node by deleting the data object index key and changing the attribute to a different attribute of the first attribute category and entering the process at step 562 to update the data object level index node by modifying the data object index key. The changing the attribute further includes several changing steps. A first changing step includes the processing module determining to create a new data object index key in another data object level index node regarding the different attribute. A second changing step includes the processing module determining to delete the data object index key in the data object level index node. A third changing step includes the processing module entering the process to update the data object level index node by deleting the data object index key. A fourth changing step includes the processing module entering the process to update the other data object level index node by adding the new data object index key.

The method continues at step 562 where the processing module facilitates entering the process to update a data object level index node. The process starts with the processing module accessing a hierarchical ordered index structure associated with the first attribute category to identify the data object level index node containing data object index keys associated with the attribute. The hierarchical ordered index structure includes a plurality of data object index keys that is ordered in accordance with the ordering of the attributes of the first attribute category, where a data object index key of the plurality of data object index keys uniquely identifies one of a plurality of data objects in accordance with the first attribute category.

The accessing the hierarchical ordered index structure includes a series of accessing steps. A first accessing step includes identifying a category index node based on the first attribute category (e.g., perform a DSN address lookup based on the attribute category). A second accessing step includes retrieving a set of category index slices (e.g., at least a decode threshold number) from the DSN. A third accessing step includes reconstructing (e.g., decoding slices) a category index node from the set of category index slices. A fourth accessing step includes interpreting the category index node based on the one or more search attributes to identify a next level index node. The interpreting includes selecting the next level index node that is associated with a minimum data object index key that is less than or equal to the attribute and a sibling node (e.g., an adjacent node to the right, if any) to the next level index node that is associated with a minimum data object index key that is greater than the attribute. A fifth accessing step includes retrieving a set of next level index slices from the DSN (e.g., retrieve based on a DSN address of the identified next level index node retrieving at least a decode threshold number of slices). A sixth accessing step includes reconstructing the next level index node from the set of next level index slices (e.g., decoding slices to expose a node type indicator (index/leaf)).

When the next level index node is not the data object level index node (e.g., not a leaf node based on a leaf node indicator), the processing module facilitates entering a loop that includes a series of loop steps. A first loop step includes interpreting the next level index node based on the attribute to identify a new next level index node. A second loop step includes retrieving a set of new next level index slices from the DSN (e.g., retrieve slices from a DSN address of the identified new next level index node retrieving at least a decode threshold number of slices). A third loop step includes reconstructing (e.g., decode slices) the new next level index node from the set of new next level index slices. A fourth loop step includes determining (e.g., extract a node type indicator to determine if it is a leaf node) whether the new next level index node is the data object level index node. When the new next level index node is the data object level index node, the processing module facilitates exiting the loop. When the new next level index node is not the data object level index node, the processing module facilitates repeating the loop with the new next level index node as the next level index node.

The method continues at step 564 where the processing module retrieves the data object level index node from a set of dispersed storage (DS) units of the DSN. For example, the processing module issues a set of read slice requests based on the DSN address of the data object level index node, receives at least a decode threshold number of read slice responses that include an update reference value, i.e., a revision number for at least a decode threshold number of index node slices, and decodes the at least the decode threshold number of index node slices to reproduce the data object level index node.

The method continues at step 566 where the processing module adds or modifies the data object index key in the data object level index node in accordance with an ordering of attributes of the attribute category to produce an updated data object level index node. The adding the data object index key in the data object level index node includes a series of adding steps. A first adding step includes the processing module appending the data object index key to the data object level index node to produce an unsorted data object level index node. A second adding step includes the processing module sorting (e.g., sort the data object entry using the one or more search attributes) a plurality of data object index keys of the unsorted data object level index node in accordance with an ordering of attributes of the attribute category to produce an updated data object level index node to produce the updated data object level index node.

The method continues at step 568 where the processing module and encodes the updated data object level index node in accordance with a dispersed storage error coding function to produce a set of encoded index node slices. The method continues at step 570 where the processing module generates a set of write commands to write the set of encoded index node slices to the set of DS units, where each of the set of write commands includes an update reference value that is based on a reference value of the data object level index node. For example, the processing module extracts a revision number from one or more read slice responses associated with retrieving slices of the data object level index node as the reference value of the data object level index node and establishes the update reference value as an expected revision number to be substantially the same as the extracted revision number. The generating further includes the processing module generating the set of write commands to include one or more of the set of encoded index node slices, a checked write operation code, the expected revision number, and a new revision number that is the expected revision number incremented by one.

The method continues at step 572 where the processing module determines whether at least a threshold number of the set of write commands are successfully executed by the set of DS units. The determining includes the processing module receiving status codes from the set of DS units indicating whether there is a checked write error due to a revision mismatch and indicating successful execution when at least a threshold number (e.g., a write threshold number) of status codes indicate that there is no mismatch. When the processing module determines that the less than the threshold number of the set of write commands are not successfully executed by the set of DS units, the method loops back to step 562 repeating the process to update the data object level index node. Alternatively, or in addition to, the processing module interprets that another computer of the DSN has priority in updating the data object level index node when the less than the threshold number of the set of write commands are not successfully executed by the set of DS units. The processing module facilitates repeating the process, by branching to step 562, to update the data object level index node in accordance with a priority scheme when the processing module interprets that the other computer of the DSN has priority in updating the data object level index node. When the processing module determines that the at least the threshold number of the set of write commands are successfully executed by the set of DS units, the method branches to step 574. The method continues at step 574 where the processing module facilitates exiting the process to update the data object level index node when the processing module determines that the at least the threshold number of the set of write commands are successfully executed by the set of DS units.

Figures 44A, 44B:
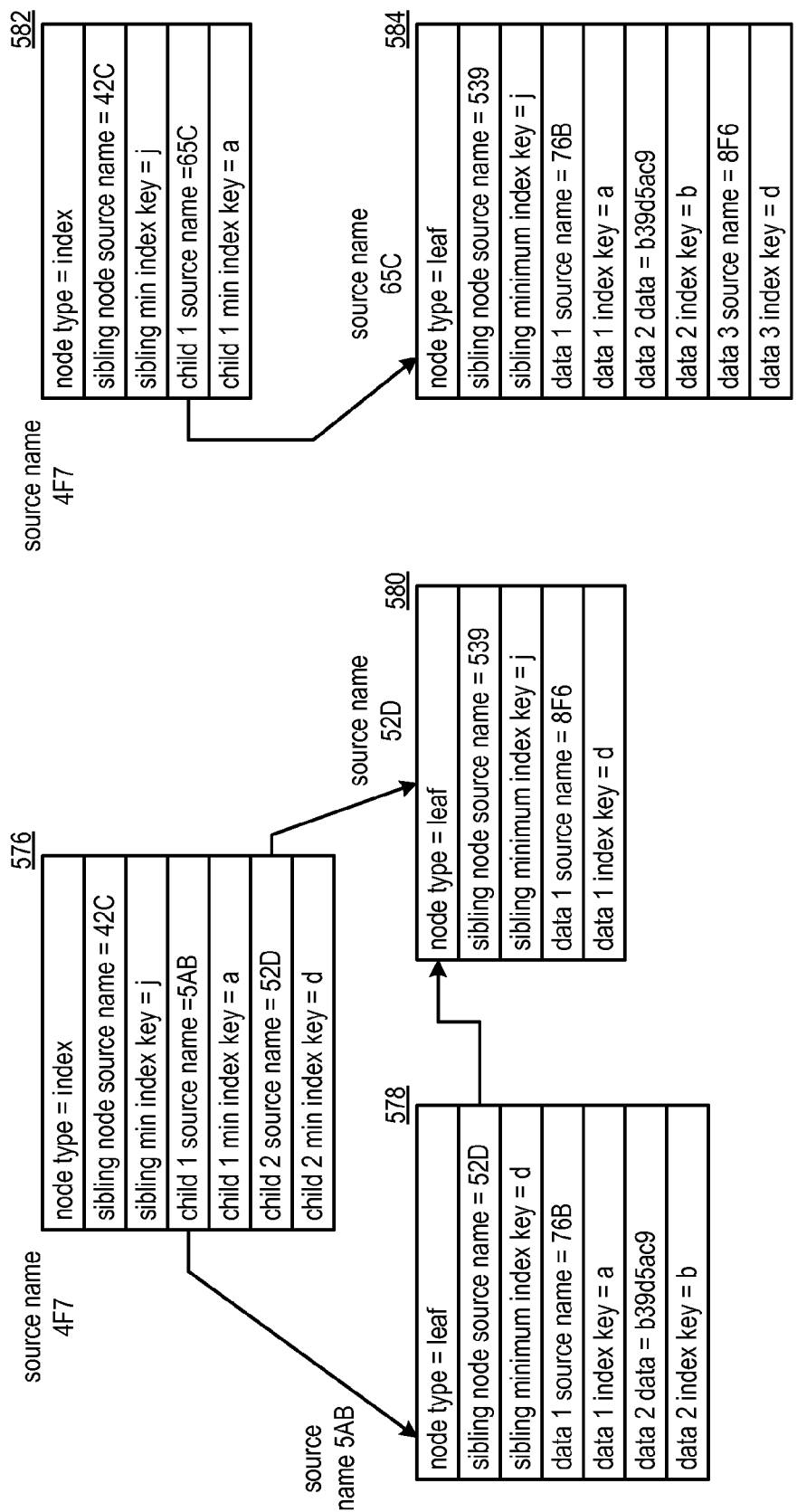
FIG. 44A is a diagram illustrating another example of an index structure in accordance with the present invention.
FIG. 44B is a diagram illustrating another example of an index structure in accordance with the present invention.

FIG. 44A is a diagram illustrating another example of an index structure prior to combining nodes. An index structure diagram representing the index structure after combining nodes is represented in FIG. 44B. The index structure includes three nodes 576, 578, and 580 of an index. The three nodes includes an index node 576 stored in a distributed storage and task network (DSTN) at a source name address of 4F7 and two leaf nodes 578 and 580 stored at source name addresses 5AB and 52D, wherein the two leaf nodes are joined in the example as illustrated in FIG. 44B.

The index node includes a node type indicating not a leaf node (e.g., index node), a sibling node source name pointing to an index node stored at source name 42C, a sibling minimum index key of "j", a child 1 source name of 5AB, a child 1 minimum index key of "a", a child 2 source name of 52D, and a child 2 minimum index key of "d". The leaf node stored at source name 5AB includes a node type indicating a leaf node, a sibling node source name pointing to the leaf node stored at source name 52D, a sibling minimum index key of "d", a data 1 source name of 76B, a data 1 index key of "a", a data 2 direct data entry (e.g., b39d5ac9), and a data 2 index key of "b". The leaf node stored at source name 52D includes a node type indicating a leaf node, a sibling node source name pointing to a leaf node stored at source name 539, a sibling minimum index key of "j", a data 1 source name of 8F6, and a data 1 index key of "d".

FIG. 44B is a diagram illustrating another example of an index structure after joining two leaf nodes illustrated in FIG. 44A. An index structure diagram representing the index structure prior to joining nodes is represented in FIG. 44A. The index structure after the joining includes two nodes 582 and 584 of an index. The two nodes includes an index node 582 stored in a distributed storage and task network (DSTN) at a source name address of 4F7 and a new leaf node 584 stored at source name address 65C, wherein the new leaf node includes entries of two leaf nodes prior to the joining.

The new leaf node stored at source name 65C includes a node type indicating a leaf node, a sibling node source name pointing to a leaf node stored at source name 539, a sibling minimum index key of "j", a data 1 source name of 76B, a data 1 index key of "a", a data 2 direct data entry (e.g., b39d5ac9), a data 2 index key of "b", a data 3 source name of 8F6, and a data 3 index key of "d".

Figure 44C:
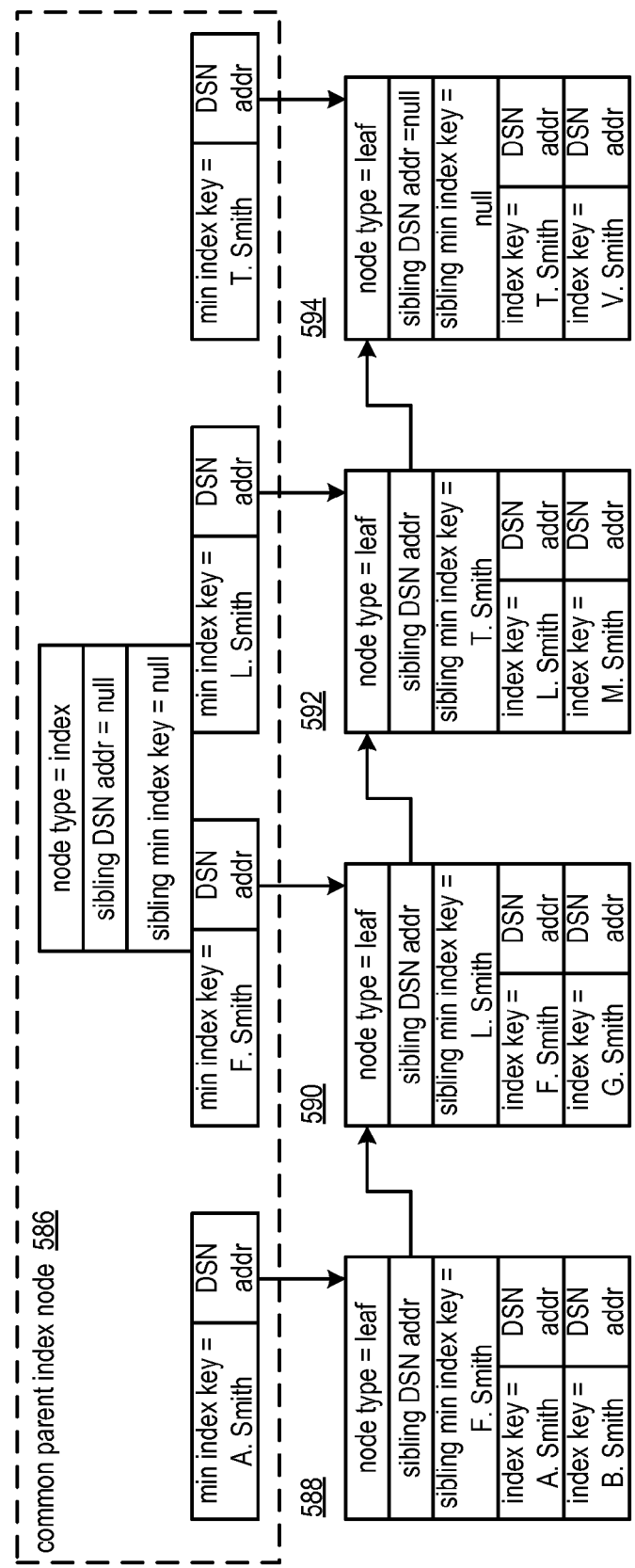
FIG. 44C is a diagram illustrating an example of an index structure of a starting step of a series of example steps depicted in FIGS. 44D through 44J in accordance with the present invention.

FIG. 44C is a diagram illustrating an example of an index structure of a starting step of a series of example steps depicted in FIGS. 44D through 44J that includes a representation of a portion of a dispersed index that includes a common parent index node 586 and a plurality of leaf nodes 588, 590, 592, and 594. As illustrated, each of the plurality of leaf nodes 588-594 are child nodes with respect to the index node 586. As illustrated, leaf node 594 is a sibling node to leaf node 592, leaf node 592 as a sibling node to leaf node 590, and leaf node 590 is a sibling node to leaf node 588.

The plurality of leaf nodes 588-594 includes a corresponding plurality of data object index keys that is ordered in accordance with ordering of attributes of an attribute category where a data object index key of the plurality of data object index keys uniquely identifies one of a plurality of data objects in accordance with the attribute category. For example, the plurality of leaf nodes 588-594 includes a plurality of data object index keys that includes names of a portion of a phonebook where the plurality of object keys are ordered in accordance with an alphabetical ordering of an alphabetical attribute category. For instance, leaf node 588 includes index keys for phonebook names A. Smith and B. Smith, leaf node 590 includes index keys for phonebook names F. Smith and G. Smith, leaf node 592 includes index keys for phonebook names L. Smith and M. Smith, and leaf node 594 includes index keys for phonebook names T. Smith and V. Smith. The data object index key identifies the one of the plurality of data objects by an associated dispersed storage network (DSN) address that corresponds to a storage location for the one of the plurality of data objects within a DSN.

Figure 44D:
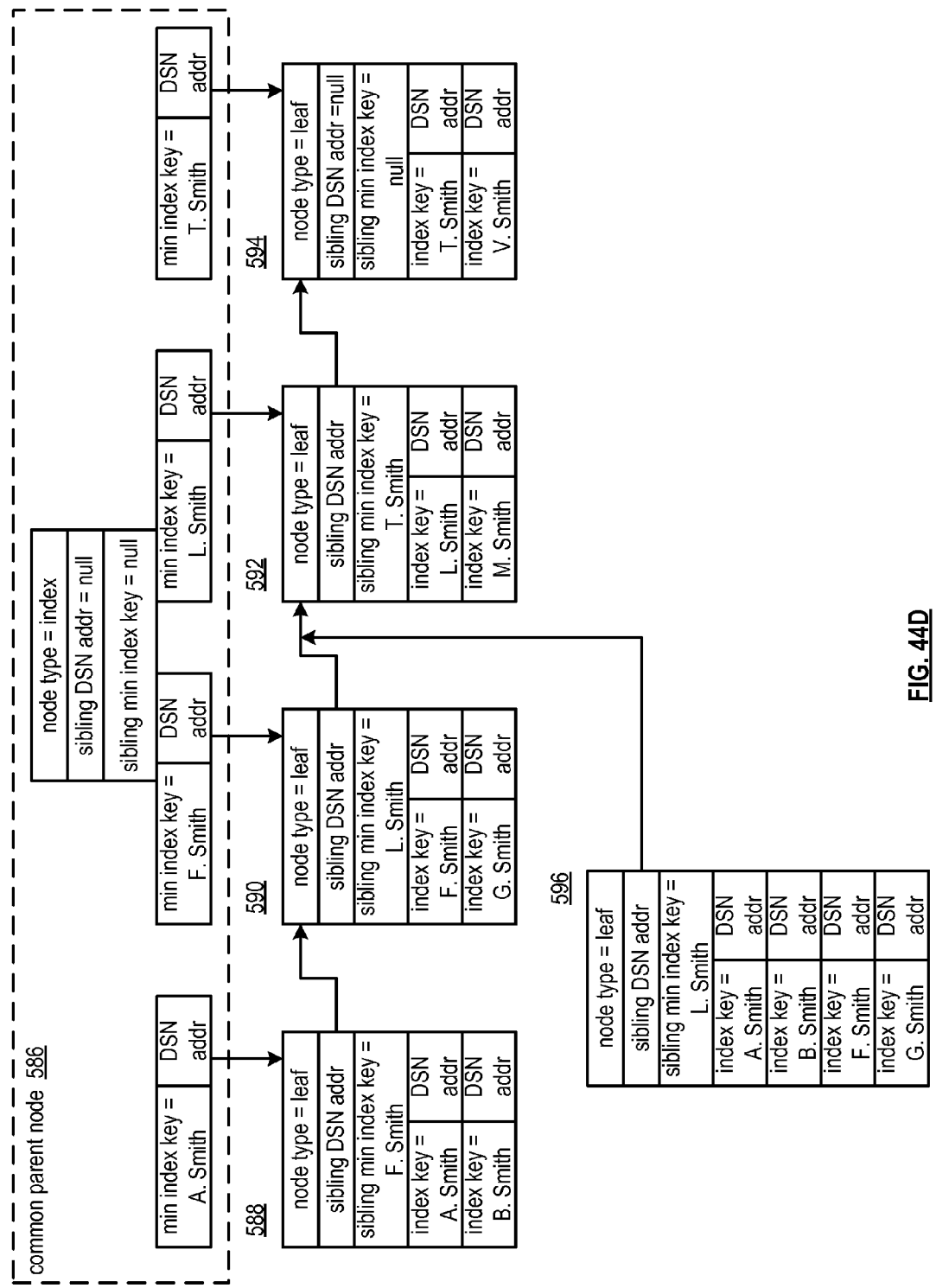
FIG. 44D is a diagram illustrating an example of the index structure of another step of the series of example steps depicted in FIGS. 44D through 44J in accordance with the present invention.
Figure 44E:
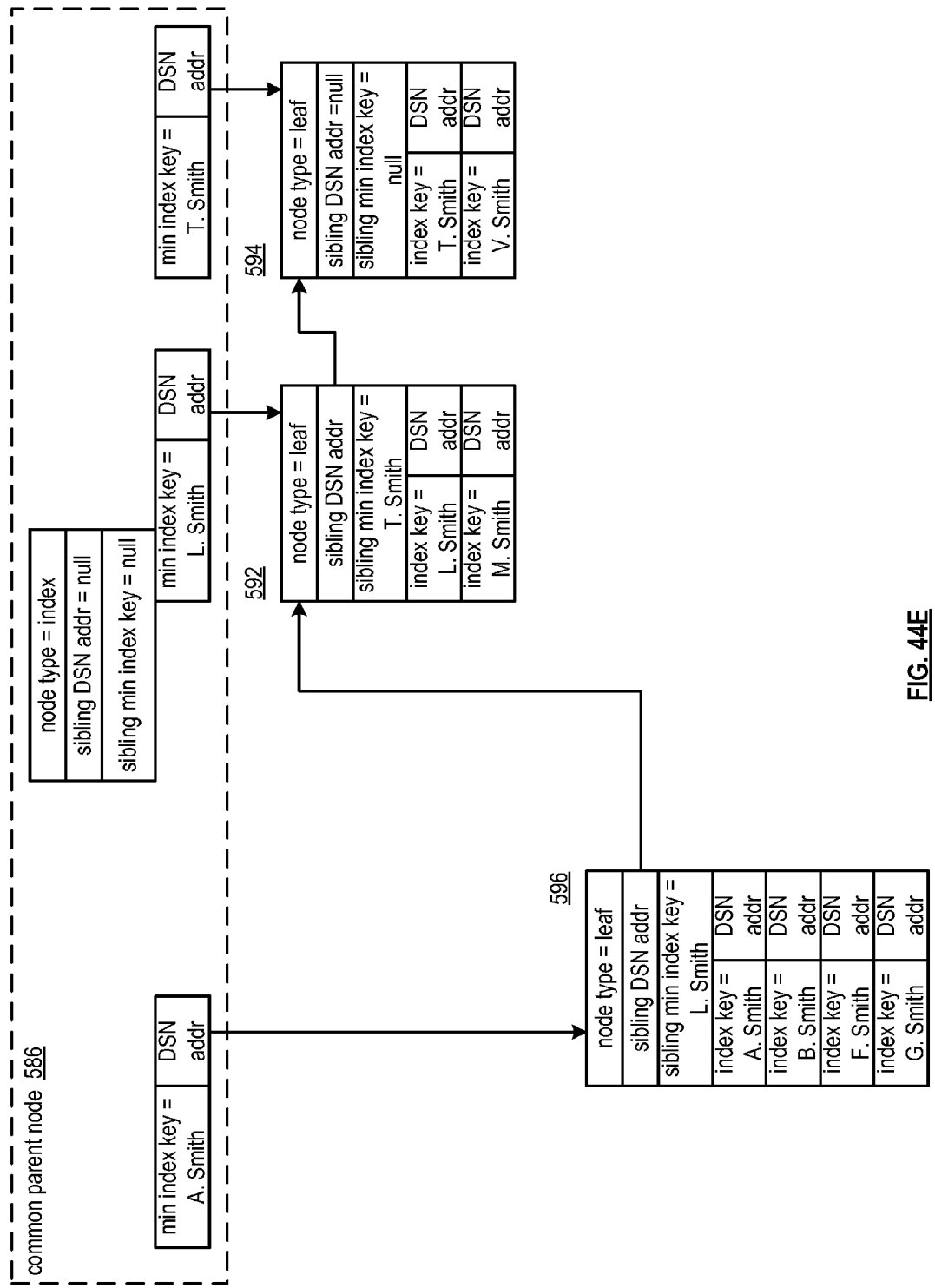
FIG. 44E is a diagram illustrating an example of the index structure of another step of the series of example steps depicted in FIGS. 44D through 44J in accordance with the present invention.
Figure 44F:
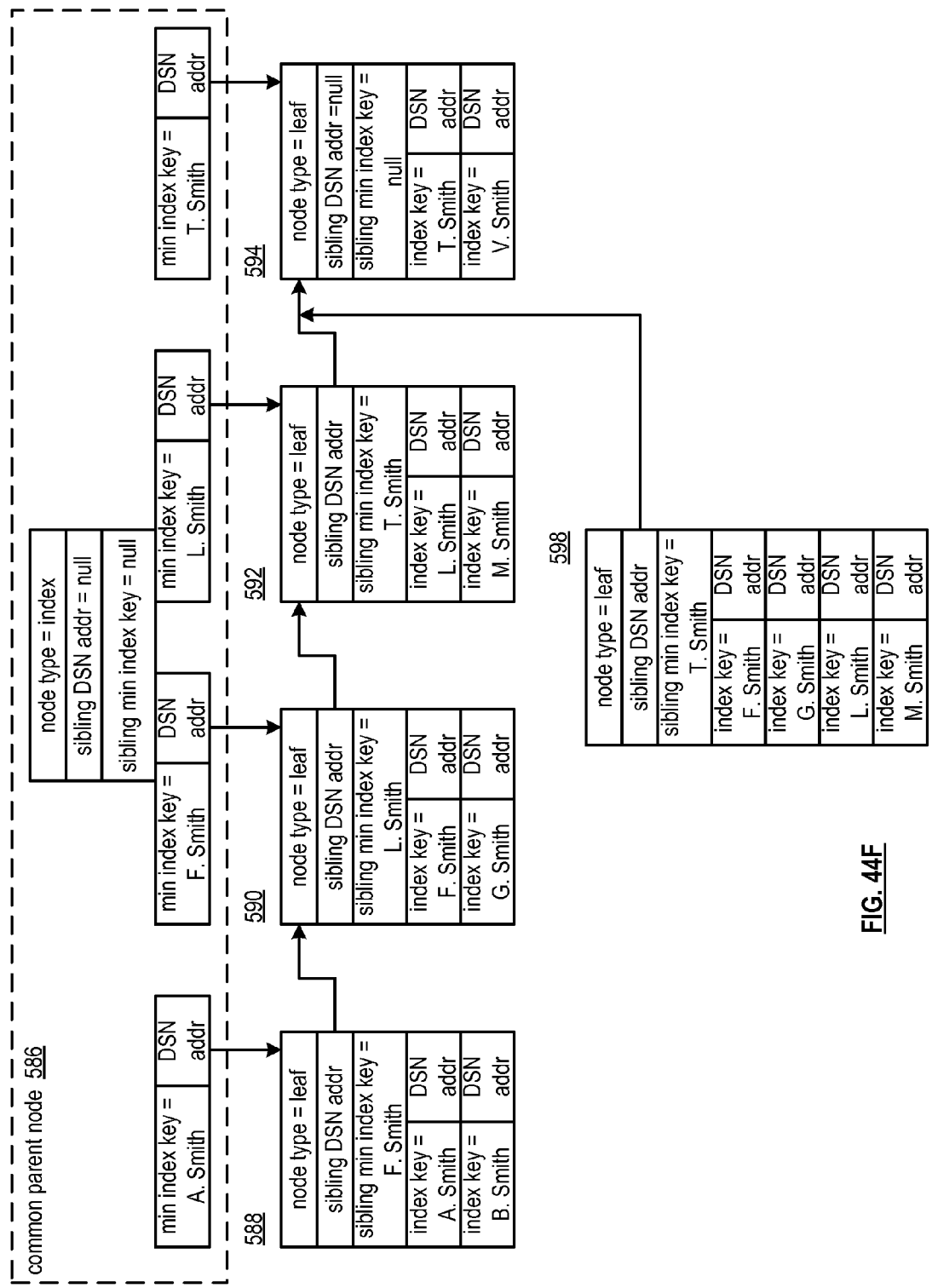
FIG. 44F is a diagram illustrating an example of the index structure of another step of the series of example steps depicted in FIGS. 44D through 44J in accordance with the present invention.
Figure 44G:
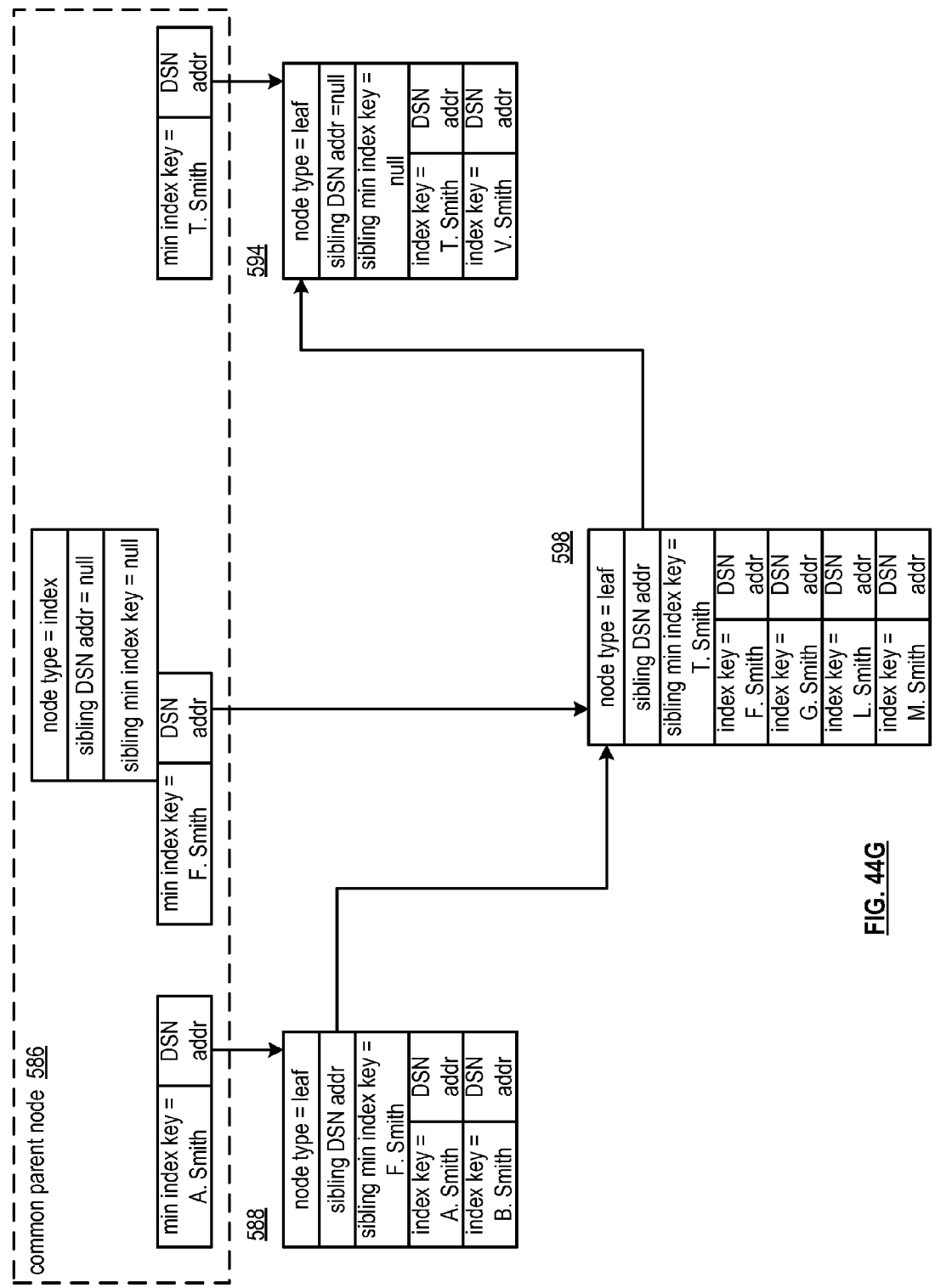
FIG. 44G is a diagram illustrating an example of the index structure of another step of the series of example steps depicted in FIGS. 44D through 44J in accordance with the present invention.
Figure 44H:
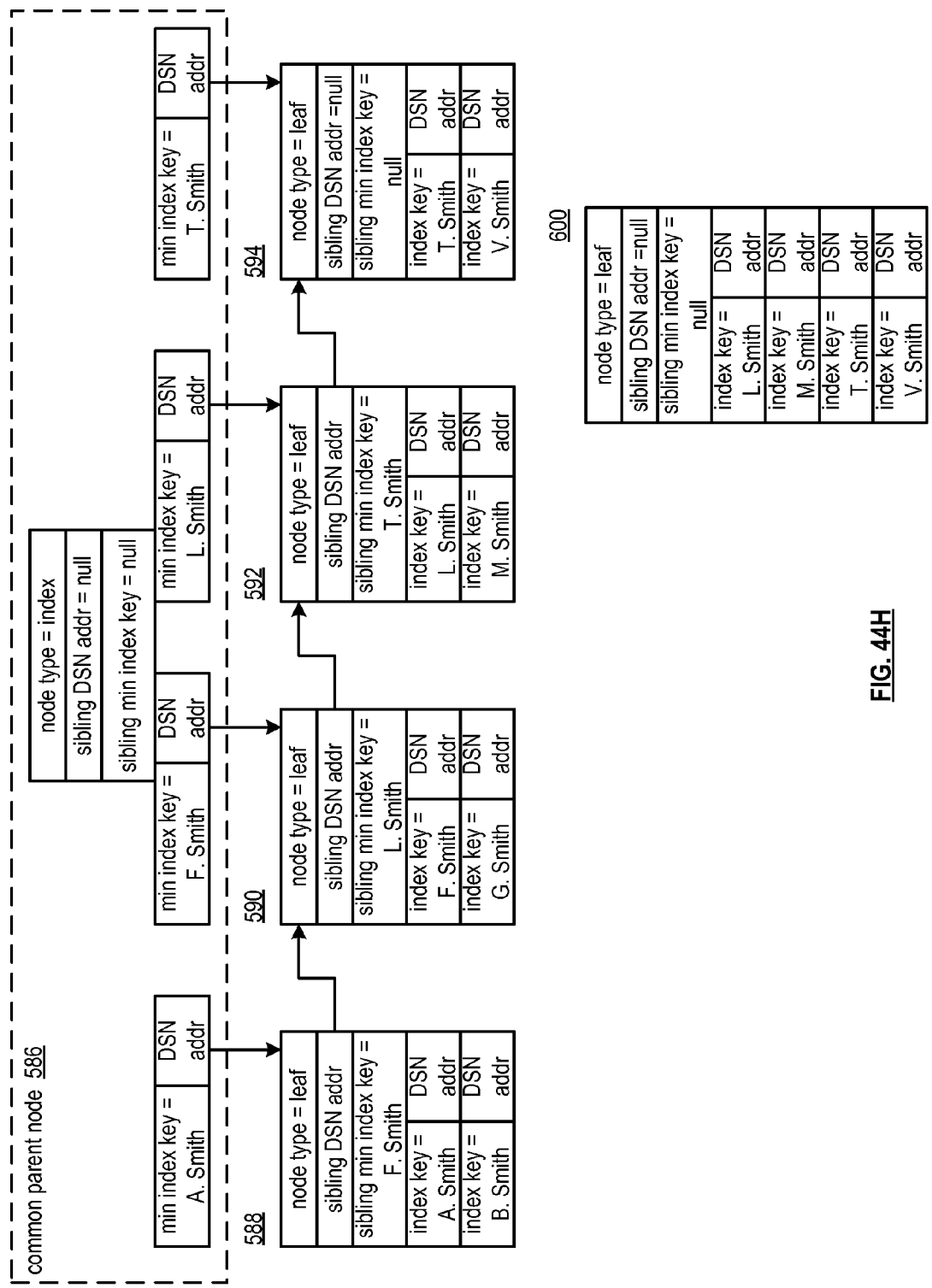
FIG. 44H is a diagram illustrating an example of the index structure of another step of the series of example steps depicted in FIGS. 44D through 44J in accordance with the present invention.
Figure 44J:
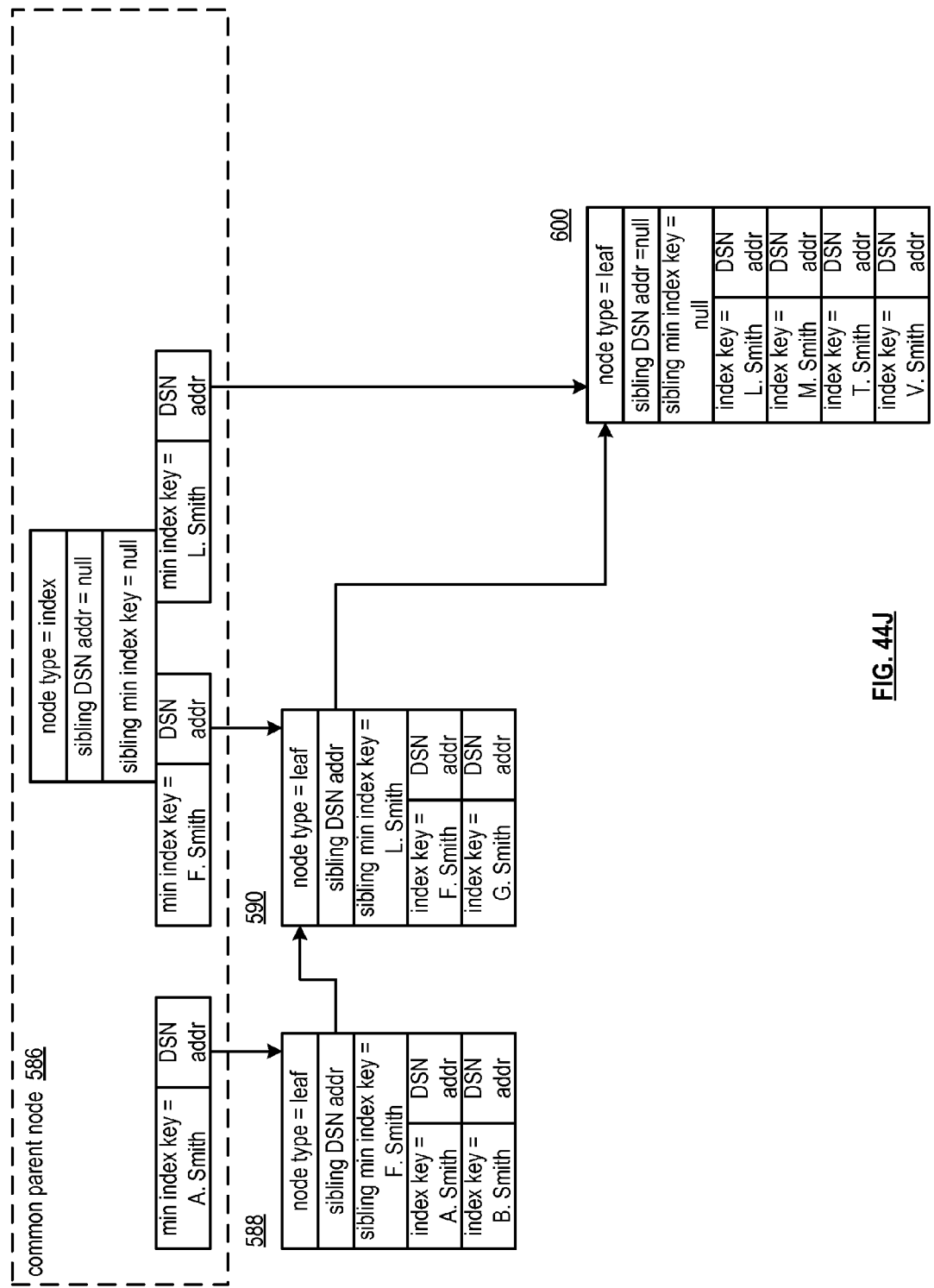
FIG. 44J is a diagram illustrating an example of the index structure of another step of the series of example steps depicted in FIGS. 44D through 44J in accordance with the present invention.

The dispersed index enables merging of two leaf nodes (e.g., two data object level index nodes) when a determination is made to merge the two leaf nodes. The determination may be based on one or more of a number of leaf nodes of a data object level, a number of data object index keys associated with a leaf node, a request, a frequency of access level, and a performance level of the dispersed index. The series of example steps depicted in FIGS. 44D through 44J represent three examples of the merging. FIGS. 44D-E illustrate an example of the merging when leaf node 588 is identified as one data object level index node of the two data object index level nodes. FIGS. 44F-G illustrate another example of the merging when leaf node 590 is identified as the one data object level index node of the two data object index level nodes. FIGS. 44H-J illustrate another example of the merging when leaf node 592 or 594 is identified as the one data object level index node of the two data object index level nodes. The method to merge the two leaf nodes is discussed in greater detail with reference to FIGS. 44D through 44L.

FIG. 44D is a diagram illustrating an example of the index structure of another step of the series of example steps depicted in FIGS. 44D through 44J. FIGS. 44D-E illustrate an example of the merging when leaf node 588 is identified as one data object level index node of the two data object index level nodes. In a first sub-step of the merging, data object level index node (e.g., leaf node) 588 is selected for merging. In a second sub-step of the merging, data object level index node 590 is identified for merging with the selected data object level index node to produce the two data object level index nodes. In a third sub-step of the merging, the two data object level index nodes are merged into a temporarily merged data object level index node 596 where the temporarily merged data object level index node includes a sibling entry (e.g., sibling dispersed storage network (DSN) address and sibling minimum index key) that is identical to the sibling entry of data object level node 590 and includes data object entries of the two data object level index nodes. In a fourth sub-step of the merging, the temporarily merged data object level index node 596 is stored in the DSN.

FIG. 44E is a diagram illustrating an example of the index structure of another step of the series of example steps depicted in FIGS. 44D through 44J. FIGS. 44D-E illustrate an example of the merging when leaf node 588 is identified as one data object level index node of the two data object index level nodes. In a fifth sub-step of the merging, the common parent index node 586 is updated to include overwriting a dispersed storage network (DSN) address of a child entry associated with data object level index node 588 with a DSN address of the temporarily merged data object level index node 596 and to remove a child entry associated with data object level index node 590. In a sixth sub-step of the merging, the two data object level index nodes 588-590 are deleted. When a change is detected of either the common parent index node 586 or the two data object level index nodes 588-590 subsequent to the first sub-step of the merging and prior to final confirmation of deletion of the two data object level index nodes 588-590, the merging includes facilitating rolling back the updating of the common parent index node 586 and the deletion of the two data object level index nodes 588-590. The facilitating may also include deletion of the temporarily merged data object level index node 596 from the DSN.

FIG. 44F is a diagram illustrating an example of the index structure of another step of the series of example steps depicted in FIGS. 44D through 44J. FIGS. 44F-G illustrate another example of the merging when leaf node 590 is identified as the one data object level index node of the two data object index level nodes. In a first sub-step of the merging, data object level index node (e.g., leaf node) 590 is selected for merging. In a second sub-step of the merging, data object level index node 592 is identified for merging with the selected data object level index node to produce the two data object level index nodes. In a third sub-step of the merging, the two data object level index nodes are merged into a temporarily merged data object level index node 588 where the temporarily merged data object level index node 588 includes a sibling entry (e.g., sibling dispersed storage network (DSN) address and sibling minimum index key) that is identical to the sibling entry of data object level node 592 and includes data object entries of the two data object level index nodes. In a fourth sub-step of the merging, the temporarily merged data object level index node 598 is stored in the DSN.

FIG. 44G is a diagram illustrating an example of the index structure of another step of the series of example steps depicted in FIGS. 44D through 44J. FIGS. 44F-G illustrate another example of the merging when leaf node 590 is identified as the one data object level index node of the two data object index level nodes. In a fifth sub-step of the merging, the common parent index node 586 is updated to include overwriting a dispersed storage network (DSN) address of a child entry associated with data object level index node 590 with a DSN address of the temporarily merged data object level index node and to remove a child entry associated with data object level index node 592. In a sixth sub-step of the merging, the two data object level index nodes 590-592 are deleted. When a change is detected of either the common parent index node 586 or the two data object level index nodes 590-592 subsequent to the first sub-step of the merging and prior to final confirmation of deletion of the two data object level index nodes 590-592, the merging includes facilitating rolling back the updating of the common parent index node 586 and the deletion of the two data object level index nodes 590-592. The facilitating may also include deletion of the temporarily merged data object level index node 598 from the DSN.

FIG. 44H is a diagram illustrating an example of the index structure of another step of the series of example steps depicted in FIGS. 44D through 44J. FIGS. 44H-J illustrate another example of the merging when leaf node 592 or 594 is identified as the one data object level index node of the two data object index level nodes. In a first sub-step of the merging, data object level index node (e.g., leaf node) 582 or 594 is selected for merging. In a second sub-step of the merging, data object level index node 594 is identified for merging with the selected data object level index node to produce the two data object level index nodes when leaf node 592 is the node selected for merging. Alternatively, the second sub-step of the merging includes identifying data object level index node 592 for merging with the selected data object level index node to produce the two data object level index node when leaf node 594 is the node selected for merging. In a third sub-step of the merging, the two data object level index nodes are merged into a temporarily merged data object level index node 600 where the temporarily merged data object level index node 600 includes a sibling entry (e.g., sibling dispersed storage network (DSN) address and sibling minimum index key) that is identical to the sibling entry of data object level node 594 and includes data object entries of the two data object level index nodes. In a fourth sub-step of the merging, the temporarily merged data object level index node 600 is stored in the DSN.

FIG. 44J is a diagram illustrating an example of the index structure of another step of the series of example steps depicted in FIGS. 44D through 44J. FIGS. 44H-J illustrate another example of the merging when leaf node 592 or 594 is identified as the one data object level index node of the two data object index level nodes. In a fifth sub-step of the merging, the common parent index node 586 is updated to include overwriting a dispersed storage network (DSN) address of a child entry associated with data object level index node 592 with a DSN address of the temporarily merged data object level index node 600 and to remove a child entry associated with data object level index node 594. In a sixth sub-step of the merging, the two data object level index nodes 592-594 are deleted. When a change is detected of either the common parent index node 586 or the two data object level index nodes 592-594 subsequent to the first sub-step of the merging and prior to final confirmation of deletion of the two data object level index nodes 592-594, the merging includes facilitating rolling back the updating of the common parent index node 586 and the deletion of the two data object level index nodes 592-594. The facilitating may also include deletion of the temporarily merged data object level index node 600 from the DSN.

Figure 44K:
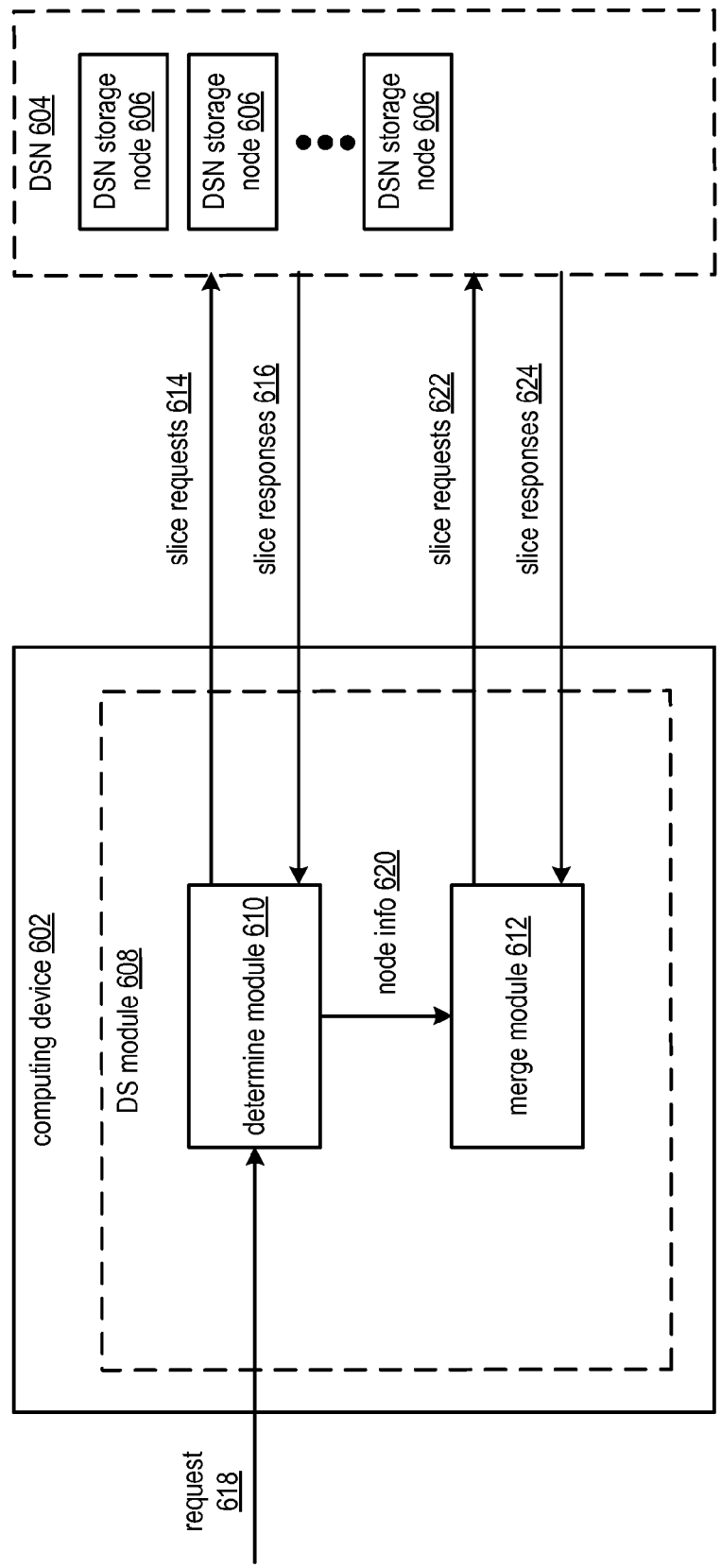
FIG. 44K is a schematic block diagram of another embodiment of a dispersed storage system in accordance with the present invention.

FIG. 44K is a schematic block diagram of another embodiment of a dispersed storage system that includes a computing device 602 and a dispersed storage network (DSN) 604. The DSN 604 may be implemented utilizing one or more of multiple computers, multiple computing devices, a DSN memory, a distributed storage and task network (DSTN), a DSTN module, and a plurality of storage nodes. The DSN 604 includes a plurality of DSN storage nodes 606. The plurality of DSN storage nodes 606 includes at least one set of DSN storage nodes 606. Each DSN storage node 606 of the plurality of DSN storage nodes 606 may be implemented utilizing at least one of a storage server, a storage unit, a dispersed storage (DS) unit, a storage module, a memory device, a memory, a distributed storage and task (DST) execution unit, a user device, a DST processing unit, and a DST processing module. The computing device 602 may be implemented utilizing at least one of a server, a storage unit, a DSN storage node 606, a DS unit, a storage server, a storage module, a DS processing unit, a DS unit, a DST execution unit, a user device, a DST processing unit, and a DST processing module. For example, the DSN 604 includes the computing device 602 when the computing device 602 is implemented utilizing a DSN storage node 606. The computing device 602 includes a dispersed storage (DS) module 608. The DS module 608 includes a determine module 610 and a merge module 612.

The system functions to determine to merge two data object level index nodes and to merge the two data object level index nodes where a hierarchical ordered index structure includes the two data object level index nodes with regards to storage of a plurality of data objects in the DSN 604. A plurality of data object index entries (e.g., each entry including a DSN address and a data object index key associated with a data object) is associated with the plurality of data objects, where the plurality of data object index entries is organized into the hierarchical ordered index structure in accordance with an ordering of attributes of an attribute category.

With regards to merging the two data object level index nodes, the determine module 610 determines to merge the two data object level index nodes. The determine module 610 determines to merge two data object level index nodes by at least one of a variety of determine approaches. A first determine approach includes the determine module 610 determining that at least one of the two data object level index nodes includes too few data object index entries. The determining includes the determine module 610 issuing slice requests 614 to the DSN 604, receiving slice responses 616 that includes slices of the two data object level index nodes, and decoding slices to reproduce the two data object level index nodes. The determine module 610 may further identify another of the two data object level index nodes by identifying another data object level index when a sibling node (i.e. to the right of the one data object level index node) exists, extract a DSN address of the sibling node. Alternatively, when a sibling node does not exist, the determine module 610 identifies an adjacent data object level index node to the left by accessing a parent node (e.g., a next level node) and identifying a DSN address of the adjacent data object level index node from the parent node.

A second determine approach of the variety of determine approaches includes the determine module 610 determining that at least one of the two data object level index nodes includes too few data object index entry accesses in a given time frame. A third determine approach includes the determine module 610 receiving a request 618 (e.g., after deleting several data objects associated with the data object level index node). A fourth determine approach includes the determine module 610 determining that the hierarchical ordered index structure includes too many data object level index nodes. A fifth determine approach includes the determine module 610 detecting that an access performance level of the hierarchical ordered index structure compares unfavorably to a minimum access performance level threshold (e.g., unfavorable when access performance level is less than the minimum access performance level threshold). The detecting the access performance level includes at least one of initiating a query, performing a test, accessing a historical performance record, and a lookup. The determining to merge the two data object level index nodes may also include the determine module 610 outputting node information 620, where the node information includes identifiers for the two data object level index nodes, DSN addresses of each of the two data object level index nodes, and the two data object level index nodes (e.g., reconstructed from slices of slice responses 616).

With regards to merging the two data object level index nodes, the merge module 612, when the two data object level index nodes are to be merged, enters a loop that includes a series of loop steps. In a first loop step, the merge module 612 merges the two data object level index nodes into a temporarily merged data object level index node. The merge module 612 merges the two data object level index nodes by a series of merging steps. A first merging step includes the merge module 612 aggregating first data object index entries of a first one of the two data object level index nodes with second data object index entries of a second one of the two data object level index nodes to produce unsorted merged data object index entries. For example, the merge module 612 issues slice requests 622 with regards to slices of the two data object level index nodes, receives slice responses 624 that includes index slices of the two data object level index nodes, and decodes the index slices to reconstruct the two data object level index nodes. A second merging step includes the merge module 612 sorting the unsorted merged data object index entries in accordance with the ordering of attributes of the attribute category to produce sorted merged data object index entries. A third merging step includes the merge module 612 generating an adjacent data object level index node reference (e.g., a sibling index node entry) based on one or more adjacent data object level index nodes of the two data object level index nodes. For example, the merge module 612 generates the reference to include a DSN address and a minimum data object index key for a sibling to the right of the two data object level index nodes when the sibling node exists, if not, the merge module 612 generates a null sibling entry as the reference (e.g., that includes a null DSN address and null key).

In a second loop step, the merge module 612 performs a series of sub-loop steps to initiate updating of the hierarchical ordered index structure. In a first sub-loop step, the merge module 612 identifies a DSN address for storing the temporarily merged data object level index node (e.g., generate a new DSN address). In a second sub-loop step, the merge module 612 sets up deletion of the two data object level index nodes. The merge module 612 sets up deletion of the two data object level index nodes by a series of deletion steps. A first deletion step includes the merge module 612 identifying a first set of DSN storage nodes 606 storing a first set of encoded index slices for a first one of the two data object level index nodes (e.g., based on a lookup). A second deletion step includes the merge module 612 identifying a second set of DSN storage nodes storing a second set of encoded index slices for a second one of the two data object level index nodes (e.g., based on a lookup, may be same or different as first set of DSN nodes). A third deletion step includes the merge module 612 sending a first set of deletion commands to the first set of DSN storage nodes 606 (e.g., slice requests 622 that includes checked writes for deleting). A fourth deletion step includes the merge module 612 sending a second set of deletion commands to the second set of DSN storage nodes.

In a third sub-loop step, the merge module 612 sets up linking the temporarily merged data object level index node to a next level node (e.g., a parent node) of the hierarchical ordered index structure. The merge module 612 sets up linking the temporarily merged data object level index node to the next level node by a series of linking steps. A first linking step includes the merge module 612 obtaining the DSN address for storing the temporarily merged data object level index node. A second linking step includes the merge module 612 identifying a first entry of the next level node corresponding to a first one of the two data object level index nodes (e.g., data object entry with a minimum index key that sorts ahead of a second entry). A third linking step includes the merge module 612 identifying a second entry of the next level node corresponding to a second one of the two data object level index nodes (e.g., data object entry with a minimum index key that sorts after that of the first entry). A fourth linking step includes the merge module 612 requesting updating the first entry of the next level node by overwriting a DSN address of the first one of the two data object level index nodes with the DSN address for storing the temporarily merged data object level index node. A fifth linking step includes the merge module 612 requesting deleting of the second entry (e.g., not required anymore).

Alternatively, or in addition to, the merge module 612 may initiate updating of the hierarchical ordered index structure to include a series of additional updating steps. In a first additional updating step, the merge module 612 sets up linking the temporarily merged data object level index node to one or more adjacent data object level nodes of the hierarchical ordered index structure. For example, when the adjacent data object level is in the structure to the left, the merge module 612 overwrites a sibling entry within the adjacent data object level node to the left with information of the temporarily merged data object level index node. In particular, the merge module 612 may set up linking the temporarily merged data object level index node to one or more adjacent data object level nodes by obtaining the DSN address for storing the temporarily merged data object level index node and requesting updating an entry of each of the one or more adjacent data object level nodes by overwriting a DSN address for one of the two data object level index nodes with the DSN address for storing the temporarily merged data object level index node. For example, the merge module 612 overwrites a previous sibling DSN address with the DSN address for storing the temporarily merged data object level index node facilitates storing of the adjacent data object level index node in the DSN based on a previous revision number of the adjacent data object level index node. In a second additional updating step of the series of additional updating steps, the merge module 612 determines, subsequent to merging the two data object level index nodes, whether a change has occurred to the one or more adjacent data object level nodes (e.g., any entry changed, added, or deleted). When a change has occurred, the merge module 612 issues rollback transaction requests to the DSN with regards to previous write or delete transactions of the updating of the index structure.

In a fourth sub-loop step, the merge module 612 determines, subsequent to merging the two data object level index nodes, whether a change has occurred to at least one of one or more of the two data object level index nodes and the next level node (e.g., any entry changed, added, or deleted). The merge module 612 determines whether the change has occurred to the one or more of the two data object level index nodes by at least one of a plurality of approaches. A first approach includes the merge module 612 receiving slice responses 624 that includes a first revision level discrepancy response from one or more of the first set of DSN storage nodes 606 to indicate that the first one of the one or more of the two data object level index nodes has changed. For example, the merge module 612 receives status codes from the first set of DSN storage nodes 606 indicating whether there is a checked write error due to a revision mismatch and indicating a change has not occurred when at least a write threshold number of status codes indicate that there is no mismatch. A second approach includes the merge module 612 receiving a second revision level discrepancy response from one or more of the second set of DSN storage nodes 606 to indicate that the second one of the one or more of the two data object level index nodes has changed.

In a third loop step of merging the two data object level index nodes, the merge module 612, when the change has occurred, repeats the loop. The merge module 612 repeats the loop by undoing the merging of the temporarily merged data object level index node and undoing the initiating of the updating of the hierarchical ordered index structure using a checked write DSN process. The undoing includes issuing rollback transaction requests as slice requests 622 to the DSN 604 for each previously issued write commands and/or delete commands included in slice requests 622.

Alternatively, in the third loop step, the merge module 612, when the change has not occurred, commences the updating of the hierarchical ordered index structure. The merge module 612 commences the updating of the hierarchical ordered index structure by a series of commencing steps. A first commencing step includes the merge module 612 dispersed storage error encoding the temporarily merged data object level index node to produce a set of encoded merged index slices. A second commencing step includes the merge module 612 issuing a set of slice requests 622 that includes a set of write commands to store the set of encoded merged index slices at the DSN address for storing the temporarily merged data object level index node. A third commencing step includes the merge module 612 issuing a first set of delete commands as slice requests 622 (e.g., checked write requests for deletion) to the first set of DSN storage nodes 606 that is storing a first set of encoded index slices of a first one of the two data object level index nodes. A fourth commencing step includes the merge module 612 issuing a second set of delete commands to the second set of DSN storage nodes 606 that is storing a second set of encoded index slices of a second one of the two data object level index nodes. A fifth commencing step includes the merge module 612 reconstructing the next level node from a set of next level index slices (e.g., decode using dispersed storage error coding function). A sixth commencing step includes the merge module 612 updating the reconstructed next level node to include the DSN address of the temporarily merged data object level index node to produce an updated next level node. A seventh commencing step includes the merge module 612 dispersed storage error encoding the updated next level node to produce a set of updated next level index slices. The series of commencing steps may also include the merge module 612 facilitating storage of a write threshold number of the updated next level index slices by issuing slice request 622 to the DSN 604 that includes the updated next level index slices.

Figure 44L:
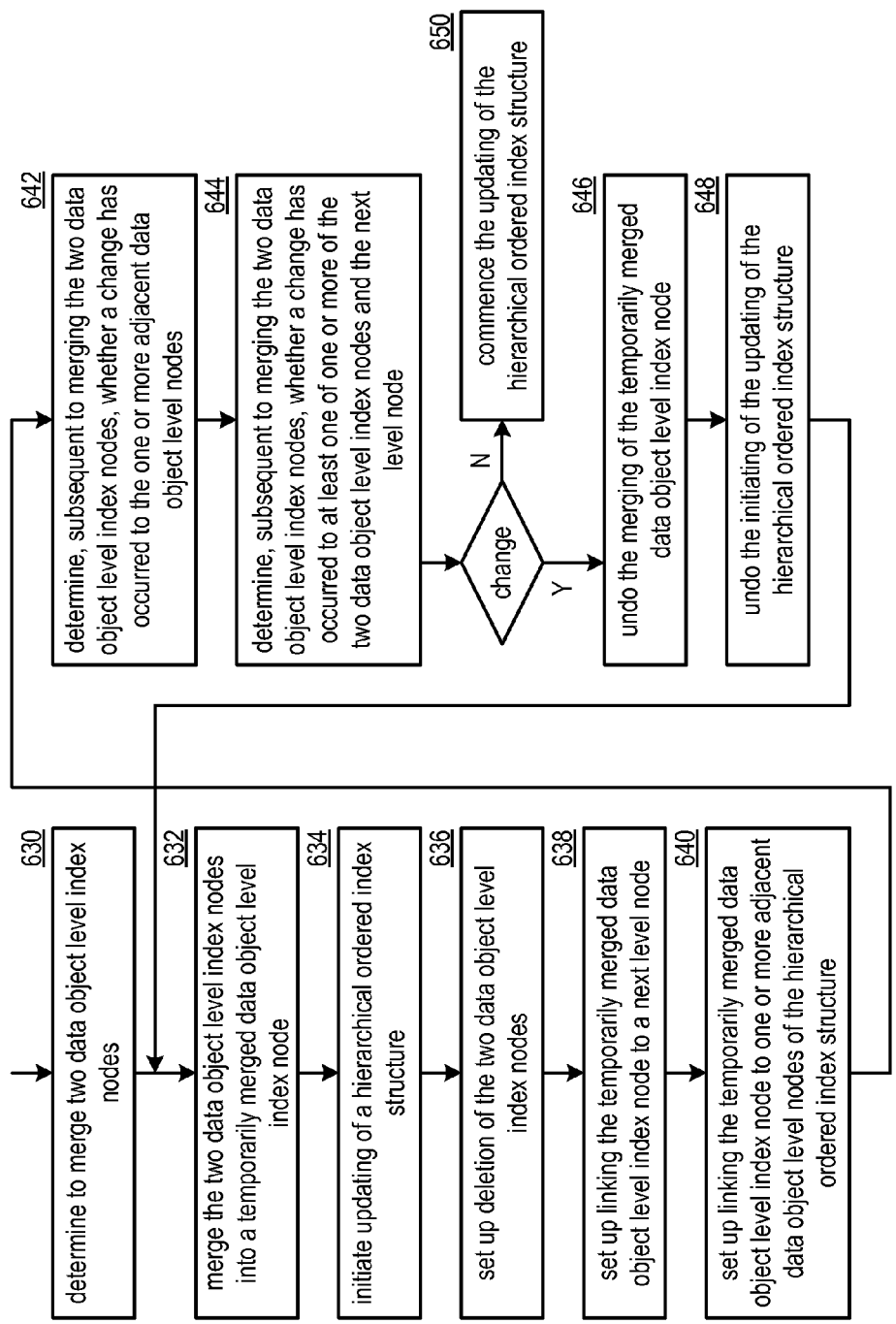
FIG. 44L is a flowchart illustrating an example of joining nodes of an index in accordance with the present invention.

FIG. 44L is a flowchart illustrating an example of joining nodes of an index. The method begins at step 630 where a processing module (e.g., of a computer of a multiple computer dispersed storage network (DSN) that stores a plurality of data objects) determines to merge two data object level index nodes, where a plurality of data object index entries (e.g., data object index key and DSN address of a corresponding data object) is associated with the plurality of data objects. The plurality of data object index entries is organized into a hierarchical ordered index structure in accordance with an ordering of attributes of an attribute category, where the hierarchical ordered index structure includes the two data object level index nodes.

The determining to merge two data object level index nodes includes at least one of a variety of determination approaches. A first determination approach includes determining that at least one of the two data object level index nodes includes too few data object index entries. For example, the processing module deletes one or more data index entries of the one of the two data object level index nodes, counts the number of data index entries, and compares the count to an entry threshold. For instance, the processing module determines that the number of data index entries in the one of the two data object level index nodes is less than the entry threshold when there are too few data index entries in the one of the two data object level index nodes.

The processing module may also identify another data object level index node of the two data object level index nodes based on identifying a sibling index node or an adjacent data object level index node to the left of the one data object level index node. A second determination approach includes determining that at least one of the two data object level index nodes includes too few data object index entry accesses in a given time frame. A third determination approach includes receiving a request (e.g., after deleting several data objects associated with the data object level index node). A fourth determination approach includes determining that the hierarchical ordered index structure includes too many data object level index nodes. A fifth determination approach includes detecting that an access performance level of the hierarchical ordered index structure compares unfavorably to a minimum access performance level threshold (e.g., unfavorable when access performance level is less than the minimum access performance level threshold).

When the two data object level index nodes are to be merged, the method at step 632 enters a loop where the processing module merges the two data object level index nodes into a temporarily merged data object level index node. The merging the two data object level index nodes includes a series of merging steps. A first merging step includes aggregating first data object index entries of a first one of the two data object level index nodes with second data object index entries of a second one of the two data object level index nodes to produce unsorted merged data object index entries. A second merging step includes sorting the unsorted merged data object index entries in accordance with the ordering of attributes of the attribute category to produce sorted merged data object index entries. A third merging step includes generating an adjacent data object level index node reference (e.g., sibling entry) based on one or more adjacent data object level index nodes of the two data object level index nodes. For example, the processing module generates a DSN address and minimum index key for a sibling to the right of the two data object level index nodes when the sibling node exists, if not, the processing module generates a null sibling entry as the reference (e.g., that includes a null DSN address and null key).

The method continues at step 634 where the processing module initiates updating of the hierarchical ordered index structure where the processing module identifies a DSN address for storing the temporarily merged data object level index node (e.g., generate a new DSN address). The method continues at step 636 where the processing module sets up deletion of the two data object level index nodes. The setting up deletion of the two data object level index nodes includes a series of deletion steps. A first deletion step includes identifying a first set of DSN storage nodes storing a first set of encoded index slices for a first one of the two data object level index nodes (e.g., based on a lookup). A second deletion step includes identifying a second set of DSN storage nodes storing a second set of encoded index slices for a second one of the two data object level index nodes (e.g., based on a lookup, may be same or different set of DSN nodes). A third deletion step includes sending a first set of deletion commands to the first set of DSN storage nodes (e.g., checked write for deleting). A fourth deletion step includes sending a second set of deletion commands to the second set of DSN storage nodes.

The method continues at step 638 where the processing module sets up linking the temporarily merged data object level index node to a next level node (e.g., a parent node of the two data object level index nodes) of the hierarchical ordered index structure. The setting up linking the temporarily merged data object level index node to the next level node includes a series of set up steps. A first set up step includes obtaining the DSN address for storing the temporarily merged data object level index node. A second set up step includes identifying a first entry of the next level node corresponding to a first one of the two data object level index nodes (e.g., data object entry with a minimum index key that sorts ahead of a second entry). A third set up step includes identifying a second entry of the next level node corresponding to a second one of the two data object level index nodes (e.g., data object entry with a minimum index key that sorts after that of the first entry). A fourth set up step includes requesting updating the first entry of the next level node by overwriting a DSN address of the first one of the two data object level index nodes with the DSN address for storing the temporarily merged data object level index node. A fifth set up step includes requesting deleting of the second entry (e.g., not required anymore).

The method continues at step 640 where the processing module sets up linking the temporarily merged data object level index node to one or more adjacent data object level nodes of the hierarchical ordered index structure. The setting up linking the temporarily merged data object level index node to one or more adjacent data object level nodes includes a series of set up steps. A first set up step includes obtaining the DSN address for storing the temporarily merged data object level index node. A second set up step includes requesting updating an entry of each of the one or more adjacent data object level nodes by overwriting a DSN address for one of the two data object level index nodes with the DSN address for storing the temporarily merged data object level index node. For example, the processing module overwrites a previous sibling DSN address with the DSN address for storing the temporarily merged data object level index node. The setting up further includes storing the at least one of the one or more adjacent data object level nodes in the DSN based on a previous revision number of the other data object level index node (e.g., issuing checked write commands to the DSN).

The method continues at step 642 where the processing module determines, subsequent to merging the two data object level index nodes, whether a change has occurred to the one or more adjacent data object level index nodes (e.g., any entry changed, added, or deleted; as indicated by a revision mismatch error message of a checked write responses). The method continues at step 644 where the processing module determines, subsequent to merging the two data object level index nodes, whether a change has occurred to at least one of one or more of the two data object level index nodes and the next level node (e.g., any entry changed, added, or deleted). The determining whether the change has occurred to the one or more of the two data object level index nodes includes at least one of a variety of approaches. A first approach includes receiving a first revision level discrepancy response from one or more of the first set of DSN storage nodes to indicate that the first one of the one or more of the two data object level index nodes has changed (e.g., a revision mismatch indicator in a checked write response). A second approach includes receiving a second revision level discrepancy response from one or more of the second set of DSN storage nodes to indicate that the second one of the one or more of the two data object level index nodes has changed. When the change has occurred (e.g., to one or more of the one or more adjacent data object level nodes, one or more of the two data object level index nodes, and the next level node), the method branches to step 646.

When the change has not occurred the method continues to step 650. When the change has not occurred, the method continues at step 650 where the processing module commences the updating of the hierarchical ordered index structure. The commencing the updating of the hierarchical ordered index structure includes a series of commencing steps. A first commencing step includes dispersed storage error encoding the temporarily merged data object level index node to produce a set of encoded merged index slices. A second commencing step includes issuing a set of write commands to store the set of encoded merged index slices at the DSN address for storing the temporarily merged data object level index node. A third commencing step includes issuing a first set of delete commands to a first set of DSN storage nodes that is storing a first set of encoded index slices of a first one of the two data object level index nodes. A fourth commencing step includes issuing a second set of delete commands to a second set of DSN storage nodes that is storing a second set of encoded index slices of a second one of the two data object level index nodes. A fifth commencing step includes reconstructing the next level node from a set of next level index slices (e.g., decode using dispersed storage error coding function). A sixth commencing step includes updating the reconstructed next level node to include the DSN address of the temporarily merged data object level index node to produce an updated next level node. A seventh commencing step includes dispersed storage error encoding the updated next level node to produce a set of updated next level index slices (e.g., may also include facilitating storage of a write threshold number of the updated next level index slices).

When the change has occurred, the method continues at step 646, where the step includes the processing module undoing the merging of the temporarily merged data object level index node. For example, the processing module facilitates deletion of the temporarily merged data object level index node. The method continues at step 648, where the step includes the processing module undoing the initiating of the updating of the hierarchical ordered index structure using a checked write DSN process. For example, the processing module facilitates issuing rollback transaction requests to the DSN for each previously issued write or delete command associated with the one or more adjacent data object level nodes, the two data object level index nodes, and the next level node. The method loops back to step 632 to start over.

FIG. 45A is a diagram illustrating another example of an index structure prior to splitting a node. An index structure diagram representing the index structure after the splitting of the node is represented in FIG. 45B. The index structure includes three nodes of an index. The three nodes includes an index node stored in a distributed storage and task network (DSTN) at a source name address of 4F7 and two leaf nodes stored at source name addresses 5AB and 52D, wherein the leaf node stored at source name address 5AB is split in the example as illustrated in FIG. 45B.

The index node includes a node type indicating not a leaf node (e.g., index node), a sibling node source name pointing to an index node stored at source name 42C, a sibling minimum index key of "j", a child 1 source name of 5AB, a child 1 minimum index key of "a", a child 2 source name of 52D, and a child 2 minimum index key of "d". The leaf node stored at source name 5AB includes a node type indicating a leaf node, a sibling node source name pointing to the leaf node stored at source name 52D, a sibling minimum index key of "d", a data 1 source name of 76B, a data 1 index key of "a", a data 2 direct data entry (e.g., b39d5ac9), and a data 2 index key of "b". The leaf node stored at source name 52D includes a node type indicating a leaf node, a sibling node source name pointing to a leaf node stored at source name 539, a sibling minimum index key of "j", a data 1 source name of 8F6, and a data 1 index key of "d".

FIG. 45B is a diagram illustrating another example of an index structure after splitting a leaf node illustrated in FIG. 45A. An index structure diagram representing the index structure prior to splitting the node is represented in FIG. 45A. The index structure after the splitting includes four nodes of an index. The four nodes includes an index node stored in a distributed storage and task network (DSTN) at a source name address of 4F7, a leaf node stored at source name address 5AB that was split, a new leaf node stored at source name 9D4C that resulted from the split, and a leaf node stored at source name address 52D.

The new leaf node includes one or more data entries of the leaf node stored at source name address 5AB. For example, half of the data entries of the leaf node stored at source name address 5AB are included in the new leaf node. The index node includes a node type indicating not a leaf node (e.g., index node), a sibling node source name pointing to an index node stored at source name 42C, a sibling minimum index key of "j", a child 1 source name of 5AB and a child 1 minimum index key of "a", a child 2 source name of 9D4C and a child 2 minimum index key of "b", and a child 3 source name of 52D and a child 3 minimum index key of "d". The leaf node stored at source name 5AB includes a node type indicating a leaf node, a sibling node source name pointing to the new leaf node stored at source name 9D4C, a sibling minimum index key of "b", and a data 1 source name of 76B and a data 1 index key of "a". The leaf node stored at source name 9D4C includes a node type indicating a leaf node, a sibling node source name pointing to the leaf node stored at source name 52D, a sibling minimum index key of "d", and a data 2 direct data entry (e.g., b39d5ac9) and a data 2 index key of "b". The leaf node stored at source name 52D includes a node type indicating a leaf node, a sibling node source name pointing to a leaf node stored at source name 539, a sibling minimum index key of "j", and a data 1 source name of 8F6 and a data 1 index key of "d".

Figure 45C:
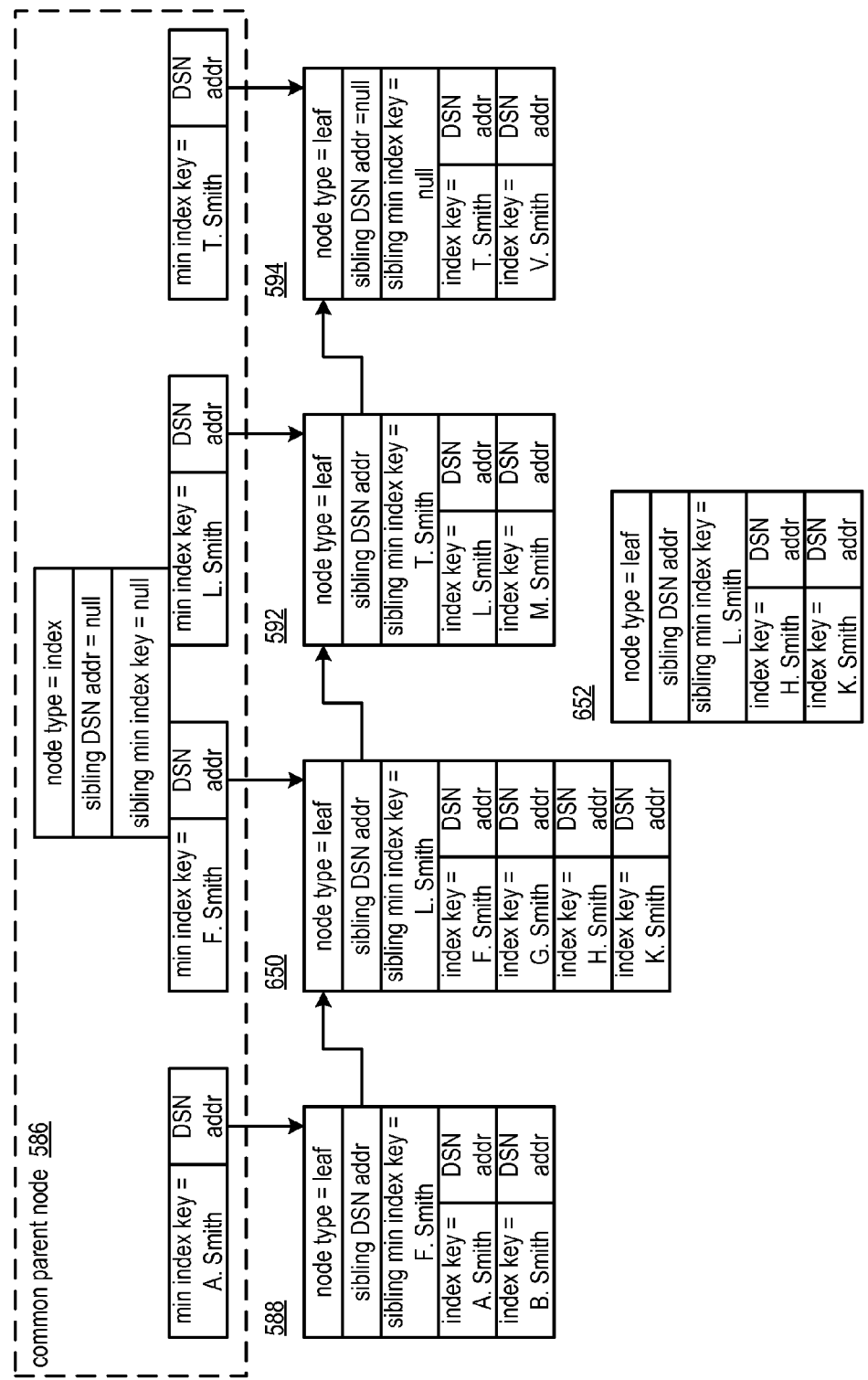
FIG. 45C is a diagram illustrating an example of an index structure of a starting step of a series of example steps depicted in FIGS. 44C and 44D in accordance with the present invention.
Figure 45D:
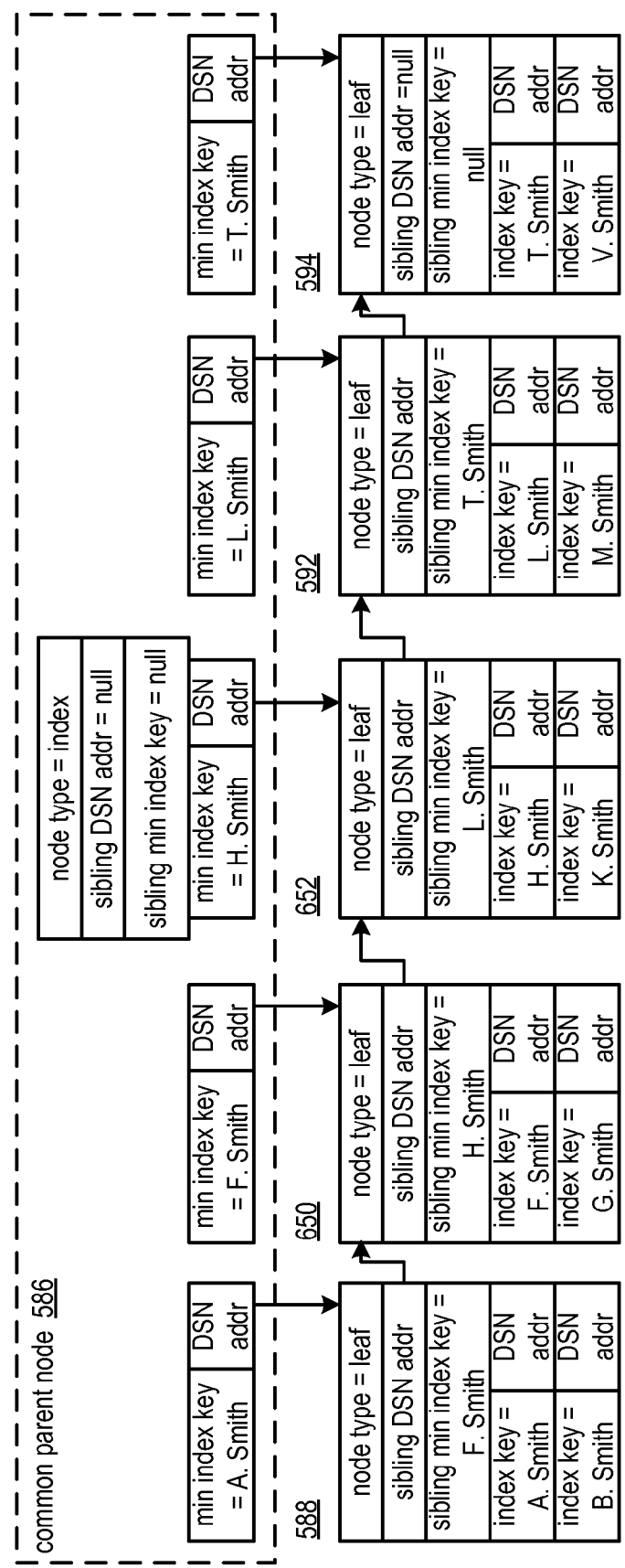
FIG. 45D is a diagram illustrating an example of the index structure of another step of the series of example steps depicted in FIGS. 44C and 44D in accordance with the present invention.

FIG. 45C is a diagram illustrating an example of an index structure of a starting step of a series of example steps depicted in FIGS. 44C and 44D. The index structure includes common parent index node 586, leaf node 588, leaf node 592, and leaf node 594, as discussed with reference to FIG. 44C. The index structure also includes leaf node 650 which includes the contents of leaf node 590 and the data object entries corresponding to an index keys of H. Smith and K. Smith. FIGS. 45C-D illustrate an example of splitting leaf node 650. In a first sub-step of the splitting, data object level index node (e.g., leaf node) 650 is selected for splitting (e.g., since node 650 includes too many data object entries). In a second sub-step of the splitting, one or more data object entries of the selected data object level index node 650 are identified for splitting out. In a third sub-step of the splitting, a new sibling node 652, with respect to the data object level index node 650, is generated to include the one or more identified data object entries and a sibling entry of data object level index node 650 (e.g., pointing to a leaf node 592 to include a DSN address of leaf node 592 and a minimum index key of L. Smith with regards to leaf node 592). In a fourth sub-step of the splitting, the new sibling node 652 is stored in a dispersed storage network as a set of sibling index node slices.

FIG. 45D is a diagram illustrating an example of the index structure of another step of the series of example steps depicted in FIGS. 44C and 44D. The index structure includes common parent index node 586 and five leaf nodes subsequent to inserting of another leaf node. The five leaf nodes includes leaf node 588, selected for splitting data object level index node 650, new sibling data index node 652, leaf node 592, and leaf node 594. In a fifth sub-step of the splitting, a sibling entry of the selected data object level index node 650 is updated to include a sibling DSN address of new sibling data object index node 652 and a minimum data object index key associated with the new sibling data object index key 652. In a sixth sub-step of the splitting, identified one or more data object entries of the selected data object level index node 650 are removed from the selected data object level index node 650.

In a seventh sub-step of the splitting, the selected data object level index node 650 is stored in a dispersed storage network (DSN). In an eighth sub-step of the splitting, the common parent index node 586 is updated to include a new child entry corresponding to the new sibling data object index node 652 (e.g., to include the sibling DSN address of new sibling data object index node 652 and the minimum data object index key associated with the new sibling data object index key 652. In a ninth sub-step of the splitting, the common parent data object index node 652 is stored in the DSN.

In a tenth sub-step of the splitting, a determination is made to determine whether any changes have occurred during the splitting process to at least one of the selected data object index node 650 and the common parent data object index node 586. When a change is detected, rollback transaction commands are sent to the DSN with regards to storage of the selected data object index level node 650 and the common parent data object index node 586. In addition, when change is detected, the new sibling data object index node 652 may be deleted. The method to split a selected data object level index node to remove one or more data object entries creating a new sibling data object index level node is discussed in greater detail with reference to FIGS. 45E and 45F.

Figure 45E:
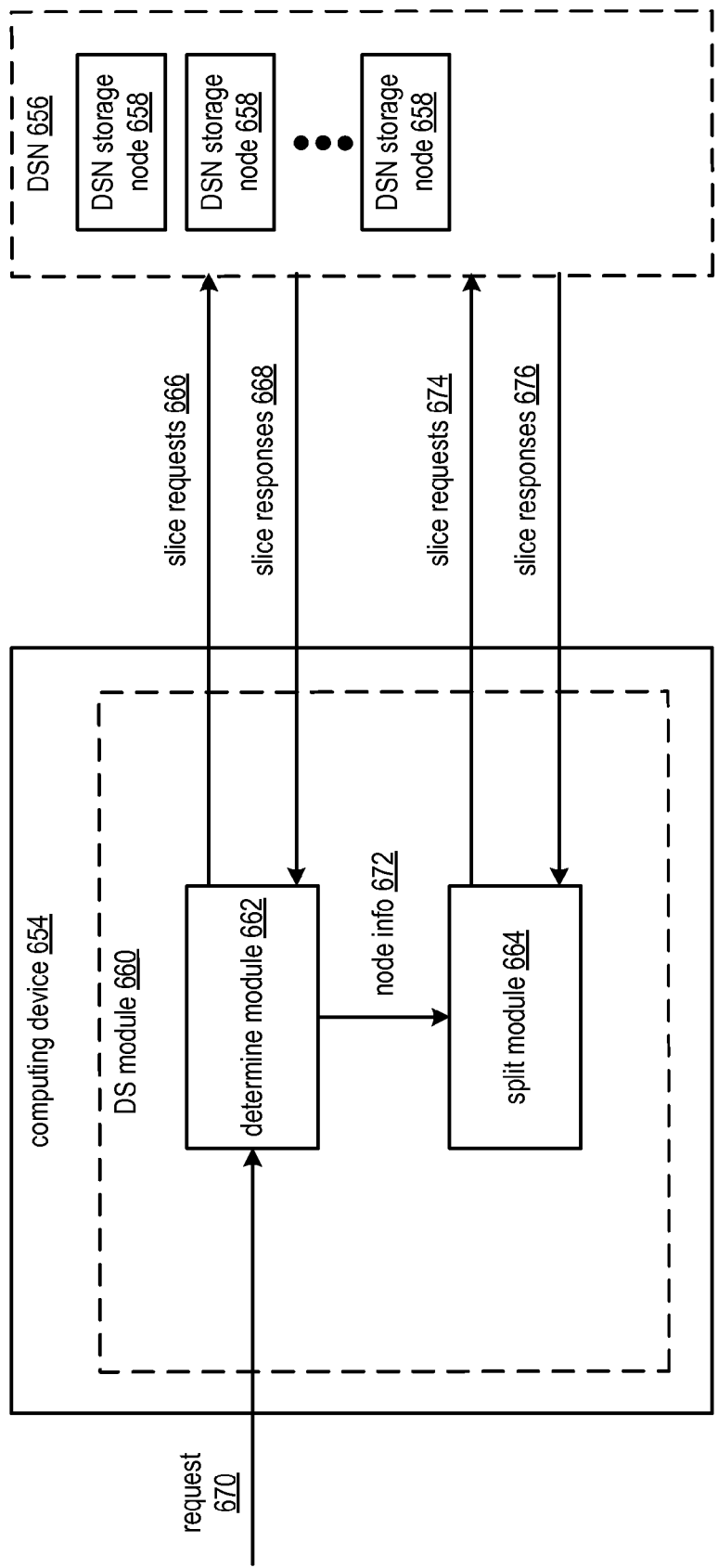
FIG. 45A is a diagram illustrating another example of an index structure in accordance with the present invention.
FIG. 45B is a diagram illustrating another example of an index structure in accordance with the present invention.
FIG. 45F is a flowchart illustrating an example of splitting nodes of an index in accordance with the present invention.

FIG. 45E is a schematic block diagram of another embodiment of a dispersed storage system that includes a computing device 654 and a dispersed storage network (DSN) 656. The DSN 656 may be implemented utilizing one or more of multiple computers, multiple computing devices, a DSN memory, a distributed storage and task network (DSTN), a DSTN module, and a plurality of storage nodes. The DSN 656 includes a plurality of DSN storage nodes 658. The plurality of DSN storage nodes 658 includes at least one set of DSN storage nodes 658. Each DSN storage node 658 of the plurality of DSN storage nodes 658 may be implemented utilizing at least one of a storage server, a storage unit, a dispersed storage (DS) unit, a storage module, a memory device, a memory, a distributed storage and task (DST) execution unit, a user device, a DST processing unit, and a DST processing module. The computing device 654 may be implemented utilizing at least one of a server, a storage unit, a DSN storage node 658, a DS unit, a storage server, a storage module, a DS processing unit, a DS unit, a DST execution unit, a user device, a DST processing unit, and a DST processing module. For example, the DSN 656 includes the computing device 654 when the computing device 654 is implemented utilizing a DSN storage node 658. The computing device 654 includes a dispersed storage (DS) module 660. The DS module 660 includes a determine module 662 and a split module 664.

The system functions to determine to remove data object index entries from a data object level index node and to establish a new data object level index node that includes identified data object entries for removal from the data object level index node, where a hierarchical ordered index structure includes the data object level index node with regards to storage of a plurality of data objects in the DSN 656. A plurality of data object index entries (e.g., each entry including a DSN address and a data object index key associated with a data object) is associated with the plurality of data objects, where the plurality of data object index entries is organized into the hierarchical ordered index structure in accordance with an ordering of attributes of an attribute category.

With regards to the determining to remove the data object entries from the data object level index node, the determine module 662 determines to remove data object index entries from a data object level index node. The determine module 662 determines to remove data object index entries from the data object level index node by at least one of a variety of approaches. A first approach includes the determine module 662 determining that the data object level index node includes too many data object index entries (e.g., counting the number of data object entries and comparing to a data object entry maximum threshold). The determining includes issuing slice requests 666 to the DSN 656 requesting encoded index slices of the data object level index node, receiving slice responses 668 that includes at least a decode threshold number of encoded index slices, decoding the at least the decode threshold number of encoded index slices to reproduce the data object level index node, and counting the number of data object entries.

A second approach to determine to remove data object index entries from the data object level index node includes the determine module 662 determining that the data object level index node includes too many data object index entry accesses in a given time frame. A third approach includes the determine module 662 receiving a request 670 (e.g., after adding several data object entries associated with several data objects corresponding to the data object level index node). A fourth approach includes the determine module 662 determining that the hierarchical ordered index structure includes too few data object level index nodes (e.g., identifying a number of spans of the data object level and comparing the number of spans to a minimum span threshold). A fifth approach includes the determine module 662 detecting that an access performance level of the hierarchical ordered index structure compares unfavorably to a minimum access performance level threshold (e.g., unfavorable when access performance level is less than the minimum access performance level threshold). The determining to remove the data object entries from the data object level index node may also include issuing node information 672 to the split module 664. The node information 672 includes one or more of the data object index entries, a DSN address associated with the data object level index node, and the data object level index node.

With regards to establishing the new data object level index node that includes identified data object entries for removal from the data object level index node, when the data object index entries of the data object level index node are to be removed, the split module 664 enters a loop that causes the split module 664 to perform a series of loop steps. In a first loop step, the split module 664 identifies data object index entries of the data object level index node to extract. For example, the split module 664 issues slice requests 674 to the DSN 656 with regards to retrieving encoded index slices, receives slice responses 676 that includes at least a decode threshold number of encoded index slices, and decodes the at least the decode threshold number of encoded index slices to reproduce the data object level index node, and identifies upper portion entries (e.g., half, a number to satisfy a reduction goal) of a sorted list of data object index entries. In a second loop step, the split module 664 creates a temporary sibling data object level index node to include the identified extracted data object index entries. The generating the temporary sibling data object level index node may also include generating a sibling entry of a sibling node to the temporary sibling data object level index node when the sibling node exists by reusing a sibling entry of the data object level index node.

In a third loop step, the split module 664 initiates updating of the hierarchical ordered index structure where the split module 664 performs a series of sub-loop steps. In a first sub-loop step, the split module 664 identifies a DSN address for storing the temporary sibling data object level index node (e.g., generate a new DSN address). In a second sub-loop step, the split module 664 sets up linking the temporary sibling data object level index node to a next level node (e.g., parent node) of the hierarchical ordered index structure. The split module 664 sets up linking the temporary sibling data object level index node to the next level node by a series of setup steps. A first setup step includes the split module 664 obtaining the DSN address for storing the temporary sibling data object level index node. A second setup step includes the split module 664 generating a new child node entry corresponding to the temporary sibling data object level index node that includes the DSN address for storing the temporary sibling index node. The generating may further include including a minimum data object index key of the temporary sibling index node. A third setup step includes the split module 664 requesting updating the next level node to include the new child node entry (e.g., generate slices, issue checked write slice requests 674 that includes the slices).

In a third sub-loop step, the split module 664 sets up linking the temporary sibling data object level index node to the data object level index node and to an adjacent data object level index node. For example, the setting up includes updating the temporary sibling data object level index node to include a DSN address of the data object level index node and a DSN address of another sibling data object level index node (e.g., the adjacent data object level index node) to the right from the temporary sibling data object level index node).

Prior to removing data object index entries from the data object level index node, in a fourth sub-loop step, the split module 664 determines whether a change has occurred (e.g., any entry changed, added, or deleted entry) to at least one of the data object level index node, the adjacent data object level index node, and the next level node. The split module 664 determines whether the change has occurred to the data object level index node by receiving a revision level discrepancy response of slice responses 676 from at least one of a set of DSN storage nodes to indicate that the data object level index node has changed. The split module 664 receives a slice responses 676 that includes the revision level discrepancy response in response to issuing one or more slice request 674 with regards to writing any encoded index slice to the DSN 656. The receiving includes receiving a status codes within slice responses 676 from the set of DSN storage nodes 658 indicating whether there is a checked write error due to a revision mismatch and indicating a change has not occurred when at least a write threshold number of status codes indicate that there is no mismatch. The receiving may further include performing similar mismatch checks for the next level node.

In a fourth loop step, when the change has occurred, the split module 664 repeats the loop. The split module 664 repeats the loop by undoing the initiating of the updating of the hierarchical ordered index structure using a checked write DSN process. The undoing further includes issuing rollback transaction requests as slice requests 674 to the DSN 656 for each issued write command with regards to storage of the data object level index node, the next level node, and the temporary sibling data object level index node.

Alternatively, in the fourth loop step, when the change has not occurred, the split module 664 removes the data object index entries from the data object level index node and commences the updating of the hierarchical ordered index structure (e.g., finishing writing the temporary sibling data object level index node to the DSN 656, writing the updated data object level index node to the DSN, write an updated next level node to the DSN). The split module 664 removes the data object index entries from the data object level index node by a series of removal steps. A first removal step includes the split module 664 dispersed storage error decoding a set of encoded data object index slices of slice responses 676 to recapture the data object level index node. For example, the split module 664 retrieves the set of encoded data object index slices within slice responses 676 and decodes the set of encoded data object index slices using a dispersed storage error coding function to produce the data object level index node. A second removal step includes the split module 664 deleting the data object index entries from the recaptured data object level index node to produce a reduced data object level index node.

A third removal step includes the split module 664 updating an adjacent data object level index node identifier (e.g., a sibling entry that includes a DSN address and a minimum data object index key associated with the temporary sibling data object level index node) of the reduced data object level index node to identify the temporary sibling data object level index node to produce an updated data object level index node. A fourth removal step includes the split module 664 dispersed storage error encoding the updated data object level index node to produce a set of encoded updated data object index slices. A fifth removal step includes the split module 664 issuing a set of checked-write commands as slice requests 674 to store the set of encoded updated data object index slices in the DSN 656. The issuing may include generating and outputting the set of checked-write commands as slice requests 674 to include a revision number from corresponding read slice responses 676 of the dispersed storage error decoding step. Alternatively, the generating may include generating at least one of a set of version verification requests and a set of temporary write requests.

The split module 664 commences the updating of the hierarchical ordered index structure by a series of commencing steps. A first commencing step includes the split module 664 dispersed storage error encoding the temporary sibling data object level index node to produce a set of encoded sibling index slices. A second commencing step includes the split module 664 issuing a set of write commands as slice requests 674 to store the set of encoded sibling index slices at the DSN address for storing the temporary sibling index node. A third commencing step includes the split module 664 reconstructing the next level node from a set of next level index slices (e.g., retrieve slices and decode using the dispersed storage error coding function). A fourth commencing step includes the split module 664 updating the reconstructed next level node to include an identifier (e.g., a child node entry that includes the DSN address for storing the temporary sibling index node and the minimum data object index key associated with the temporary sibling index node) to identify the temporary sibling data object level index node to produce an updated next level node. A fifth commencing step includes the split module 664 dispersed storage error encoding the updated next level node to produce a set of updated next level index slices. The encoding may further include facilitating storage of a write threshold number of the updated next level index slices.

Figure 45F:
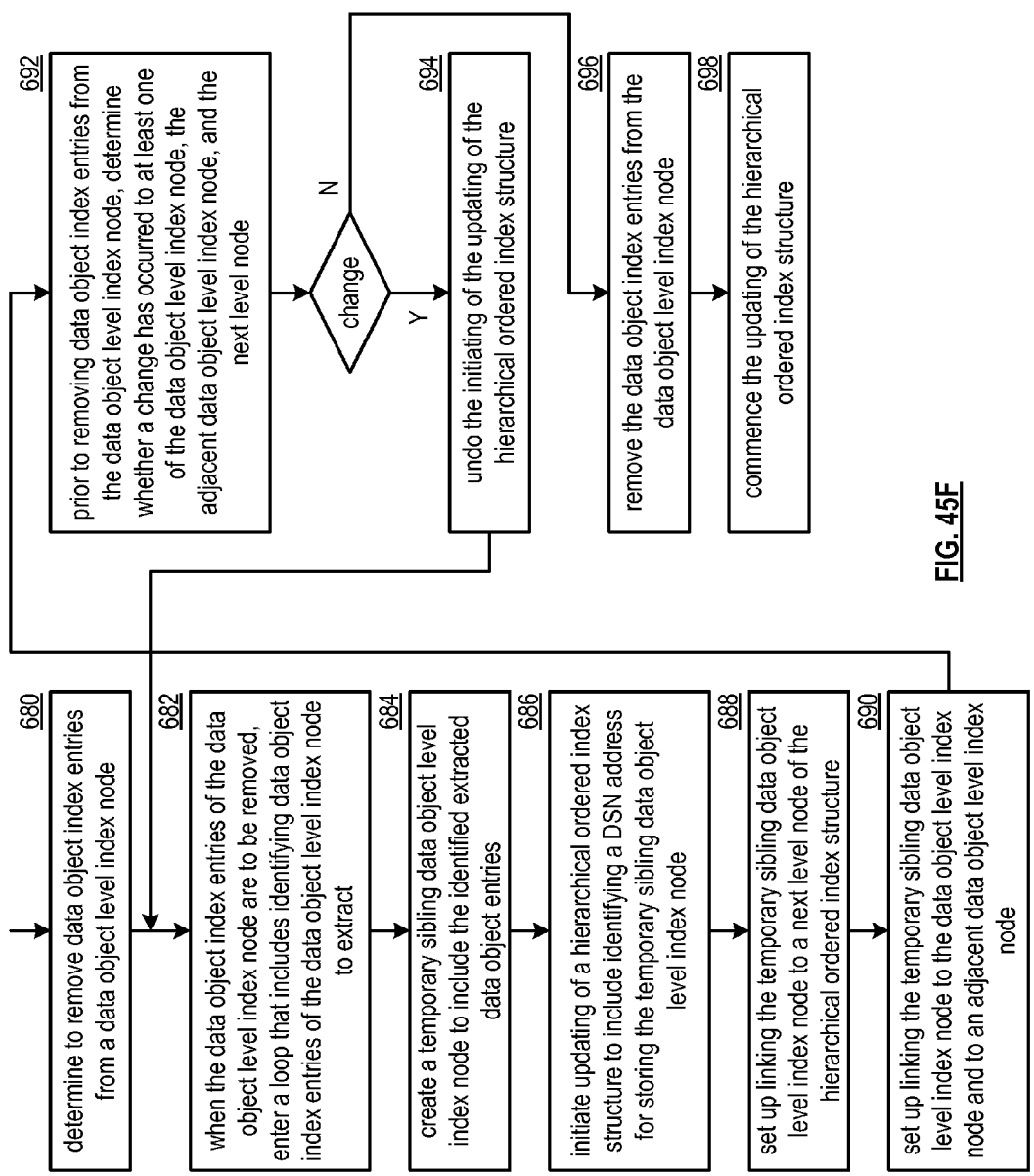

FIG. 45F is a flowchart illustrating an example of splitting nodes of an index. The method begins at step 680 where a processing module (e.g., of a computer of a multiple computer dispersed storage network (DSN) that stores a plurality of data objects) determines to remove data object index entries from a data object level index node, where a plurality of data object index entries (e.g., data object index key and DSN address of a corresponding data object) is associated with the plurality of data objects. The plurality of data object index entries is organized into a hierarchical ordered index structure in accordance with an ordering of attributes of an attribute category, where the hierarchical ordered index structure includes the data object level index node.

The determining to remove data object index entries from the data object level index node includes at least one of a variety of approaches. A first approach includes determining that the data object level index node includes too many data object index entries. The determining includes counting a number of data object entries and comparing the number to a data object entry maximum threshold. A second approach includes determining that the data object level index node includes too many data object index entry accesses in a given time frame. A third approach includes receiving a request. For example, a request is received subsequent to the addition of several data object entries associated with several data objects corresponding to the data object level index node. A fourth approach includes determining that the hierarchical ordered index structure includes too few data object level index nodes. The determining includes identifying a number of spans of the data object level and comparing the number of spans to a minimum span threshold. A fifth approach includes detecting that an access performance level of the hierarchical ordered index structure compares unfavorably to a minimum access performance level threshold. For example, the processing module detects that the access performance level is below the minimum access performance threshold when an access bottleneck has occurred associated with the data object level index node.

When the data object index entries of the data object level index node are to be removed, the method continues at step 682 where the processing module enters a loop that includes the processing module identifying data object index entries of the data object level index node to extract. For example, the processing module identifies data object entries associated with an upper portion (e.g., half, a number to satisfy a goal) of a sorted list of data object index entries of the data object level index node. The method continues at step 684 where the processing module creates a temporary sibling data object level index node to include the identified extracted data object index entries. For example, the processing module generates the temporary sibling data object level index node to also include a sibling entry for a sibling node to the temporary sibling data object level index node when the sibling node exists by reusing a sibling entry of the data object level index node.

The method continues at step 686 where the processing module initiates updating of the hierarchical ordered index structure which includes the processing module identifying a DSN address for storing the temporary sibling data object level index node (e.g., generate a new DSN address). The method continues at step 688 where the processing module sets up linking the temporary sibling data object level index node to a next level node (e.g., parent node) of the hierarchical ordered index structure. The setting up linking the temporary sibling data object level index node to the next level node includes a series of setup steps. A first setup step includes obtaining the DSN address for storing the temporary sibling data object level index node. A second setup step includes generating a new child node entry corresponding to the temporary sibling data object level index node that includes the DSN address for storing the temporary sibling index node. The generating may further include including a minimum data object index key of the temporary sibling index node. A third setup step includes requesting updating the next level node to include the new child node entry. For example, the processing module generate slices and issues checked write slice requests that includes the slices.

The method continues at step 690 where the processing module sets up linking the temporary sibling data object level index node to the data object level index node and to an adjacent data object level index node. For example, the setting up includes updating the temporary sibling data object level index node to include a DSN address of the data object level index node and a DSN address of another sibling data object level index node (e.g., the adjacent data object level index node) to the right from the temporary sibling data object level index node.

Prior to removing data object index entries from the data object level index node, the method continues at step 692 where the processing module determines whether a change has occurred to at least one of the data object level index node, the adjacent data object level index node, and the next level node (e.g., any entry changed, added, or deleted entry). The determining whether the change has occurred to the data object level index node includes receiving a revision level discrepancy response from at least one of a set of DSN storage nodes to indicate that the data object level index node has changed. The receiving includes receiving a status codes from the set of DSN storage nodes indicating whether there is a checked write error due to a revision mismatch and indicating a change has not occurred when at least a write threshold number of status codes indicate that there is no mismatch. The receiving may also include performing similar mismatch checks for the next level node.

When the change has not occurred, the method branches to step 696. When the change has occurred, the method continues to step 694. The method continues at step 694 where the processing module repeats the loop where repeating the loop includes undoing the initiating of the updating of the hierarchical ordered index structure using a checked write DSN process. The undoing includes issuing rollback transaction requests to the DSN for each issued write command with regards to storage of the data object level index node, the next level node, and the temporary sibling data object level index node. The method branches back to step 682 to try again.

When the change has not occurred, the method continues at step 696 where the processing module removes the data object index entries from the data object level index node. The removing the data object index entries from the data object level index node includes a series of removing steps. A first removing step includes dispersed storage error decoding a set of encoded data object index slices to recapture the data object level index node. For example, the processing module retrieves the set of encoded data object index slices and decodes the set of encoded data object index slices using a dispersed storage error coding function to produce the data object level index node. A second removing step includes deleting the data object index entries from the recaptured data object level index node to produce a reduced data object level index node.

A third removing step includes updating an adjacent data object level index node identifier (e.g., a sibling entry that includes a DSN address and a minimum data object index key associated with the temporary sibling data object level index node) of the reduced data object level index node to identify the temporary sibling data object level index node to produce an updated data object level index node. A fourth removing step includes dispersed storage error encoding the updated data object level index node to produce a set of encoded updated data object index slices. A fifth removing step includes issuing a set of checked-write commands to store the set of encoded updated data object index slices in the DSN. The issuing may include generating and outputting the set of checked-write commands to include a revision number from corresponding read slice responses of the dispersed storage error decoding step. Alternatively, the generating may include generating at least one of a set of version verification requests and a set of temporary write requests.

The method continues at step 698 where the processing module commences the updating of the hierarchical ordered index structure. The commencing includes finishing writing the temporary sibling data object level index node to the DSN, writing the updated data object level index node to the DSN, and writing an updated next level node to the DSN. The commencing the updating of the hierarchical ordered index structure further includes a series of updating steps. A first updating step includes dispersed storage error encoding the temporary sibling data object level index node to produce a set of encoded sibling index slices. A second updating step includes issuing a set of write commands to store the set of encoded sibling index slices at the DSN address for storing the temporary sibling index node. A third updating step includes reconstructing the next level node from a set of next level index slices. For example, the processing module retrieves slices and decodes the slices using the dispersed storage error coding function to reproduce the next level node. A fourth updating step includes updating the reconstructed next level node to include an identifier; (e.g., a child node entry that includes the DSN address for storing the temporary sibling index node and the minimum data object index key associated with the temporary sibling index node) to identify the temporary sibling data object level index node to produce an updated next level node. A fifth updating step includes dispersed storage error encoding the updated next level node to produce a set of updated next level index slices. The encoding may also include facilitating storage of a write threshold number of the updated next level index slices.

FIG. 46A is a diagram illustrating another example of an index structure prior to expansion (e.g., increasing depth) of an associated index. An index structure diagram representing the index structure after the increasing of the depth is represented in FIG. 46B. The index structure includes four nodes of an index. The four nodes includes an index node (e.g., a root node) stored in a distributed storage and task network (DSTN) at a source name address of 4F7, a first leaf node stored at source name address 5AB, a second leaf node stored at source name 9D4C, and a third leaf node stored at source name address 52D.

The index node includes a node type indicating not a leaf node (e.g., index node), a sibling node source name pointing of null (e.g., no sibling since a root node), a sibling minimum index key of null, a child 1 source name of 5AB and a child 1 minimum index key of "a", a child 2 source name of 9D4C and a child 2 minimum index key of "b", and a child 3 source name of 52D and a child 3 minimum index key of "d". The first leaf node stored at source name 5AB includes a node type indicating a leaf node and a sibling node source name pointing to the second leaf node stored at source name 9D4C etc. The second leaf node stored at source name 9D4C includes a node type indicating a leaf node and a sibling node source name pointing to the third leaf node stored at source name 52D etc. The third leaf node stored at source name 52D includes a node type indicating a leaf node and a sibling node source name pointing to a leaf node stored at source name 539 etc. The index node stored at source name 4F7 may include too many entries requiring depth of the index to be increased by splitting the index node into two new index nodes and generating a new root node above the two new index nodes as illustrated in FIG. 46B.

FIG. 46B is a diagram illustrating another example of an index structure after increasing depth of an associated index. The index structure of the index prior to increasing the depth as illustrated in FIG. 46A. The index structure includes six nodes of the index. The six nodes includes a new root node (e.g., an index node type) stored in a distributed storage and task network (DSTN) at a source name address of 6F5, a first new index node stored at a source name address of 6D2, a second new index node stored at a source name address of 6E9, a first leaf node stored at source name address 5AB, a second leaf node stored at source name 9D4C, and a third leaf node stored at source name address 52D. The index node FIG. 46A is split into the two new index nodes. The first new index node stored at the source name address of 6D2 includes a node type indicating not a leaf node (e.g., index node), a sibling node source name pointing to the second new index node stored at source name address 6E9, a sibling minimum index key of "d", a child 1 source name of 5AB and a child 1 minimum index key of "a", and a child 2 source name of 9D4C and a child 2 minimum index key of "b". The second new index node stored at the source name address of 6E9 includes a node type indicating not a leaf node (e.g., index node), a sibling node source name of null, a sibling minimum index key of null and a child 1 source name of 52D and a child 1 minimum index key of "d". The root node includes a node type indicating not a leaf node (e.g., index node), a sibling node source name pointing of null (e.g., no sibling since a root node), a sibling minimum index key of null, a child 1 source name of 6D2 and a child 1 minimum index key of "a" and a child 2 source name of 6E9 and a child 2 minimum index key of "d".

Figure 46C:
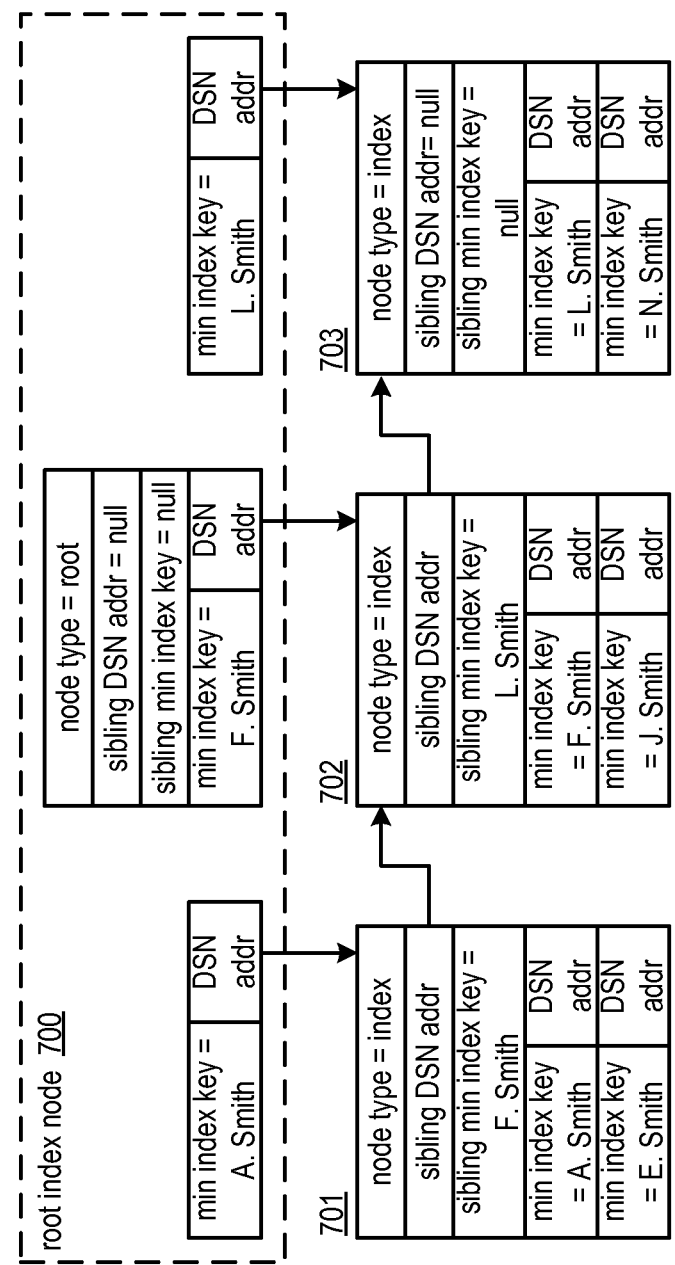
FIG. 46C is a diagram illustrating an example of an index structure of an example of expanding the index structure in example steps depicted in FIGS. 46D and 46E in accordance with the present invention.

The first second and third leaf nodes are as in FIG. 46A prior to the increasing of the depth of the index, wherein the first leaf node stored at source name 5AB includes a node type indicating a leaf node and a sibling node source name pointing to the second leaf node stored at source name 9D4C etc. The second leaf node stored at source name 9D4C includes a node type indicating a leaf node and a sibling node source name pointing to the third leaf node stored at source name 52D etc. The third leaf node stored at source name 52D includes a node type indicating a leaf node and a sibling node source name pointing to a leaf node stored at source name 539 etc. The method to increase the depth of the index is discussed in greater detail with reference to FIG. 46C.

Figure 46D:
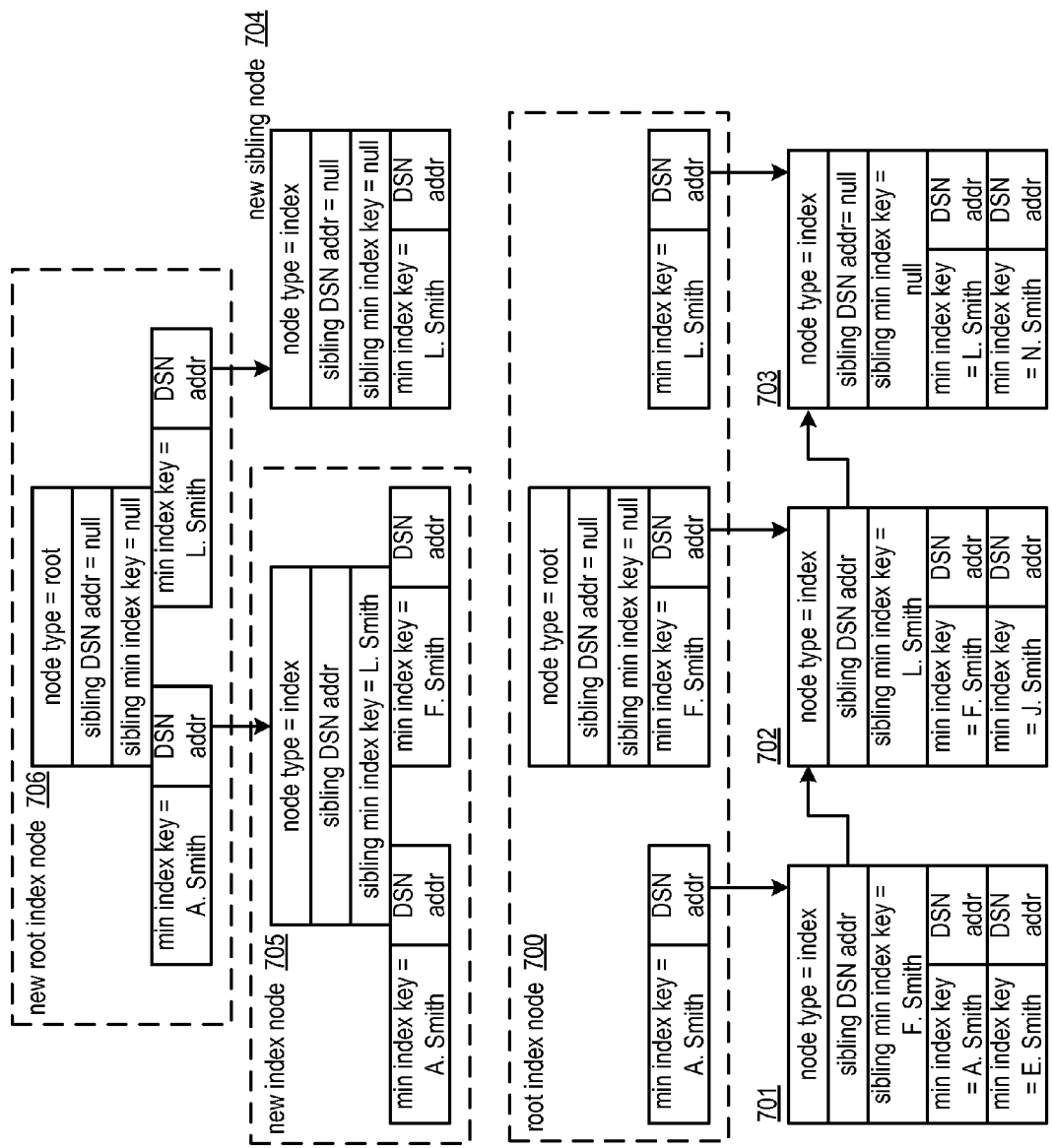
FIG. 46D is a diagram illustrating an example of an index structure of a starting step of a series of example steps of expanding the index structure depicted in FIGS. 46D and 46E in accordance with the present invention.
Figure 46E:
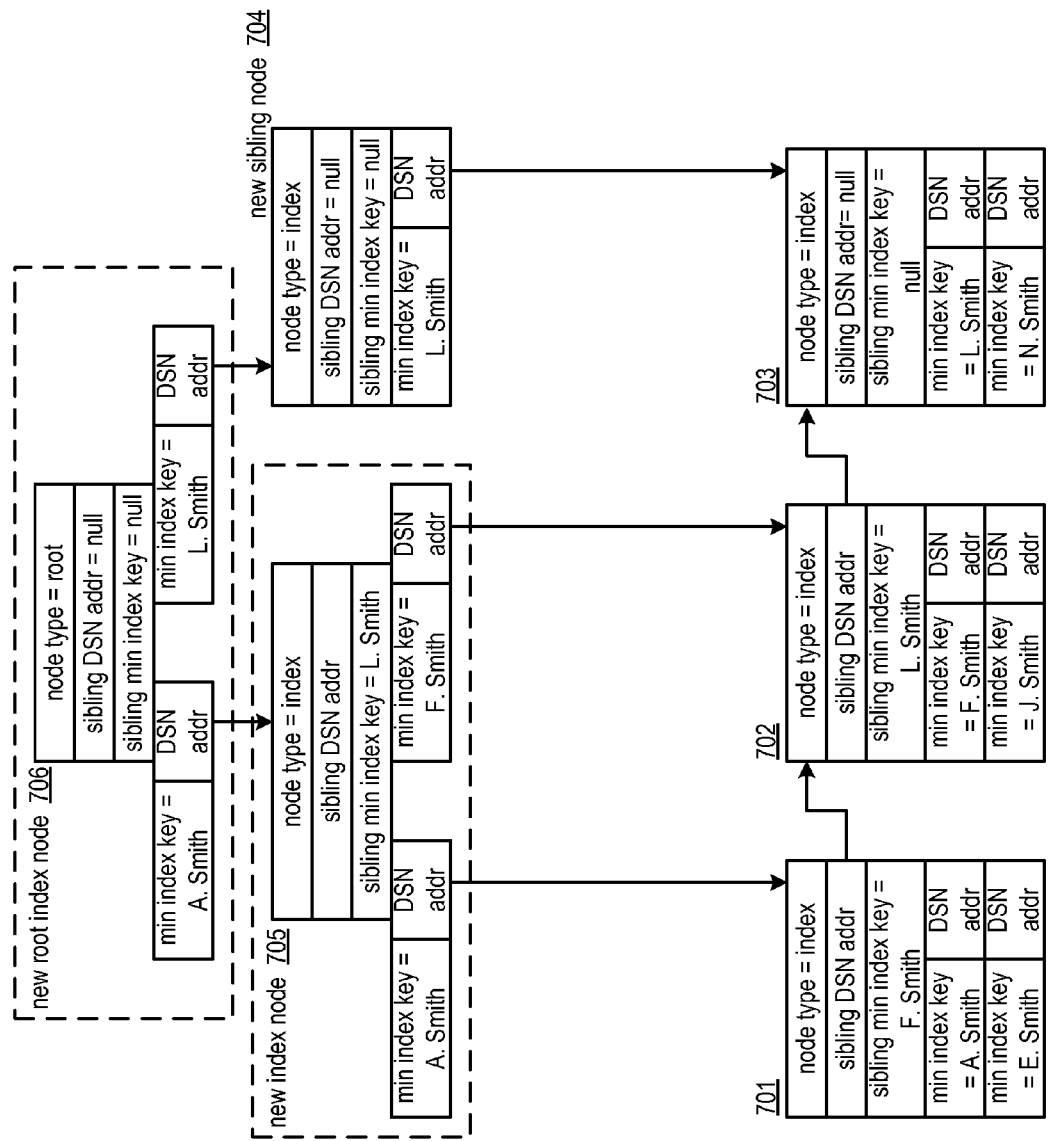
FIG. 46E is a diagram illustrating an example of the index structure of another step of the series of example steps of expanding the index structure depicted in FIGS. 46D and 46E in accordance with the present invention.

FIG. 46C is a diagram illustrating an example of an index structure of an example of expanding the index structure in example steps depicted in FIGS. 46D and 46E. The index structure includes a root index node 700 and immediate child index nodes 701, 702, 703. Immediate child index node 703 includes a null sibling entry and child entries associated with a minimum index key of L. Smith and another minimum index key of N. Smith. Immediate child index node 702 includes a sibling entry associated with immediate child index node 703 (e.g., a minimum index key of L. Smith) and child entries associated with a minimum index key of F. Smith and another minimum index key of J. Smith. Immediate child index node 701 includes a sibling entry associated with immediate child index node 702 (e.g., a minimum index key of F. Smith) and child entries associated with a minimum index key of A. Smith and another minimum index key of E. Smith. The root index node 700 includes a null sibling entry, an immediate child entry for immediate child index node 701 that includes a minimum index key of A. Smith, another immediate child entry for immediate child index node 702 that includes a minimum index key of F. Smith, and yet another immediate child entry for immediate child index node 703 that includes a minimum index key of L. Smith.

When determining to expand the index structure (e.g., the root index node has too many entries), the index structure is expanded from the top where the expanding includes replacing the root index node with a new root index node and two or more sub-root index nodes. A series of steps to depict the expanding are discussed in greater detail with reference to FIGS. 46D-E.

FIG. 46D is a diagram illustrating an example of an index structure of a starting step of a series of example steps of expanding the index structure depicted in FIGS. 46D and 46E. The example includes index structure of FIG. 46C (e.g., including root index node 700 and immediate child nodes 701-703) a new sibling node 704, a new index node 705, and a new root index node 706. In a first step of the expanding, a determination is made to add a level to the index structure. In a second step of the expanding, a plurality of child entries is obtained from the root index node 700. The obtaining may further include obtaining a revision number associated with root index node slices stored in a dispersed storage network associated with the root index node 700. In a third step of the expanding, child node entries of the plurality of child node entries are selected to be associated with the new index node 705 (e.g., dividing to achieve a structure goal). In a fourth step of the expanding, the new sibling node 704 is created to include a null sibling entry and remaining child node entries of the plurality of child node entries (e.g., entry associated with minimum index key L Smith for immediate child index node 703). In a fifth step of the expanding, a dispersed storage network (DSN) address of the new sibling node 704 is obtained (e.g., generated).

In a sixth step of the expanding, the new index node 705 is created to include a sibling entry corresponding to the new sibling node 704 (e.g., to include the DSN address of the new sibling node 704 and the minimum index key of L. Smith) and the selected child node entries (e.g., an entries associated with minimum index key A. Smith for immediate child index node 701 and an entry associated with minimum index key F. Smith for immediate child index node 702). In a seventh step of the expanding, a DSN address of the new index node 705 is obtained.

In an eighth step of the expanding, the new sibling node 704 is stored in the DSN using the DSN address of the new sibling node 704 and the new index node 705 is stored in the DSN using the DSN address of the new index node 705. In a ninth step of the expanding, the new root index node 706 is created to include a null sibling entry, a sub-root entry for the new sibling node 704 (e.g., to include the minimum index key of L. Smith and the DSN address of the new sibling node 704), and a sub-root entry for the new index node 705 (e.g., to include the minimum index key of A. Smith and the DSN address of the new index node 705). A discussion of the expanding example is continued with regards to FIG. 46E.

FIG. 46E is a diagram illustrating an example of the index structure of another step of the series of example steps of expanding the index structure depicted in FIGS. 46D and 46E. The example includes continuing the expanding process example of FIG. 46D and includes immediate child nodes 701-703) the new sibling node 704, the new index node 705, and the new root index node 706. In a tenth step of the expanding, a determination is made as to whether any changes have occurred to the root index node 700 of FIG. 46D since the expanding process was initiated (e.g., compare a previously retrieved copy of root index node 700 to a current retrieved copy of the root index node 700, utilize a check-write process). When changes have occurred, undoing (e.g., issuing rollback commands corresponding to previous write slice requests to a dispersed storage network) is performed to undo the storing of the new root index node 706, the new index node 705, and the new sibling node 704 and the expanding process is restarted. When changes have not occurred, the index structure is updated to include finalizing writing of the new root index node 706 to the DSN and activating the new root index node (e.g., updating metadata of the index structure to include the DSN address of the root index node 706 and to exclude the DSN address of the root index node 700 when different). In addition, the root index node 700 may be deleted from the DSN.

Figure 46F:
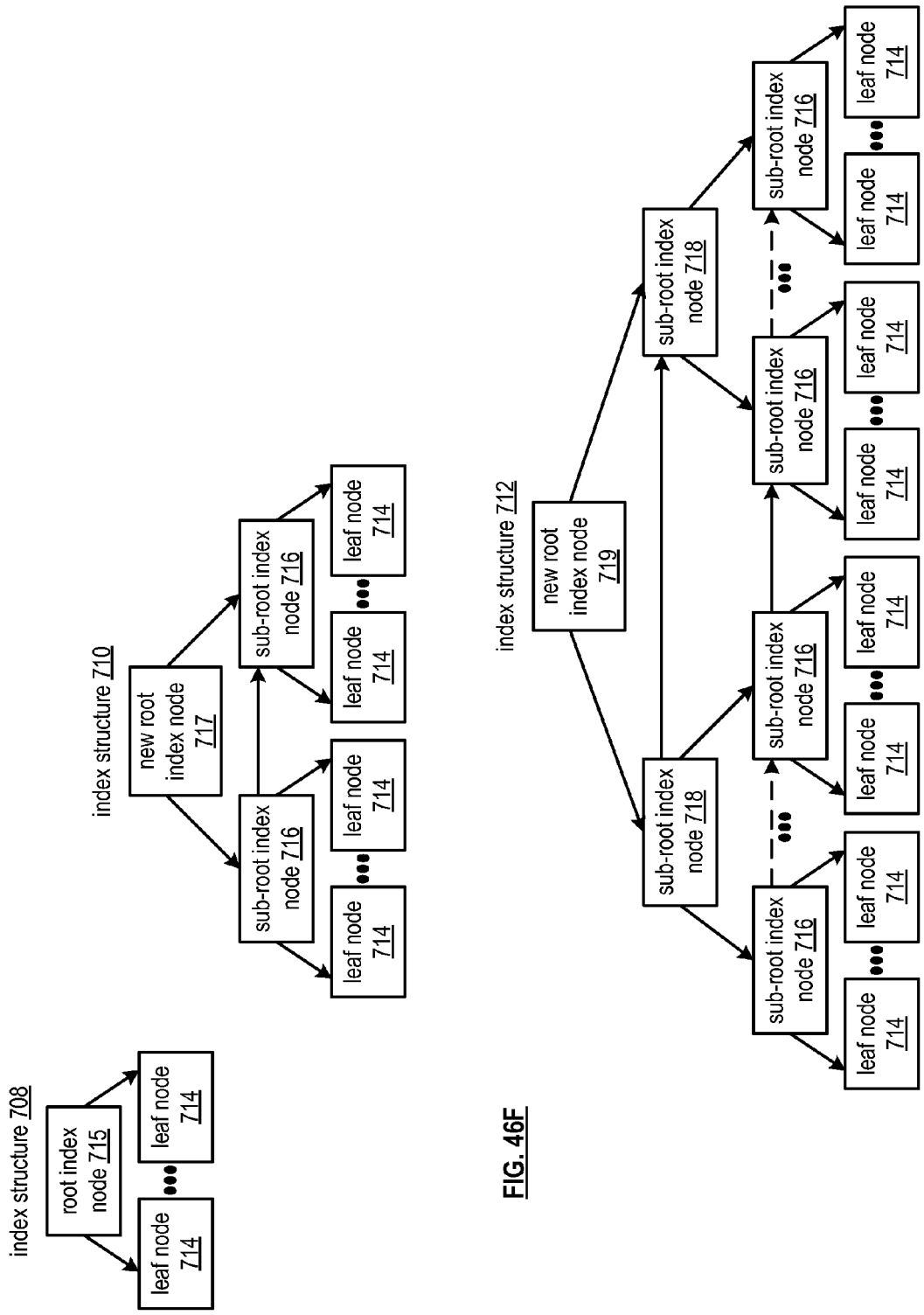
FIG. 46F is a diagram illustrating an example of expanding an index in accordance with the present invention.

FIG. 46F is a diagram illustrating an example of expanding an index and includes index structures 708, 710, and 712. The expanding example starts with the index structure 708, transitions through the index structure 710, and concludes with index structure 712. Index structure 708 includes a root index node 715 and a plurality of leaf nodes 714. Index structure 710 includes a new root index node 717, at least two sub-root index node 716, and another plurality of leaf nodes 714. Index structure 712 includes another new root index node 719, another at least two sub-root index node 718, a plurality of sub-root index nodes 716 that includes the at least two sub-root index node 716 of index structure 710, and yet another plurality of leaf nodes 714.

From time to time more leaf nodes 714 may be added to the plurality of leaf nodes 714 of index structure 708. For example, more data objects are added to a dispersed storage network and more corresponding data object entries are added to leaf nodes 714 of the plurality of leaf node 714. A determination is made whether to expand the index structure 708 as the index structure 708 grows (e.g., horizontally). For example, the determination is made to expand the index structure 708 when the plurality of leaf nodes 714 includes too many leaf nodes 714. When the determination is made to expand the index structure 708, the two or more sub-root index nodes 716 are created to include entries associated with the new plurality of leaf nodes 714. The new root index node 716 is created to include sub-root entries corresponding to the two or more sub-root index nodes 716.

From time to time more leaf nodes 714 may be added to the plurality of leaf nodes 714 of index structure 710. For example, more data objects are added to the dispersed storage network, more corresponding data object entries are added to leaf nodes 714 of the plurality of leaf node 714, and sub-root index node 716 are split to produce more than the at least two sub-root index node 716. A determination is made whether to expand the index structure 710 as the index structure 710 grows (e.g., horizontally). For example, the determination is made to expand the index structure 710 when the two or more sub-root index node 716 includes too many sub-root index node 716 (e.g., new root index node 717 includes too many entries). When the determination is made to expand the index structure 710, the two or more sub-root index nodes 718 are created to include entries associated with the sub-root index nodes 716. The new root index node 719 is created to include sub-root entries corresponding to the two or more sub-root index nodes 718. Such an expansion process may continue indefinitely.

Figure 46G:
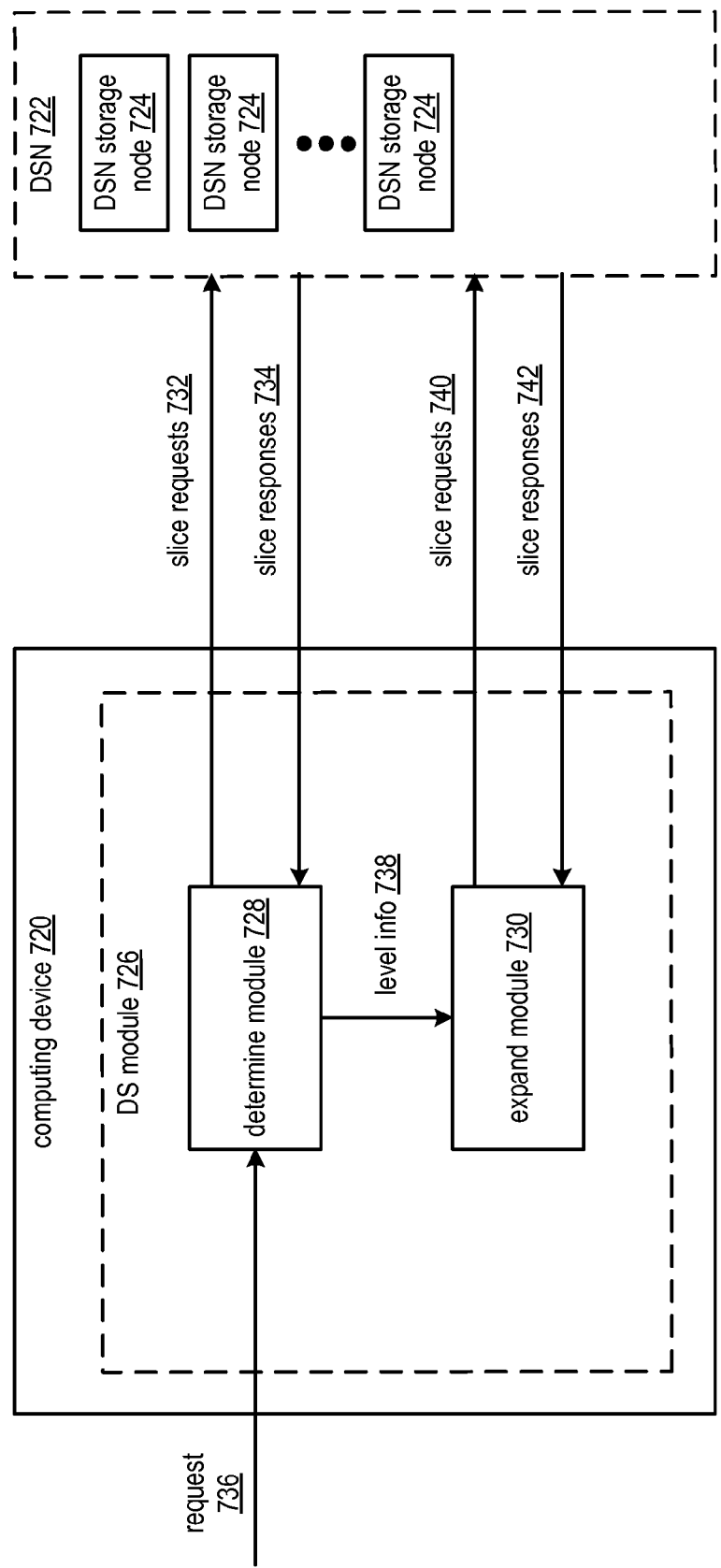
FIG. 46G is a schematic block diagram of another embodiment of a dispersed storage system in accordance with the present invention.

FIG. 46G is a schematic block diagram of another embodiment of a dispersed storage system that includes a computing device 720 and a dispersed storage network (DSN) 722. The DSN 722 may be implemented utilizing one or more of multiple computers, multiple computing devices, a DSN memory, a distributed storage and task network (DSTN), a DSTN module, and a plurality of storage nodes. The DSN 722 includes a plurality of DSN storage nodes 724. The plurality of DSN storage nodes 724 includes at least one set of DSN storage nodes 724. Each DSN storage node 724 of the plurality of DSN storage nodes 724 may be implemented utilizing at least one of a storage server, a storage unit, a dispersed storage (DS) unit, a storage module, a memory device, a memory, a distributed storage and task (DST) execution unit, a user device, a DST processing unit, and a DST processing module. The computing device 720 may be implemented utilizing at least one of a server, a storage unit, a DSN storage node 724, a DS unit, a storage server, a storage module, a DS processing unit, a DS unit, a DST execution unit, a user device, a DST processing unit, and a DST processing module. For example, the DSN 722 includes the computing device 720 when the computing device 720 is implemented utilizing a DSN storage node 724. The computing device 720 includes a dispersed storage (DS) module 726. The DS module 726 includes a determine module 728 and an expand module 730.

The system functions to determine to expand a hierarchical ordered index structure of a plurality of data object index entries and to expand the hierarchical ordered index structure. The hierarchical ordered index structure is in accordance with an ordering of attributes of an attribute category and the plurality of data object index entries is stored in a multitude of data object level index nodes and is associated with the plurality of data objects.

With regards to the determining to expand the hierarchical ordered index structure, the determine module 728 determines to expand the hierarchical ordered index structure of the plurality of data object index entries (e.g., each entry includes a data object index key and DSN address of a corresponding data object). The determine module 728 determines to expand the hierarchical ordered index structure by at least one of a variety of determining approaches. A first determining approach includes the determine module 728 determining that the root index node includes too many entries of the immediate children index nodes. The immediate children index nodes includes intermediate index nodes of the hierarchical ordered index structure, where the intermediate index nodes hierarchically lie between the root index node and the data object level index nodes. The immediate children index nodes further includes at least some of the multitude of data object level index nodes. The determining includes generating slice requests 732 based on a DSN address of the root index node, outputting the slice requests to the set of DSN storage nodes 724, receiving slice responses 734 that includes encoded root index node slices and a revision number indicator associated with the slices, and decoding the encoded root index node slices to reproduce the root index node. In an example of determining that the root index node includes too many entries, the determining includes counting a number of immediate child node entries and comparing to a child node entry maximum threshold. A second determining approach includes the determine module 728 determining that the root index node is being accessed too frequently in a given time frame.

A third determining approach, to determine to expand the hierarchical ordered index structure, includes the determine module 728 receiving a request 736 (e.g., after adding several data object entries associated with several data objects corresponding to the hierarchical ordered index structure). A fourth determining approach includes the determine module 728 detecting that an access performance level of the hierarchical ordered index structure compares unfavorably to a desired access performance level threshold (e.g., unfavorable when access performance level is less than the minimum access performance level threshold). A fifth determining approach includes the determine module 728 determining an estimated growth rate of the hierarchical ordered index structure and expanding in accordance with the estimated growth rate. For example, the determine module 728 determines that at least one index node of at least one level of the index structure includes too many child node entries. As another example, the determine module 728 determines that the at least one level of the index structure includes too many index nodes (e.g., span is too wide). For instance, the determine module 728 accesses metadata associated with the hierarchical index structure to retrieve a number of index nodes for each level of the index structure. As yet another example, the determine module 728 determines that the index structure includes too few layers (e.g., depth is too small). The determine module 728 may output level information 738 to indicate whether to expand the hierarchical ordered index structure.

With regards to the expanding the hierarchical ordered index structure, the expand module 730 enters a loop performing a series of expanding loop steps. In a first expanding loop step, the expand module 730 retrieves the root index node of the hierarchical ordered index structure from the set of DSN storage servers 724 of the DSN 722. For example, the expand module 730 generates slice requests 740 based on the DSN address of the root index node, outputs the slice requests to the set of DSN storage nodes 724, receives slice responses 742 that includes at least a decode threshold number of encoded root index node slices and the revision number indicator associated with the slices, and decodes the at least the decode threshold number of encoded root index node slices to reproduce the root index node. In a second expanding loop step, the expand module 730 identifies immediate children index nodes of the root index node from entries of the root index node.

In a third expanding loop step, the expand module 730 divides the immediate children index nodes into sets of children index nodes. The expand module 730 functions to divide the immediate children index nodes into sets of children index nodes by determining a number of sets that the immediate children index nodes will be divided into (e.g., to achieve goals for number of entries per node and/or number of nodes per level) and based on the number of sets and the ordering of attributes of an attribute category, dividing the immediate children index nodes into the sets of children index nodes.

In a fourth expanding loop step, the expand module 730 creates, for each of the sets of children index nodes, a sub-root index node to produce a set of sub-root index nodes, wherein the sub-root index node includes entries for each child index node of the corresponding set of children index nodes. For example, the expand module 730 creates the sub-root index node to include the entries (e.g., DSN address, minimum index key) for each of the child index nodes and a sibling entry (e.g., DSN address, minimum index key) for a sibling sub-root index node when a sibling sub-root index node exists within the index structure to the right.

In a fifth expanding loop step, the expand module 730 creates a new root index node to include entries (e.g., DSN address, minimum index key) for each of the sub-root index nodes of the set of sub-root index nodes. The expand module 730 functions to create the new root index node to include entries for each of the sub-root index nodes of the set of sub-root index nodes by creating a first entry for a first sub-root index node of the set of the sub-root index nodes to include a first index key and a first DSN address and creating a second entry for a second sub-root index node of the set of the sub-root index nodes to include a second index key and a second DSN address.

In a sixth expanding loop step, the expand module 730 temporarily stores the new root index node and the set of sub-root index nodes in the DSN. For example, for each node of the new root index node and the set of sub-root index nodes, the expand module 730 encodes the node using a dispersed storage error encoding function to produce a set of encoded new root index node slices, generates a set of write slice requests 740 that includes the set of encoded new root index node slices, and outputs the set of slice requests 740 to the set of DSN storage nodes 724.

When the root index node has changed, in a seventh expanding loop step, the expand module 730 repeats the loop with the changed root index node being the root index node. The expand module 730 functions to determine that the root index node has changed by utilizing a checked-write process of the DSN with respect to the root index node (e.g., a revision level has changed, which is indicated in a response from the DSN 722 and locks down processing for the new root index node). Alternatively, the expand module 730 functions to determine that the root index node has changed by re-retrieving the root index node to produce a re-retrieved root index node, comparing the re-retrieved root index node with the root index node, and when the re-retrieved root index node substantially matches the root index node, indicating that the root index node has not changed. The expand module functions to repeat the loop by, prior to repeating the loop, deleting the temporary storage of the new root index node and the set of sub-root index nodes in the DSN (e.g., issue rollback requests to the set of DSN storage servers 724 for each set of write requests) and undoing the creating of the new root index node (e.g., delete from local memory to facilitate starting over), the creating of the set of sub-root index nodes, and the dividing of the immediate children index nodes into the sets of children index nodes.

Alternatively, when the root index node has not changed, in the seventh expanding loop step, the expand module 730 updates the hierarchical ordered index structure with the new root index node and the set of sub-root index nodes. The expand module 730 functions to update the hierarchical ordered index structure by utilizing a three-phase-commit write process to store the new root index node and the set of sub-root index nodes in the DSN, where, when the three-phase-commit write process is successfully executed, the hierarchical ordered index structure is updated (e.g., issue commit and finalize requests to the set of DSN storage servers for each set of write requests).

Figure 46H:
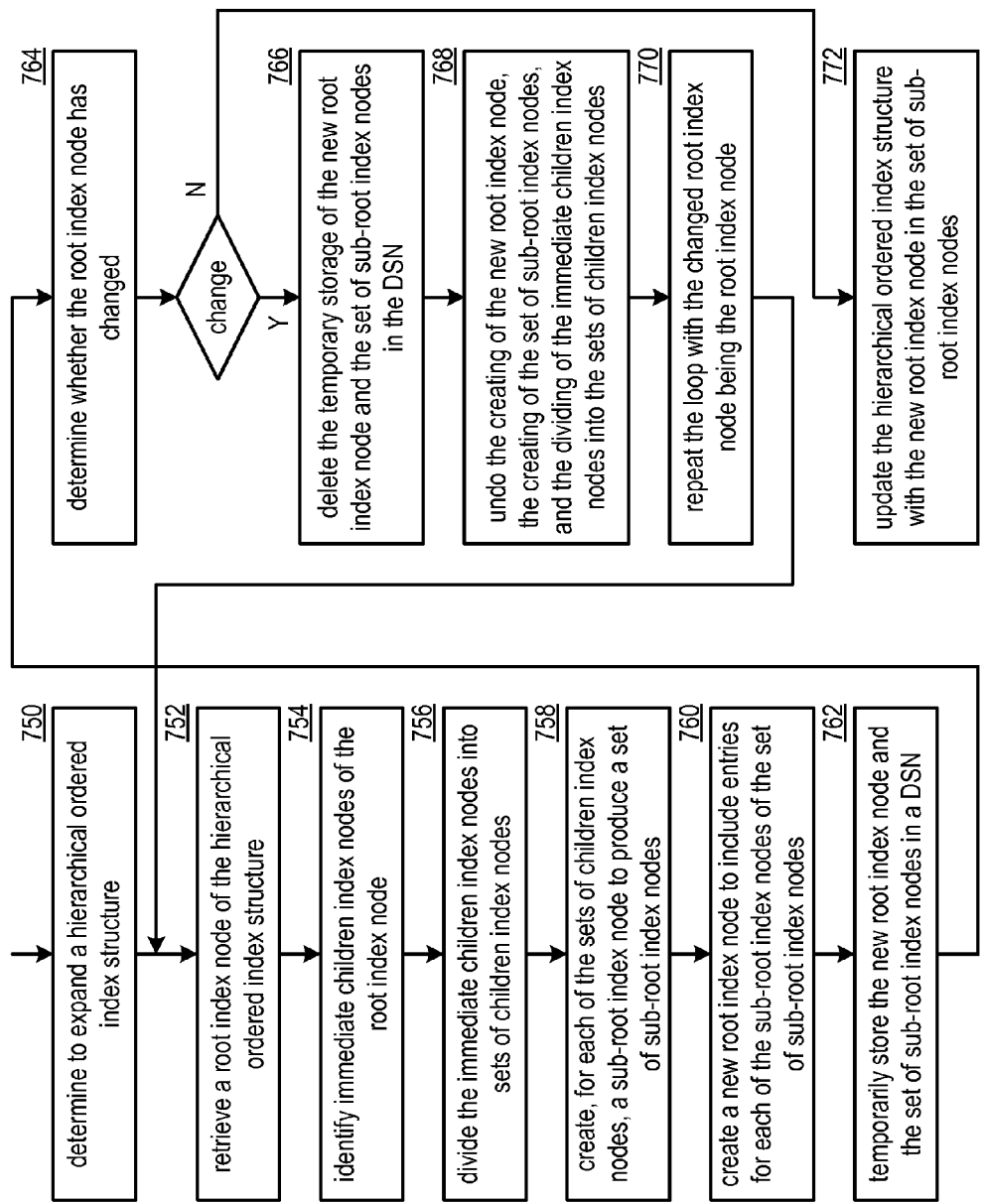
FIG. 46H is a flowchart illustrating an example of expanding an index in accordance with the present invention.

FIG. 46H is a flowchart illustrating an example of expanding an index. The method begins at step 750 where a processing module (e.g., of a computer of a multiple computer dispersed storage network (DSN) that stores a plurality of data objects) determines to expand a hierarchical ordered index structure of a plurality of data object index entries (e.g., data object index key and DSN address of a corresponding data object). The hierarchical ordered index structure is in accordance with an ordering of attributes of an attribute category and the plurality of data object index entries is stored in a multitude of data object level index nodes and is associated with the plurality of data objects. The determining to expand the hierarchical ordered index structure includes at least one of a variety of determining approaches. A first determining approach includes determining that the root index node includes too many entries of the immediate children nodes (e.g., the determining includes counting the number of child node entries and comparing to a child node entry maximum threshold). The immediate children index nodes includes intermediate index nodes of the hierarchical ordered index structure, where the intermediate index nodes hierarchically lie between the root index node and the data object level index nodes. The immediate children index nodes further includes at least some of the multitude of data object level index nodes.

A second determining approach includes determining that the root index node is being accessed too frequently in a given time frame. A third determining approach includes receiving a request (e.g., after adding several data object entries associated with several data objects corresponding to the hierarchical ordered index structure). A fourth determining approach includes detecting that an access performance level of the hierarchical ordered index structure compares unfavorably to a desired access performance level threshold (e.g., unfavorable when access performance level is less than the minimum access performance level threshold). A fifth determining approach includes determining an estimated growth rate of the hierarchical ordered index structure and expanding in accordance with the estimated growth rate (e.g., growing fast as detected by identifying a level of the structure that includes too many index nodes or an index node includes too many entries or the structure includes too many layers, prepare of growth in advance).

When the hierarchical ordered index structure is to be expanded, the method continues at step 752 where the method enters a loop that includes retrieving a root index node of the hierarchical ordered index structure from a set of DSN storage servers of the DSN. For example, the processing module obtains a DSN address of the root index node from a metadata table for the index structure, issues retrieval commands to the set of DSN storage servers using the DSN address, receives at least a decode threshold number of encoded root index slices, identifies a revision number of the encoded root index slices, and decodes the at least the decode threshold number of encoded root index slices to reproduce the root index node.

The method continues at step 754 where the processing module identifies immediate children index nodes of the root index node from entries of the root index node. The method continues at step 756 where the processing module divides the immediate children index nodes into sets of children index nodes. The dividing the immediate children index nodes into sets of children index nodes includes determining a number of sets that the immediate children index nodes will be divided into (e.g., to achieve goals for number of entries per node and/or number of nodes per level) and based on the number of sets and the ordering of attributes of an attribute category, dividing the immediate children index nodes into the sets of children index nodes.

The method continues at step 758 where the processing module creates, for each of the sets of children index nodes, a sub-root index node to produce a set of sub-root index nodes, where the sub-root index node includes entries for each child index node of the corresponding set of children index nodes. The method continues at step 760 where the processing module creates a new root index node to include entries for each of the sub-root index nodes of the set of sub-root index nodes. The creating the new root index node to include entries for each of the sub-root index nodes of the set of sub-root index nodes includes creating a first entry for a first sub-root index node of the set of the sub-root index nodes to include a first index key and a first DSN address and creating a second entry for a second sub-root index node of the set of the sub-root index nodes to include a second index key and a second DSN address. The method continues at step 762 where the processing module temporarily stores the new root index node and the set of sub-root index nodes in the DSN (e.g., issuing write slice requests but not commit and finalize requests).

The method continues at step 764 where the processing module determines whether the root index node has changed. The determining that the root index node has changed includes utilizing a checked-write process of the DSN with respect to the root index node (e.g., detecting a revision level has changed since reading the root index node, which is indicated in a response from the DSN). Alternatively, the determining that the root index node has changed includes a series of detecting steps. A first detecting step includes re-retrieving the root index node to produce a re-retrieved root index node. A second detecting step includes comparing the re-retrieved root index node with the root index node. When the re-retrieved root index node substantially matches the root index node, a third detecting step includes indicating that the root index node has not changed. The method branches to step 772 when the processing module determines that the root index node has not changed. The method continues to step 766 when the processing module determines that the root index node has changed.

When the root index node has changed, the processing module repeats the loop to start over. Prior to repeating the loop, the method continues at step 766 where the processing module deletes the temporary storage of the new root index node and the set of sub-root index nodes in the DSN (e.g., issue rollback requests to the set of DSN storage servers for each set of write requests). The method continues at step 768 where the processing module performs undoing of the creating of the new root index node (e.g., delete from local memory to facilitate starting over), the creating of the set of sub-root index nodes, and the dividing of the immediate children index nodes into the sets of children index nodes. The method continues at step 770 where the processing module repeats the loop with the changed root index node being the root index node as the method branches back to step 752.

When the root index node has not changed, the method continues at step 772 where the processing module updates the hierarchical ordered index structure with the new root index node and the set of sub-root index nodes. The updating the hierarchical ordered index structure includes utilizing a three-phase-commit write process to store the new root index node and the set of sub-root index nodes in the DSN, wherein, when the three-phase-commit write process is successfully executed, the hierarchical ordered index structure is updated. For example, the processing module issues commit and finalize requests to the set of DSN storage servers for each set of write requests.

Figure 47:
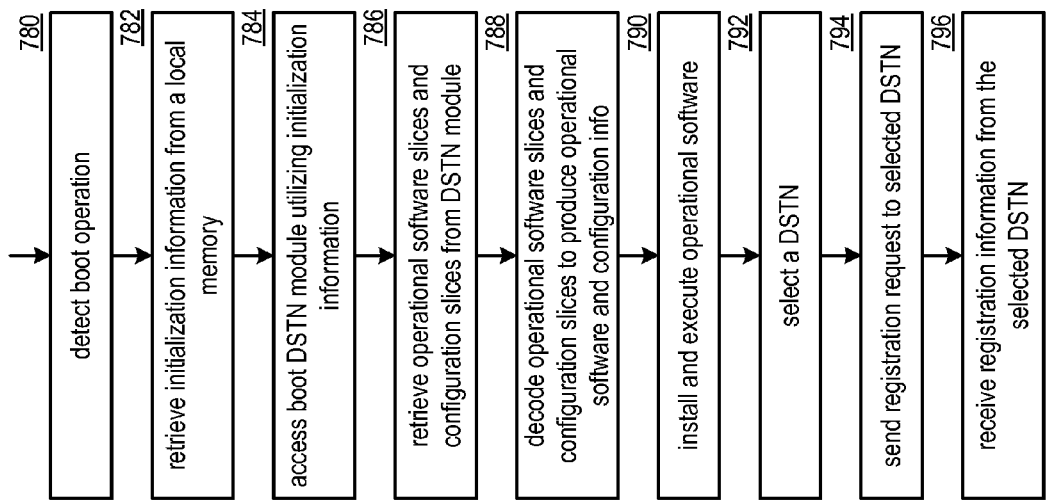
FIG. 47 is a flowchart illustrating an example of acquiring operational software in accordance with the present invention.

FIG. 47 is a flowchart illustrating an example of acquiring operational software. The method begins at step 780 where a processing module (e.g., of a computing device of a distributed storage and task network (DSTN) detects a boot operation. The detection includes at least one of receiving a message, detecting a reset, receiving a response from a query, detecting an error, and initiating a reset request. The method continues at step 782 where the processing module retrieves initialization information from a local memory (e.g., of the computing device). The initialization information includes one or more of a device type indicator (e.g., a distributed storage and task (DST) execution unit, a DST processing unit, a user device, etc.), boot dispersed storage error coding function software, a boot DSTN (ID), a boot DSTN internet protocol address, and a security credential.

The method continues at step 784 where the processing module accesses a boot DSTN module utilizing the initialization information. For example, the processing module generates an access request that includes the boot DSTN ID, the security credential, and the device type indicator, and sends the access request to the boot DSTN internet protocol address. The method continues at step 786 where the processing module retrieves operational software slices and configuration slices from the DSTN module. For example, the processing module generates at least a read threshold number of read slice requests that includes slice names associated with the operational software slices and the configuration slices, sends the at least a read threshold number of read slice requests to the DSTN module, and receives at least a decode threshold number of operational software slices and at least a decode threshold number of configuration slices from the DSTN module.

The method continues at step 788 where the processing module decodes the operational slices and configuration slices to produce operational software and configuration information. The operational software includes executable code to perform one or more functions in accordance with the device type. The configuration information includes hardware and software configuration parameters to enable the computing device to perform in accordance with the device type. For example, the processing module utilizes the dispersed storage error coding function software of the initialization information to decode the at least a decode threshold number of operational software slices to produce the operational software and the processing module utilizes the dispersed storage error coding function software to decode the at least a decode threshold number of configuration slices to produce the configuration information.

The method continues at step 790 where the processing module installs and executes the operational software. The installing includes configuring the computing device in accordance with the configuration information. The method continues at step 792 where the processing module selects a DSTN. The selecting includes identifying a DSTN from a list of one or more DSTNs (e.g., from the configuration information, from the initialization information, from a received message) in accordance with one or more of the initialization information, user input, a request, and a message.

The method continues at step 794 where the processing module sends a registration request to the selected DSTN. The sending includes generating a registration request that includes one or more of the device type indicator, a device ID, a DSTN ID, and security credentials. The method continues at step 796 where the processing module receives registration information from the selected DSTN. The registration information includes one or more of the device ID, the DSTN ID, updated dispersed storage error coding function software, and updated security credentials.

Figure 48A:
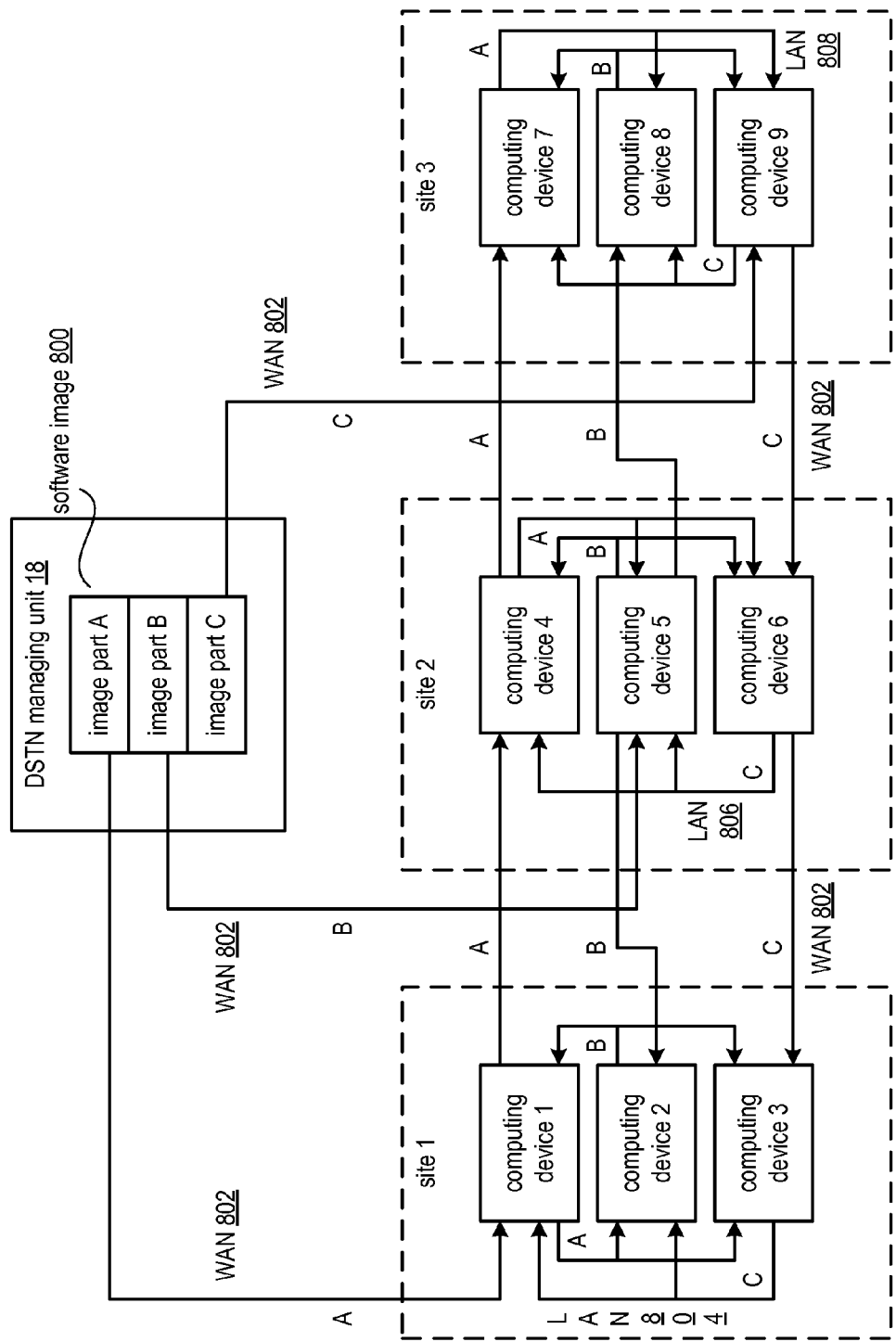
FIG. 48A is a schematic block diagram of another embodiment of a distributed computing system in accordance with the present invention.

FIG. 48A is a schematic block diagram of another embodiment of a distributed computing system that includes a distributed storage and task network (DSTN) managing unit 18 and a plurality of computing devices 1-9 located at a plurality of sites 1-3. The DSTN managing unit 18 and the plurality of sites 1-3 are operably coupled to each other via a wide area network (WAN) 802 and each computing device at each site is operably coupled to other computing devices at a common site via at least one of local area network (LAN) 804, 806, and 808. A task of the DSTN managing unit 18 includes distributing a software image 800 to each computing device of the computing system. For example, the DSTN managing unit 18 functions to distribute the software image 800 to each computing device of the plurality of computing devices 1-9 such that each computing device can install and execute the software image 800 to participate in the operation of the DSTN computing system.

The DSTN managing unit 18 partitions the software image 800 into a set of image partitions A-C to distribute the software image 800 in partitions. The DSTN managing unit 18 may partition software image 800 utilizing a dispersed storage error coding function to encode the software image 800 into the set of image partitions A-C. For example, the DSTN managing unit 18 determines a number of image partitions to be substantially the same as the number of sites of the system that includes the computing devices 1-9. For instance, the DSTN managing unit 18 partitions the software image into the three image partitions A-C when the computing system includes computing devices deployed at the three sites 1-3. The DSTN managing unit 18 sends each partition of the set of image partitions A-C to a corresponding site of the plurality of sites 1-3. For example, the DSTN managing unit 18 sends image partition A to computing device 1 at site 1, sends image partition B to computing device 5 at site 2, and sends image partition C to computing device 9 at site 3. The sending of the software image 800 as one transmission of each image partition provides a WAN bandwidth utilization improvement since multiple copies of the software image are not sent, via the WAN 802, from the DSTN managing unit 18 to each computing device.

At least one computing device at each site receives a corresponding image partition, stores the image partition in a local memory of the computing device, sends the image partition to at least one other computing device at a common site via a corresponding LAN, and sends the image partition to at least one other computing device of at least one other site via WAN 802. The sending the image partition to the at least one other computing device of at least one other site includes sending the image partition directly to the at least one other computing device and sending the image partition via a second computing device to the at least one other computing device. For example, computing device 1 receives image partition A, stores the image partition A in a local memory of computing device 1, sends the image partition A to computing device 2, sends the image partition A to computing device 3, sends the image partition A to computing device 4 at site 2, and sends the image partition A to computing device 7 at site 3 via computing device 4. As another example, computing device 5 receives image partition B, stores the image partition B in a local memory of computing device 5, sends the image partition B to computing device 4, sends the image partition B to computing device 6, sends the image partition B to computing device 3 at site 1, and sends the image partition B to computing device 9 at site 3 (e.g., directly). The sending of the software image between computing devices at a common site via the LAN provides a WAN bandwidth utilization improvement. A method to partition the software image 800 and distribute the software image partitions is discussed in greater detail with reference to FIGS. 48B-48C.

FIG. 48B is a flowchart illustrating an example of issuing a software image update. The method begins at step 810 where a processing module (e.g., of a distributed storage and task network (DSTN) managing unit) identifies computing devices at a set of sites requiring a software image update. The identifying includes at least one of receiving an error message, receiving a reboot message, receiving a software version query, receiving a request, and receiving a software rebuilding indication. The method continues at step 812 where the processing module partitions a software image update to produce a set of software image partitions. The partitioning includes determining a number of software image partitions based on one or more of a number of the set of sites associated with the computing devices, a number of computing devices, a previous software image update sequence, an error message, a priority indicator, and a wide area network (WAN) performance indicator. For example, the processing module determines the number of software image partitions to be substantially the same as the number of the set of sites.

The method continues at step 814 where the processing module, for each site, selects a computing device to send a corresponding software image petition of the set of software image partitions. The selecting may be based on one or more of a computing device performance indicator, a WAN route performance indicator, a predetermination, and look up, and a software image partition request. For example, the processing module selects a first computing device at a first site to receive a first software image partition when the first computing device is associated with a favorable computing device performance indicator. The method continues at step 816 where the processing module, for each site, sends (e.g., via the WAN) the corresponding software image partition to the selected computing device.

FIG. 48C is a flowchart illustrating an example of receiving a software image update. The method begins at step 818 where a processing module (e.g., of computing device of a distributed storage and task network (DSTN)) receives a software image partition of a set of software image partitions (e.g., via a wide area network (WAN) or a local area network (LAN)). The method continues at step 820 where the processing module stores the software image partition in a local memory (e.g., associated with the computing device). The method continues at step 822 where the processing module, when receiving the software image partition from another site, forwards the software image partition to one or more other computing devices at a common local site requiring a software image update. The forwarding includes identifying the one or more other computing devices at the local site requiring the software image update. The identifying includes at least one of initiating a query, receiving a query response, receiving a software image partition request, accessing LAN registration information, and a lookup.

The method continues at step 824 where the processing module, when receiving the software image partition from a primary source (e.g., from a DSTN managing unit), forwards the software image partition to at least one computing device at one or more remote sites requiring a software image update. The forwarding includes identifying the at least one computing device at the one or more remote sites requiring the software image update. The identifying includes at least one of initiating a query via the WAN, receiving a query response via the WAN, receiving a software image partition request via the WAN, accessing WAN registration information, and a lookup. The forwarding further includes identifying an intermediary computing device to forward the software image partition to the at least one computing device. The identifying the intermediary computing device may be based on one or more of a WAN topology, a WAN performance indicator, a candidate intermediary computing device performance indicator, a query, and a lookup.

The method continues at step 826 where the processing module receives and aggregates the set of software image partitions to reproduce a software image update. The receiving may include verifying integrity of the software image update. The method continues at step 828 where the processing module activates the software image update. The activating includes at least one of loading the software image update, configuring the computing device in accordance with the software image update, registering the software image update (e.g., sending a registration request to a DSTN managing unit) and initializing execution of at least a portion of the software image update.

FIG. 49A is a flowchart illustrating an example of preparing for an upgrade. The method begins at step 830 where a processing module (e.g., of a distributed storage and task (DST) client module) obtains distributed storage and task network (DSTN) address range information for each memory device of a set of memory devices associated with a DST execution unit targeted for an upgrade (e.g., a software upgrade, a hardware upgrade). The obtaining includes at least one of receiving the address range information, performing a lookup in a DSTN address to physical location table, generating a address range request, retrieving an address range of a previous upgrade, and initiating a query.

The method continues at step 832 where the processing module obtains a list of at least some slice names associated with slices stored in each memory device of the DST execution unit. The obtaining includes selecting a portion of the address range based on the DSTN address range information, generating a list request, sending the list request to the DST execution unit, and receiving a list response from the DST execution unit that includes the list of at least some of the slice names. The method continues at step 834 where the processing module retrieves the slices associated with the at least some of the slice names. The retrieving includes generating read slice requests that includes the slice names, sending the resource requests to the DST execution unit, and receiving the slices from the DST execution unit. The slices may include two or more slices for each slice name when more than one revision is associated with the slice name.

The method continues at step 836 where the processing module generates an integrity check value for the slices. For example, the processing module utilizes a hashing function to produce a hash value over the slices as the integrity check value. The method continues at step 838 where the processing module stores one or more of the integrity check failure, the slices, and the slice names as integrity information in a local memory (e.g., in one or more of the DST execution unit, a memory associated with a DST client module, in one or more other DST execution units). The method continues at step 840 where the processing module enables an upgrade sequence of the DST execution unit. The enabling may include caching new slices being written to the DST execution unit prior to the upgrade sequence. The caching may include sending the new slices to an alternate DST execution unit.

FIG. 49B is a flowchart illustrating an example of verifying an upgrade, which include similar steps to FIG. 49A. The method begins with step 842 where a processing module (e.g., of a distributed storage and task (DST) client module) retrieves integrity information for a DST execution unit as retrieved integrity information. The retrieving includes identifying a storage location and sending a bigger information retrieval request to the storage location. The method continues with the steps 830-836 of FIG. 49A where the processing module obtains distributed storage and task network (DSTN) address range information for each vault of each memory device of a set of memory devices of the DST execution unit (e.g., utilizing slice names of the retrieved integrity information), obtains a list of at least some slice names associated with slices stored on each memory device of the DST execution unit, retrieves the slices associated with the at least some of the slice names, and generates an integrity check value for the slices.

The method continues at step 844 where the processing module combines the integrity check value, the slices, and the slice names as integrity information. The method continues at step 846 where the processing module, when integrity information compares unfavorably to the retrieved integrity information, indicates an unfavorable condition. The processing module determines that the integrity information compares unfavorably to the retrieved integrity information when an integrity check value is not substantially the same as the retrieved integrity check value for at least one memory device. In addition, the processing module may initiate a rebuilding process when the integrity information compares unfavorably to the retrieved integrity information. Alternatively, when the processing module determines that the integrity information compares favorably to the retrieved integrity information, the processing module generates an indication that the upgrade was successful with respect to not corrupting slices stored in the DST execution unit.

FIG. 50A is a flowchart illustrating an example of migrating an encoded data slice. The method begins with step 848 where a processing module (e.g., of a source distributed storage and task (DST) execution unit) identifies a slice name corresponding to a slice to migrate from the source DST execution unit to a destination DST execution unit. The identifying includes at least one of receiving a request, receiving the slice name, receiving an error message, detecting a unfavorable memory condition (e.g., too full), performing a lookup, and receiving a memory test result. The method continues at step 850 where the processing module sends the slice to migrate to the destination DST execution unit. The sending includes sending the slice name to the DST execution unit.

The method continues at step 852 where the processing module generates a slice verification request and sends the slice certification request to the destination DST execution unit. The generating includes generating the request to include one or more of the slice name, the slice, a revision indicator, a verification method indicator (e.g., utilize a hashing function, utilize a signature function), and a nonce. The method continues at step 854 where the processing module receives an integrity value from the destination DST execution unit. The integrity value includes at least one of a hashing function hash result (e.g., a hash over the slice and the nonce) and a signed package, wherein the package includes the slice and the nonce.

The method continues at step 856 where the processing module determines whether the integrity value compares favorably to the slice verification request. For example, the processing module determines that the integrity value compares favorably to the slice verification request when a hash of the slice and nonce is substantially the same as the integrity value when the integrity value includes the hash result. As another example, the processing module determines that the integrity value compares favorably to the slice verification request when a decrypted signature (e.g., utilizing a public key of the destination DST execution unit) of the integrity value is substantially the same as at least one of a hash of the slice and the nonce or the slice and the nonce when the integrity value includes the signed package. The method repeats back to step 850 when the processing module determines that the integrity value compares unfavorably to the slice verification request. The method continues to step 858 when the processing module determines that the integrity value compares favorably to the slice verification request.

The method continues at step 858 where the processing module updates a slice name assignment with regards to the slice name. For example, the processing module associates the destination DST execution unit with the slice name and disassociates the source DST execution unit with the slice name in a physical location to distribute storage and task network (DSTN) address table. The method continues at step 860 where the processing module deletes the slice from the source DST execution unit. For example, the processing module sends a write slice request to the source DST execution unit, where the request includes the slice name and an indication to delete the slice.

FIG. 50B is a flowchart illustrating an example of saving a migrated encoded data slice. The method begins with step 862 where a processing module (e.g., of a destination distributed storage and task (DST) execution unit) receives a slice to migrate from a source DST execution unit. The method continues at step 864 where the processing module stores the slice to migrate in a memory device associated with the destination DST execution unit. The storing includes storing a slice name associated with the slice to migrate in the memory device. The method continues at step 866 where the processing module receives a slice verification request from the source DST execution unit.

The method continues at step 868 where the processing module generates an integrity value utilizing the slice to migrate and a nonce of the slice verification request based on a verification method indicator of the request. For example, the processing module performs a hashing function on the slice and the nonce to produce a hash result as integrity value when the verification method indicator indicates to produce a hash result. As another example, the processing module generates a signature utilizing a private key associated with the destination DST execution unit over the slice and the nonce to produce a signed package as the integrity value when the verification method indicator indicates to produce a signature. The method continues at step 870 where the processing module sends the integrity value to the source DST execution unit.

Figure 51A:
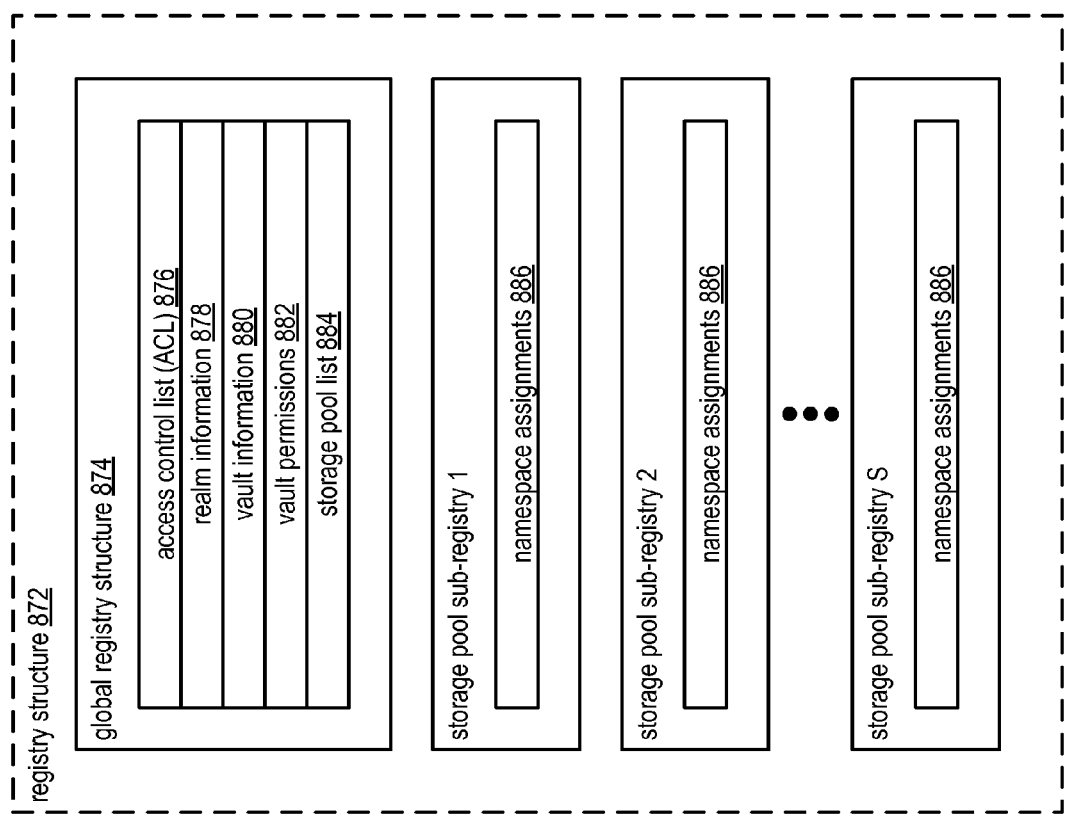
FIG. 51A is a diagram illustrating an example of a registry structure in accordance with the present invention.

FIG. 51A is a diagram illustrating an example of a registry structure 872. The registry structure 872 may be utilized to provide registry information to a plurality of units and devices associated with at least one of a distribute storage and task network (DSTN) and a dispersed storage network (DSN). The registry structure includes a global registry structure 874 and one or more storage pool sub-registries 1-S. The global registry structure 874 includes an access control list (ACL) field 876, a realm information field 878, a vault information field 880, a vault permissions field 882, and a storage pool list field 884. The ACL field 876 includes one or more ACL entries that specify which user identifier (ID) and or vault ID may access which devices and services of the DSTN. The realm information field 878 includes one or more realm information entries, where a realm information entry identifies one or more of an internet naming address, contact information, and a realm to vault ID map. The vault information field 880 includes one or more vault information entries, where a vault information entry includes one or more of a vault ID, a memory allocation maximum, a memory allocation minimum, and a storage pool association. The vault permissions field 882 includes one or more vault permission entries, where a vault permission entry includes network element IDs and services of the DSTN that are accessible by users of the vault. The storage pool list field 884 includes one or more storage pool entries, where a storage pool entry includes a list of distributed storage and task (DST) execution unit IDs of a common storage pool ID and one or more vault IDs associated with the storage pool ID. The global registry structure 874 may be utilized by each unit, device, and module of the DSTN to access the DSTN and utilize services of the DSTN.

A number of storage pool sub-registry 1-S corresponds to a number of storage pools that are assigned to one or more vaults. Each storage pool sub-registry includes a namespace assignments field 886. The namespace assignments field 886 includes one or more namespace assignment entries, where a namespace assignment entry includes a DSTN address range assignment corresponding to the storage pool of DST execution units. Each storage pool sub-registry is sent to units, devices, and modules associated with the corresponding storage pool (e.g., by vault association). For example, storage pool sub-registry 1 is sent to DST execution units 1-5 of a storage pool 1 and storage pool sub-registry 2 is sent to DST execution units 6-10 of a storage pool 2. In an example of operation, an element of a storage pool sub-registry is updated, affected DST execution units are identified based on the storage pool sub-registry, and the updated storage pool sub-registry is sent to the affected DST execution units (e.g., without the need to send the global registry structure too).

Figure 51B:
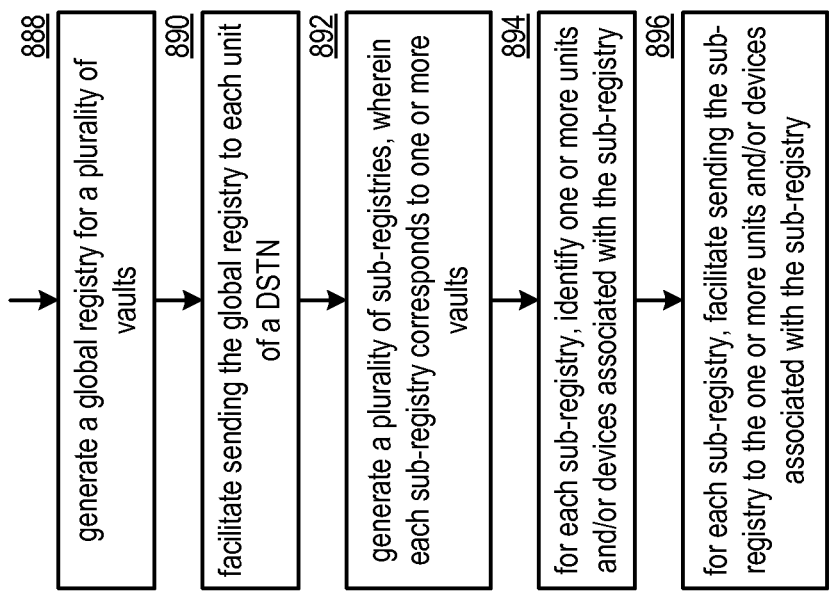
FIG. 51B is a flowchart illustrating an example of distributing Registry information in accordance with the present invention.

FIG. 51B is a flowchart illustrating an example of distributing registry information. The method begins with step 888 where a processing module (e.g., of a distributed storage and task network (DSTN) managing unit) generates a global registry for a plurality of vaults. The generating includes generating the global registry based on one or more of preprogrammed vault information, a user input, a manager input, a vault list, a storage pool configuration output, a list of distributed storage and task (DST) execution units, billing information, a default authorization list, internet information, and a network management template. The method continues at step 890 where the processing module facilitates sending the global registry to each unit of a DSTN. For example, the processing module sends the global registry to a publishing server, where the publishing server forwards the global registry to each unit of the DSTN.

The method continues at step 892 where the processing module generates a plurality of sub-registries, where each sub-registry corresponds to one or more vaults. The generating may be based on one or more of the global registry, a storage pool identifier (ID) to vault ID input list, a user input, a sub-registry template, a manager input, a DST execution unit performance indicator, and a vault list. The generating may further include updating an existing sub-registry to include updated sub-registry information. The method continues at step 894 where the processing module, for each sub-registry, identifies one or more units, modules, and/or devices associated with the sub-registry. The identifying may be based on one or more of the global registry, a user input, registration information, a lookup, and the message. The method continues at step 896 where the processing module, for each sub-registry, facilitates sending the sub-registry to the one or more units, modules, and/or devices associated with the sub-registry.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a processing module of a computer, the method comprises:
    receiving, via an interface of the computer, a request for a data index list that identifies data objects having one or more common attributes of an attribute category, wherein indexing of a plurality of data objects is organized in accordance with an ordering of attributes of the attribute category and wherein the plurality of data objects is stored in a dispersed storage network (DSN);
    identifying, by the processing module, a first data object boundary match by identifying a first one of a plurality of index keys associated with the data object level index node that includes an indication that substantially matches the one or more common attributes, wherein the plurality of index keys are sequentially ordered in accordance with indicators corresponding to attributes of the attribute category;
    searching, by the processing module, a hierarchical ordered index structure to identify a data object level index node that includes a first boundary data object index key corresponding to the first data object boundary match, wherein the searching is based on the one or more common attributes of an attribute category;
    determining, by the processing module, whether the data object level index node includes a second boundary data object index key corresponding to a second data object boundary match of the one or more common attributes;
    when the data object level index node does not include the second boundary data object index key, searching, by the processing module, an adjacent data object level index node of the hierarchical ordered index structure to determine whether the adjacent data object level index node includes the second boundary data object index key;
    when the adjacent data object level index node includes the second boundary data object index key, generating, by the processing module, the data index list to include the first boundary data object index key, a first ordered set of data object index keys of the data object level index node, the second boundary data object index key, and a second ordered set of data object index keys of the adjacent data object level index node;
    outputting, via the interface, the data index list;
    receiving, via the interface, a read request for a data object identified in the data index list, wherein a data object is dispersed error encoded to generate a plurality of sets of encoded data slices;
    identifying a set of DSN servers storing the plurality of sets of encoded data slices; and
    sending a set of read requests to the set of DSN servers.

2. The method of claim 1, wherein the generating the data index list further comprises:
    determining DSN addresses corresponding to data object index keys of the data index list; and
    adding the DSN addresses to the data index list.

3. The method of claim 1 further comprises:
    receiving, via the interface, a read request regarding a data object identified in the data index list;
    determining, by the processing module, a DSN address for the data object;
    identifying, by the processing module, a set of dispersed storage (DS) servers based on the DSN address; and
    sending, via the interface, a set of read requests to the set of DS servers to retrieve a set of data slices, wherein a data segment of the data object is stored as the set of data slices in the set of DS servers.

4. The method of claim 1, wherein the searching the hierarchical ordered index structure comprises:
    identifying a category index node based on the request;
    retrieving, via the interface, a set of category index slices from the DSN;
    reconstructing a category index file from the set of category index slices;
    interpreting the category index file based on the one or more common attributes to identify a next level index node; and
    when the next level index node is not the data object level index node, entering a loop that includes:
    retrieving, via the interface, a set of next level index slices from the DSN;
    reconstructing a next index file from the set of next level index slices;
    interpreting the next index file based on the one or more common attributes to identify a new next level index node;
    determining whether the new next level index node is the data object level index node;
    when the new next level index node is the data object level index node, exiting the loop; and
    when the new next level index node is not the data object level index node, repeating the loop with the new next level index node as the next level index node.

5. The method of claim 1 further comprises:
    when the data object level index node includes the second boundary data object index key, generating, by the processing module, the data index list to include the first boundary data object index key, the second boundary data object index key, and an ordered set of data object index keys between the first and second boundary data object index keys.

6. The method of claim 1 further comprises:
    when the adjacent data object level index node does not include the second boundary data object index key, entering a loop that includes:
    searching, by the processing module, a next adjacent data object level index node of the hierarchical ordered index structure to determine whether the next adjacent data object level index node includes the second boundary data object index key;
    when the next adjacent data object level index node includes the second boundary data object index key, exiting the loop and generating, by the processing module, the data index list; and
    when the next adjacent data object level index node does not include the second boundary data object index key, repeating the loop using a second next adjacent data object level index node as the next adjacent data object level index node.

7. The method of claim 1, wherein the indexing of the plurality of data objects comprises:
a corresponding plurality of data object index keys that is ordered in accordance with the ordering of attributes of the attribute category, wherein a data object index key of the plurality of corresponding data object index keys uniquely identifies one of the plurality of data objects in accordance with the attribute category.

8. A dispersed storage (DS) module of a computing device, the DS module comprises:
a first module, when operable within the computing device, causes the computing device to:
receive, via an interface of the computing device, a request for a data index list that identifies data objects having one or more common attributes of an attribute category, wherein indexing of a plurality of data objects is organized in accordance with an ordering of attributes of the attribute category and wherein the plurality of data objects is stored in a dispersed storage network (DSN);
a second module, when operable within the computing device, causes the computing device to:
identify, by the processing module, a first data object boundary match by identifying a first one of a plurality of index keys associated with the data object level index node that includes an indication that substantially matches the one or more common attributes, wherein the plurality of index keys are sequentially ordered in accordance with indicators corresponding to attributes of the attribute category;
a third module, when operable within the computing device, causes the computing device to:
search, a hierarchical ordered index structure to identify a data object level index node that includes a first boundary data object index key corresponding to the first data object boundary match, wherein the searching is based on the one or more common attributes of an attribute category;
determine whether the data object level index node includes a second boundary data object index key corresponding to a second data object boundary match of the one or more common attributes; and
when the data object level index node does not include the second boundary data object index key, search an adjacent data object level index node of the hierarchical ordered index structure to determine whether the adjacent data object level index node includes the second boundary data object index key; and
a fourth module, when operable within the computing device, causes the computing device to:
when the adjacent data object level index node includes the second boundary data object index key, generate the data index list to include the first boundary data object index key, a first ordered set of data object index keys of the data object level index node, the second boundary data object index key, and a second ordered set of data object index keys of the adjacent data object level index node;
output, via the interface, the data index list;
receive, via the interface, a read request for a data object identified in the data index list, wherein a data object is dispersed error encoded to generate a plurality of sets of encoded data slices;
identify a set of DSN servers storing the plurality of sets of encoded data slices; and
sending a set of read requests to the set of DSN servers.

9. The DS module of claim 8, wherein the third module further functions to generate the data index list by:
determining DSN addresses corresponding to data object index keys of the data index list; and
adding the DSN addresses to the data index list.

10. The DS module of claim 8 further comprises:
a fifth module, when operable within the computing device, causes the computing device to:
receive, via the interface, a read request regarding a data object identified in the data index list;
determine a DSN address for the data object;
identify a set of dispersed storage (DS) servers based on the DSN address; and
send, via the interface, a set of read requests to the set of DS servers to retrieve a set of data slices, wherein a data segment of the data object is stored as the set of data slices in the set of DS servers.

11. The DS module of claim 8, wherein the second module functions to search the hierarchical ordered index structure by:
identifying a category index node based on the request;
retrieving a set of category index slices from the DSN;
reconstructing a category index file from the set of category index slices;
interpreting the category index file based on the one or more common attributes to identify a next level index node; and
when the next level index node is not the data object level index node, entering a loop that includes:
retrieving a set of next level index slices from the DSN;
reconstructing a next index file from the set of next level index slices;
interpreting the next index file based on the one or more common attributes to identify a new next level index node;
determining whether the new next level index node is the data object level index node;
when the new next level index node is the data object level index node, exiting the loop; and
when the new next level index node is not the data object level index node, repeating the loop with the new next level index node as the next level index node.

12. The DS module of claim 8 further comprises:
the fourth module further functions to:
when the data object level index node includes the second boundary data object index key, generate the data index list to include the first boundary data object index key, the second boundary data object index key, and an ordered set of data object index keys between the first and second boundary data object index keys.

13. The DS module of claim 8 further comprises:
the third module further functions to:
when the adjacent data object level index node does not include the second boundary data object index key, enter a loop to:
search a next adjacent data object level index node of the hierarchical ordered index structure to determine whether the next adjacent data object level index node includes the second boundary data object index key;
when the next adjacent data object level index node includes the second boundary data object index key, exit the loop and generate the data index list; and
when the next adjacent data object level index node does not include the second boundary data object index key, repeat the loop using a second next adjacent data object level index node as the next adjacent data object level index node.

14. The DS module of claim 8, wherein the indexing of the plurality of data objects comprises:
a corresponding plurality of data object index keys that is ordered in accordance with the ordering of attributes of the attribute category, wherein a data object index key of the plurality of corresponding data object index keys uniquely identifies one of the plurality of data objects in accordance with the attribute category.

* * * * *